US008964009B2

(12) United States Patent
Yoshida

(10) Patent No.: US 8,964,009 B2
(45) Date of Patent: Feb. 24, 2015

(54) PARALLAX BARRIER FOR AUTOSTEREOSCOPIC DISPLAY, AUTOSTEREOSCOPIC DISPLAY, AND METHOD FOR DESIGNING PARALLAX BARRIER FOR AUTOSTEREOSCOPIC DISPLAY

(76) Inventor: Kenji Yoshida, Tokyo (JP)

( * ) Notice: Subject to any disclaimer, the term of this patent is extended or adjusted under 35 U.S.C. 154(b) by 604 days.

(21) Appl. No.: 13/384,071

(22) PCT Filed: Jul. 12, 2010

(86) PCT No.: PCT/JP2010/061775
§ 371 (c)(1),
(2), (4) Date: Mar. 13, 2012

(87) PCT Pub. No.: WO2011/007757
PCT Pub. Date: Jan. 20, 2011

(65) Prior Publication Data
US 2012/0182407 A1 Jul. 19, 2012

(30) Foreign Application Priority Data

Jul. 13, 2009 (JP) .................................. 2009-165152

(51) Int. Cl.
*H04N 13/04* (2006.01)
*G02B 27/22* (2006.01)
(Continued)

(52) U.S. Cl.
CPC ........ *H04N 13/0475* (2013.01); *G02B 27/2214* (2013.01); *G03B 35/18* (2013.01); *H04N 13/0409* (2013.01); *H04N 13/0415* (2013.01); *G02B 27/60* (2013.01)
USPC .................... 348/54; 348/42; 348/43; 348/51; 359/462; 359/463

(58) Field of Classification Search
CPC .... G02B 27/2214; G02B 27/60; G02B 7/028; H04N 13/0409; H04N 13/0415; H04N 13/0475; H04N 13/0404; H04N 13/00; H04N 13/0477; H04N 13/0479; G06T 19/00
USPC ........ 345/55, 419; 348/53, 54, 55, 58, 59, 60; 359/462, 463, 620
See application file for complete search history.

(56) References Cited

U.S. PATENT DOCUMENTS 5,831,765 A * 11/1998 Nakayama et al. ........... 359/464
6,040,807 A * 3/2000 Hamagishi et al. ............ 345/6
(Continued)

FOREIGN PATENT DOCUMENTS

JP 2004-258163 A 9/2004
JP 2006-235116 A 9/2006

OTHER PUBLICATIONS

Supplementary European Search Report dated Mar. 25, 2013, issued in European Patent Application No. 10799815.5 (9 pages).
(Continued)

*Primary Examiner* — Sath V Perungavoor
*Assistant Examiner* — Nathnael Aynalem
(74) *Attorney, Agent, or Firm* — Westerman, Hattori, Daniels & Adrian, LLP

(57) ABSTRACT

Moiré generated in an autostereoscopic display utilizing a parallax barrier method is cancelled. The interval between visible light transmitting sections that are abutting in the horizontal direction of a parallax barrier is determined using: the average number of subpixels constituting one pixel for three-dimensional display in one row in the horizontal direction; the width of a subpixel, which forms a display; the distance from a predetermined diagonal moiré canceling position to the parallax barrier; the number of viewpoints of a video image used for displaying an autostereoscopic video image; and the distance (Z) from the image display surface of the display to the parallax barrier.

28 Claims, 70 Drawing Sheets

(51) Int. Cl.
  *G03B 35/18*  (2006.01)
  *G02B 27/60*  (2006.01)

(56) References Cited

U.S. PATENT DOCUMENTS

2004/0165264 A1  8/2004  Uehara et al.
2005/0190443 A1*  9/2005  Nam et al. .................... 359/464
2007/0165305 A1*  7/2007  Mehrle ......................... 359/464
2008/0079662 A1*  4/2008  Saishu et al. ..................... 345/55
2008/0316604 A1*  12/2008  Redert et al. .................. 359/614

OTHER PUBLICATIONS

International Preliminary Report on Patentability (form PCT/IB/373) dated Feb. 7, 2014, with form PCT/ISA/237 (5 pages).

* cited by examiner

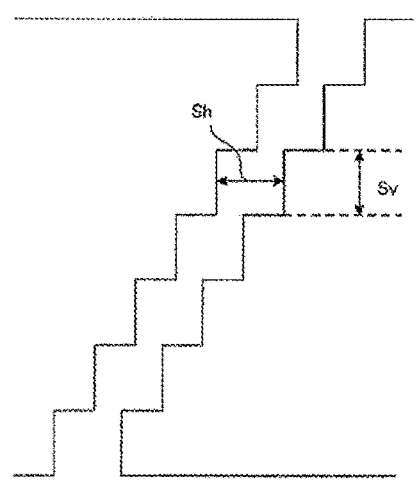
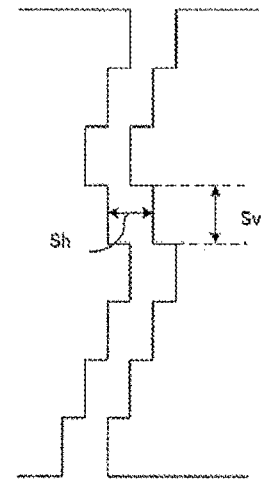
FIG. 10A  FIG. 10B
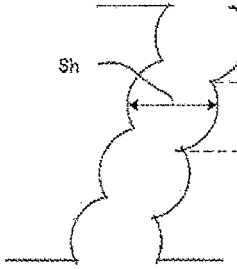
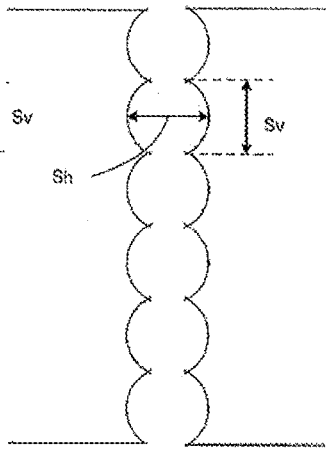
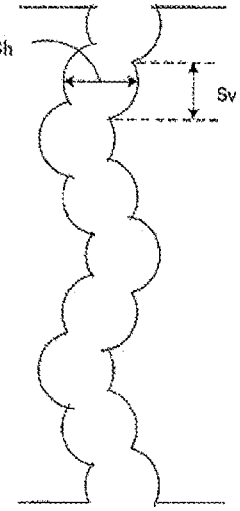
FIG. 10C  FIG. 10D  FIG. 10E FIG. 22
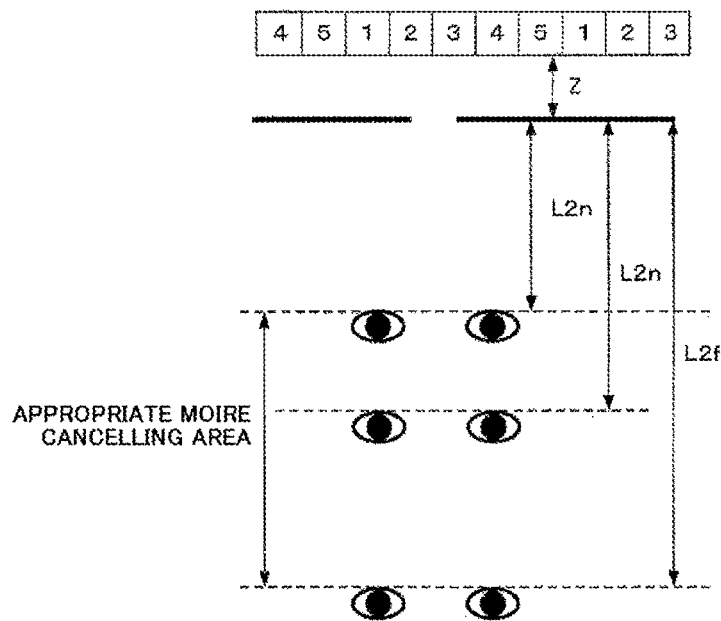
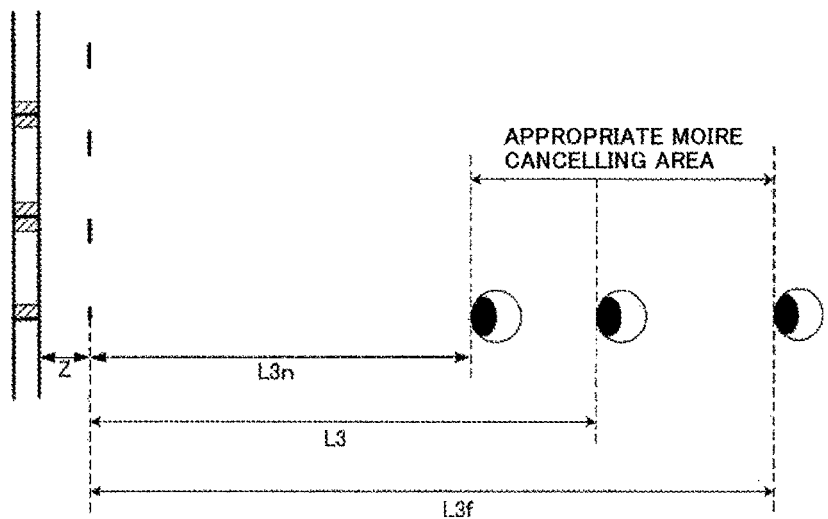

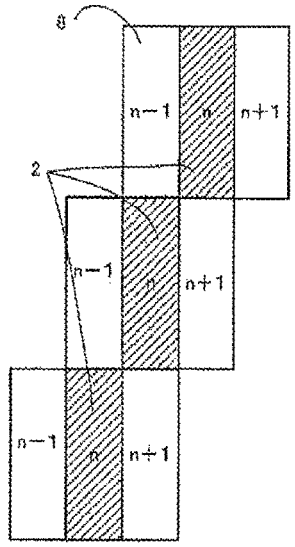

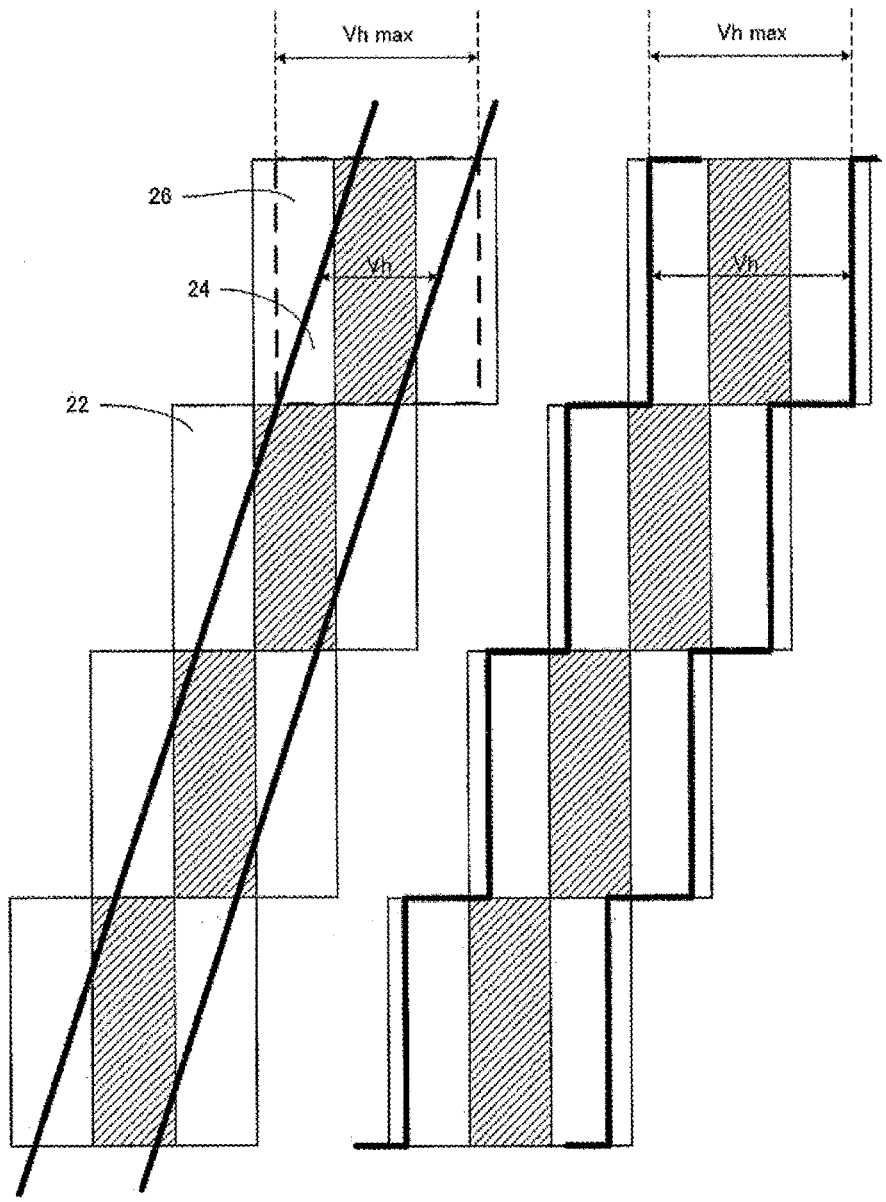

αPh=1Ph
αPh=1.5Ph
FIG. 32(iii)
αPh=2Ph
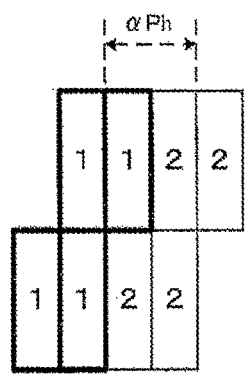
αPh=3Ph $$Mh = \text{int}\left(\frac{3\,Ir-1}{N}\right)+1$$

FIG. 36A
$\beta = 1$
FIG. 36B
$\beta = 2$
FIG. 36C
$\beta = 1/3$
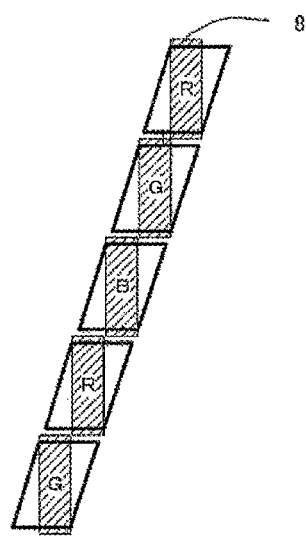
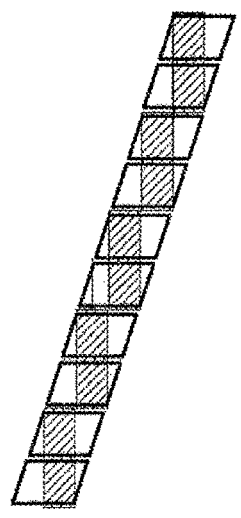
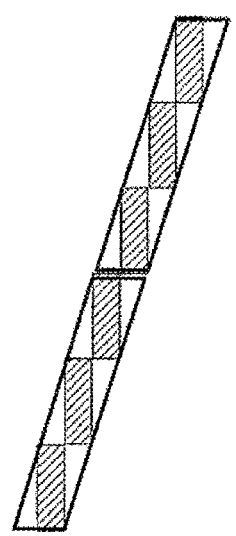
FIG. 36D
$\beta = 1$
FIG. 36E
$\beta = 2$
FIG. 36F
$\beta = 1/3$
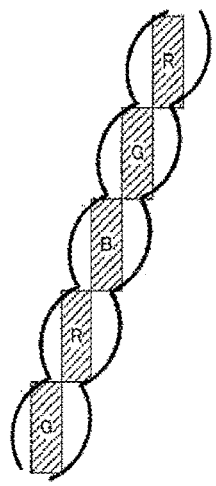
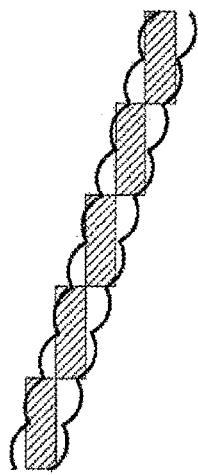

$$Hv = \frac{Hpv}{1}$$

$$Hv = \frac{Hpv}{2}$$

$$Hv = \frac{Hpv}{1}$$

$$Hv = \frac{Hpv}{2}$$

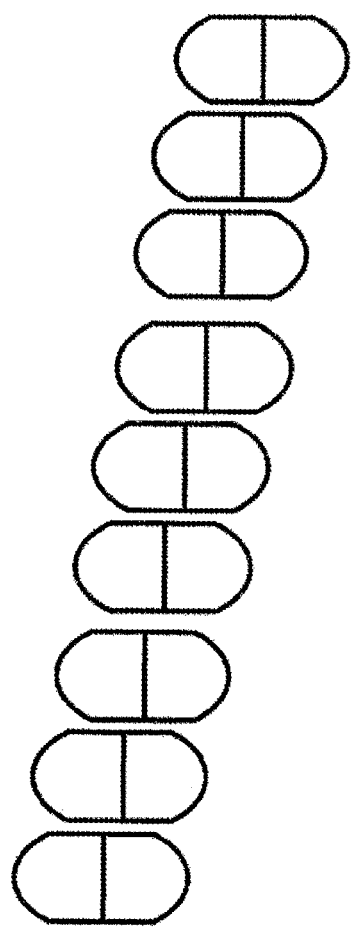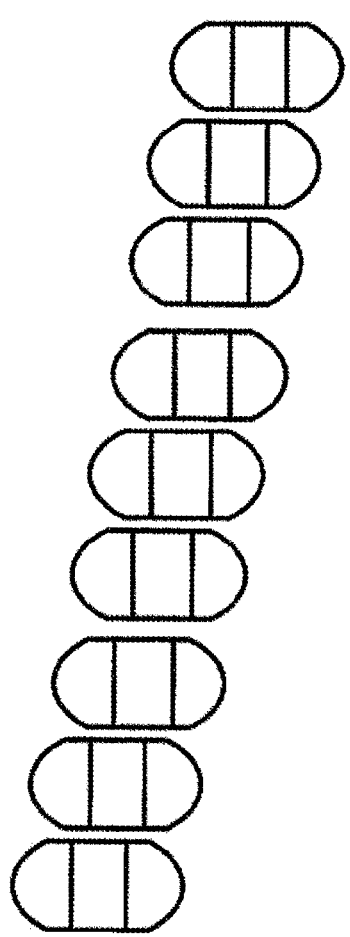

FIG. 59A  FIG. 59B  FIG. 59C  FIG. 59D  FIG. 59E
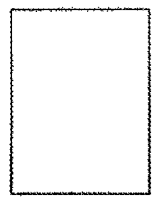 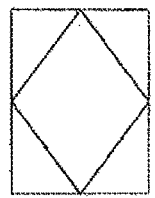 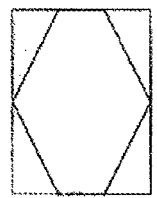 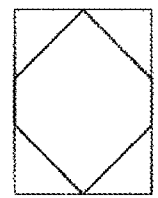 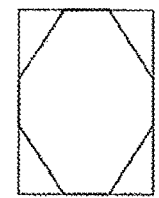
FIG. 59F  FIG. 59G  FIG. 59H  FIG. 59I  FIG. 59J
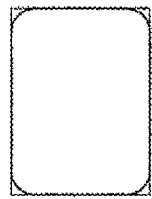 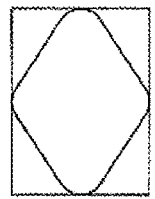 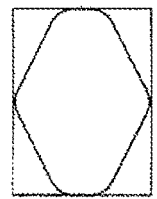 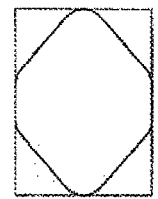 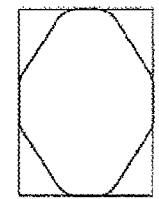

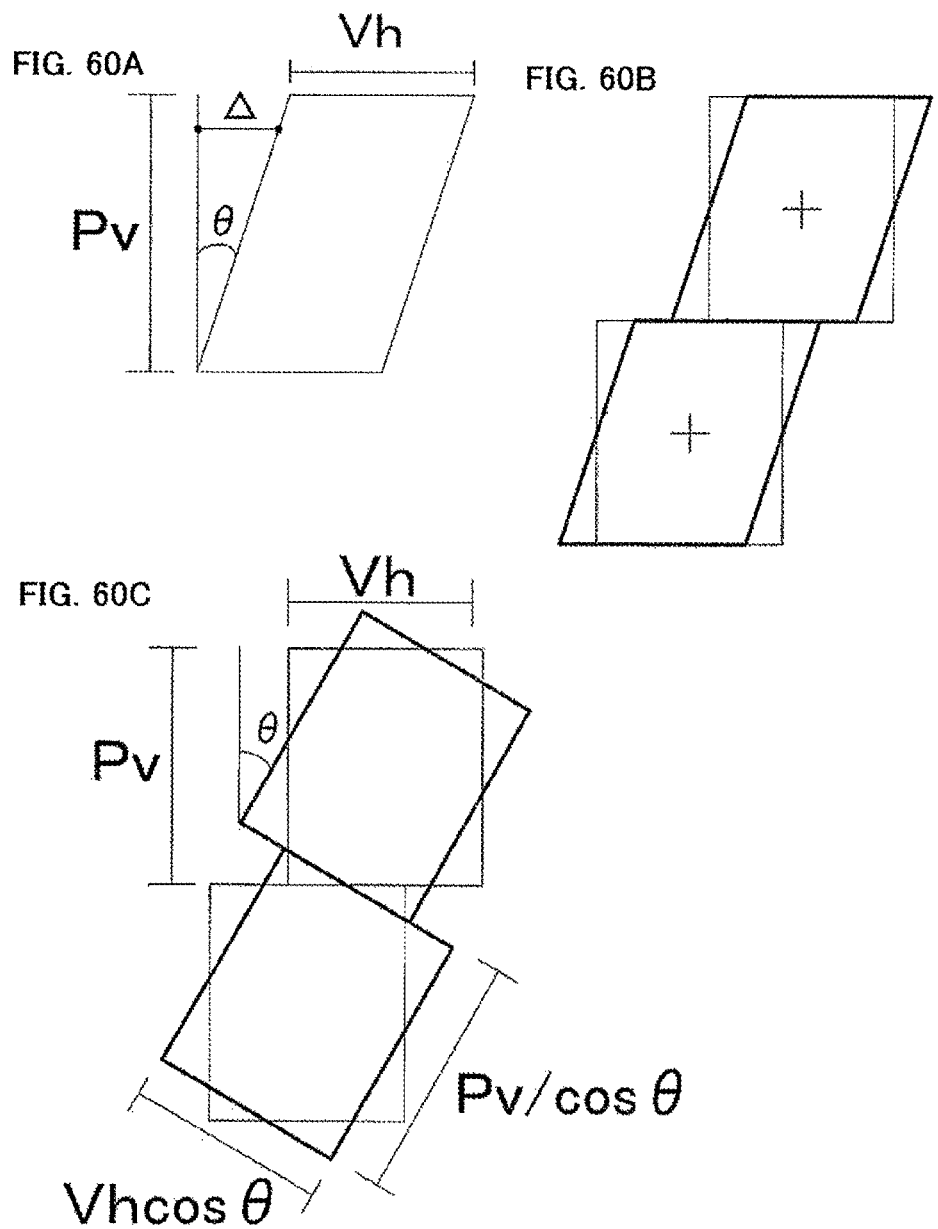

FIG. 68
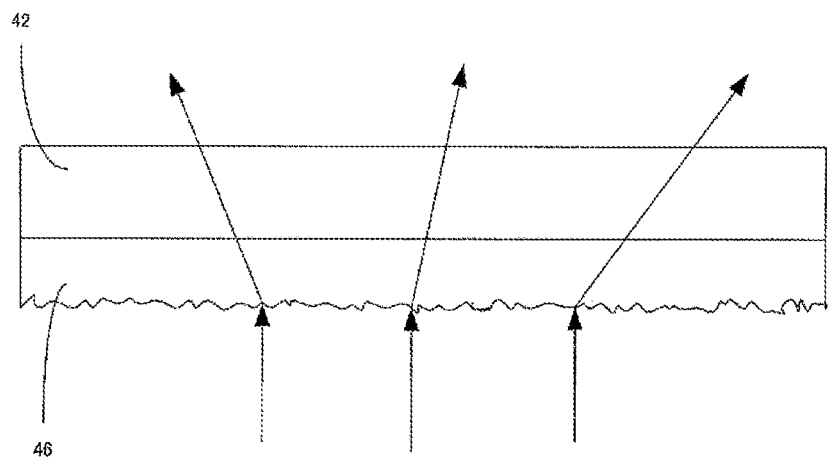
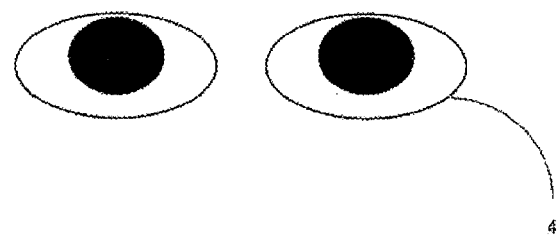

FIG. 70A  STAIRCASE PATTERN
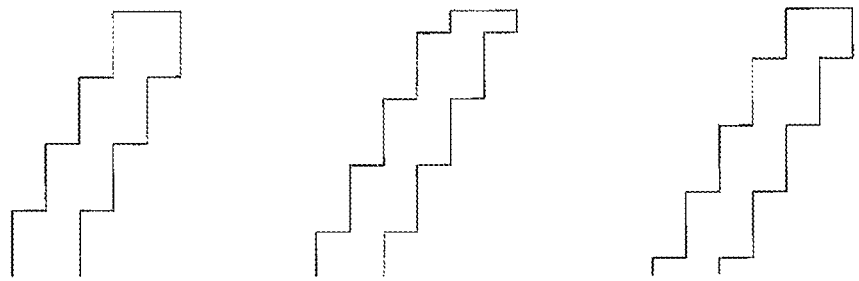
FIG. 70B  SKEWERD DUMPLING
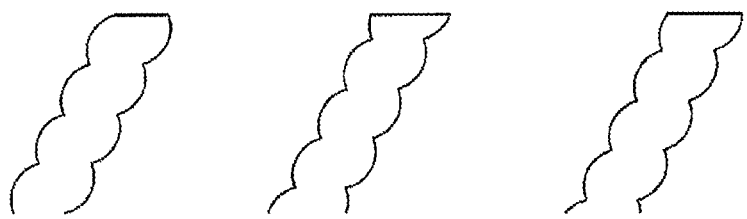
FIG. 70C  HOLE (PARALLELOGRAM)
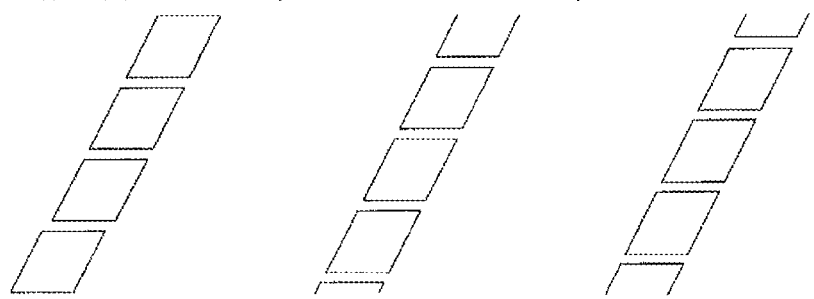
FIG. 70D  HOLE (JAPANESE LANTERN SHAPE)
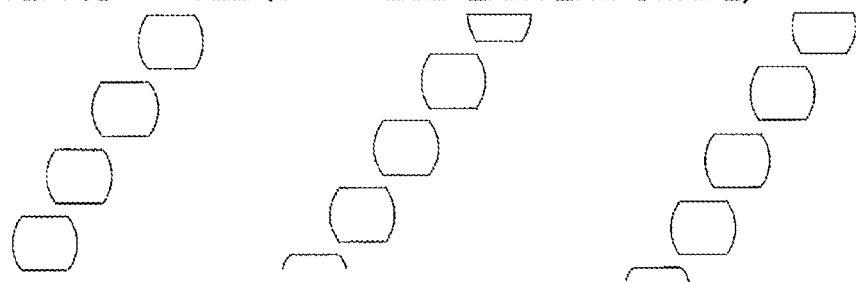

PARALLAX BARRIER FOR AUTOSTEREOSCOPIC DISPLAY, AUTOSTEREOSCOPIC DISPLAY, AND METHOD FOR DESIGNING PARALLAX BARRIER FOR AUTOSTEREOSCOPIC DISPLAY

FIELD OF THE INVENTION

The present invention relates to an autostereoscopic display employing a parallax barrier method.

BACKGROUND OF THE INVENTION

As a kind of conventional typical autostereoscopic display, there has been known, for long, autostereoscopic displays of a parallax barrier method, in which by seeing an original image display panel provided with an original image for three-dimensional display in which images for both left and right eyes are drawn and imaged on a transparent film through a parallax barrier on which transparent sections and opaque sections are alternatively arranged provided on a transparent plate disposed with a certain interval before the original image display panel, the original image for three-dimensional display can be seen as a three-dimensional image from a viewpoint (Japanese Unexamined Patent Application Publication No. 9-18897).

In such kind of autostereoscopic displays, positions from which the original images for three-dimensional display can be seen as a three-dimensional image are limited with the original images for three-dimensional display for both left and right eyes that are captured by two units of cameras as in the conventional example. However, recently, to attain more three-dimensional viewing positions, it became possible to create original images for three-dimensional display of a plurality of cameras for attaining a plurality of viewpoints by using images captured by a plurality units of cameras and drawings of a plurality of viewpoints using computer graphics, and creating synthetic images of these images.

In such a parallax barrier method, if the visible range is stable, the more the number of the viewpoints, the more transition of three-dimensional video images caused by moving of viewing positions becomes smooth.

Moreover, when more three-dimensional viewing positions are attained by creating original images for three-dimensional display for N viewpoints, if the width of a subpixel is defined as Ph, and an average number of subpixels in a horizontal direction constituting pixels for three-dimensional display for one viewpoint of an autostereoscopic video image created from video images of a plurality of viewpoints is defined as $\alpha$, the interval of horizontally abutting visible light transmitting sections of a parallax barrier constituting the autostereoscopic display is defined as $N\times\alpha Ph$ (a distance between centers of pixels for three-dimensional display that display video images of neighboring viewpoints).

However, there is a problem in the autostereoscopic display using a parallax barrier, in which image quality of the displayed image is degraded. As the viewable ranges of a subject person of video image presentation through the visible light transmitting sections are different, differences are generated in strength of the light that passes through respective visible light transmitting sections and proceeds to the subject person of video image presentation, and the light interferes each other, making interference patterns (moire) seen by the subject person of video image presentation.

Thus, as a method to cancel moire generated depending on the viewing position of a subject person of video image presentation, there has been disclosed a technique that designs a parallax barrier as $D \neq n \times P$ (n is a natural number) where a distance between the centers of abutting slits on the parallax barrier is defined as D, and a pitch of a stripe pattern created by arranging subpixels of the video image display surface of the autostereoscopic display in a horizontal direction is defined as P (refer to Japanese Patent No. 4098612).

SUMMARY OF THE INVENTION

Problems that the Invention is to Solve

Whether moire is viewed by a subject person of video image presentation or not is determined by a correlative relationship among: a distance from the image display surface forming a display to a parallax barrier; a distance from the subject person of video image presentation to the parallax barrier; horizontal and vertical intervals of one or a plurality of visible light transmitting sections that form respective plurality of horizontally abutting slit areas configuring the parallax barrier; a width and a height of subpixels forming the display; a distance between centers of pixels for three-dimensional display that display video images of neighboring viewpoints; and the number of viewpoints used for displaying an autostereoscopic video image. That is, moire is generated caused by different factors, such as, when the visible light transmitting sections are slits, the horizontal interval of the visible light transmitting sections and when the visible light transmitting sections are holes, horizontal and vertical intervals of the visible light transmitting sections.

However, such a concept does not exist in Japanese Unexamined Patent Application Publication No. 9-18897 that uses $D \neq n \times P$ (n is a natural number). In addition, as n is a natural number and is not limited to the number of viewpoints used for displaying an autostereoscopic image, points where moire is not necessarily cancelled are included in this formula.

That is, to adequately cancel moire, a distance D between the centers of abutting slits on a parallax barrier should be formed to always be a slightly smaller value than a value obtained by multiplying a distance $\alpha Ph$ between the centers of pixels for three-dimensional display that display video images of neighboring viewpoints by the number N of viewpoints used for displaying an autostereoscopic image, and a substantially large value than a value obtained by multiplying $\alpha Ph$ by (N−1) as in the following function:

$$(N-1)\times \alpha Ph << D < N \times \alpha Ph$$

Means to Solve the Problems

Thus, in the range of the above value, the present invention employed the following means to cancel moire.

(1) The parallax barrier for an autostereoscopic display according to the invention is provided with a distance Z from an image display surface of a display on which a plurality of pixels each having horizontally arranged three subpixels displaying R, G, and B are arranged in horizontal and vertical directions, values relating to sizes and arrangements of a plurality of visible light transmitting sections and a value of the distance Z are calculated and designed based on a predetermined designing condition, and in autostereoscopic viewing under a condition in which: an average number of subpixels in a horizontal direction constituting pixels for three-dimensional display for one viewpoint of an autostereoscopic video image created from video images of a plurality of viewpoints is defined as $\alpha$; a width of subpixels constituting the display is defined as Ph; a distance between centers of pixels for three-dimensional display that display video images of neighboring viewpoints is defined as αPh; a distance between pupils of left and right eyes of a subject person of video image presentation is defined as W; and a number of viewpoints of the video images for creating the autostereoscopic video image is defined as N, and in a design condition in which: a most appropriate three-dimensionally viewable position is preset and a distance from such a position to the parallax barrier is defined as L1; and a diagonal moire cancelling position is preset and a distance from such a position to the parallax barrier is defined as L2, the parallax barrier is designed by determining a value of the distance Z from the image display surface of the display to the parallax barrier by a following function (1); and determining a value of an interval Hh between a plurality of horizontally abutting visible light transmitting sections constituting the parallax barrier by a following function (2):

$$Z = \frac{\alpha Ph \times L1}{W} \quad (1)$$

$$Hh = \frac{N \times \alpha Ph \times L2}{Z + L2} \quad (2)$$

According to the above structure, for example, a predetermined most appropriate three-dimensionally viewable position and a predetermined diagonal moire cancelling position are set at a position where people are most likely to make a crowd, and the distance Z and the interval of one or a plurality of horizontally abutting visible light transmitting sections can be calculated by reverse calculation from these values. In this way, a subject person of video image presentation at a predetermined diagonal moire cancelling position can always see a predetermined position of pixels for three-dimensional display that display an image of a predetermined viewpoint through visible light transmitting sections of the parallax barrier, and moire is completely cancelled at the predetermined moire cancelling position.

Further, the value of the distance Z can be set based on the value of a distance L1 from the parallax barrier to the predetermined most appropriate three-dimensionally viewable position.

Here, "pixels for three-dimensional display" refers to a collection of subpixels that display R, G, and B that are arrayed for displaying a three-dimensional video image, for example, a collection of subpixels arrayed as shown in FIG. 27. In this specification, horizontally arrayed three subpixels that display R, G, and B is referred to, simply, as a pixel, and the one obtained by blending (changing arrangement of) subpixels that display R, G, and B for displaying an effective three-dimensional video image in consideration of projecting video images for a plurality of viewpoints when displaying a three-dimensional video image is referred to as a pixel for three-dimensional display. However, even when three subpixels that display R, G, and B are arrayed in a horizontal direction, the pixel can display a three-dimensional video image as long as the subpixels display video images for a plurality of viewpoints. Thus, in such a case (a case like in FIG. 32(*iv*)), the pixels can be referred to as a pixel for three-dimensional display.

It should be noted that the display shown in FIG. 27 is a display on which a plurality of pixels in which three subpixels that display R, G, and B are horizontally arrayed are arrayed in horizontal and vertical directions.

Also, "a pixel unit for three-dimensional display" refers to a collection of pixels for three-dimensional display for displaying a three-dimensional video image formed by arraying a plurality of pixels for three-dimensional display that display images for a plurality of viewpoints, for example, as the one arrayed as shown in FIG. 27.

Also, "a most appropriate three-dimensionally viewable position" is a position at which a subject person of video image presentation can obtain a three-dimensional effect particularly effectively. That is, at the most appropriate three-dimensionally viewable position, both eyes of the subject person of video image presentation respectively see the centers of pixels for three-dimensional display for viewpoints intended to be seen through visible light transmitting sections of the parallax barrier.

It should be noted that, at the most appropriate three-dimensionally viewable position, even if the subject person of video image presentation moves leftward or rightward in parallel to the autostereoscopic display, as the left and right eyes continuously see video images for respective viewpoints arranged in a reverse direction to the moving direction, the subject person of three-dimensional image presentation can see the three-dimensional video image effectively.

That is, if cameras are disposed from the left side toward the right side opposing the imaging object when imaging video images of a plurality viewpoints, when displaying the video images of a plurality of viewpoint, a plurality of pixels for three-dimensional display that display images for a plurality of viewpoints are arrayed in a horizontal direction on an autostereoscopic display in a reverse direction to imaging from the right side toward the left side.

In this way, a most appropriate three-dimensionally viewable position may be set at a position where people are most likely to make a crowd, which simplifies designing of the parallax barrier.

Also, "a moire cancelling position" refers to a position where a subject person of video image presentation can see three-dimensional video images effectively with moire being completely diminished. At a predetermined moire cancelling position, the subject person of video image presentation can always see a predetermined position of pixels for three-dimensional display that display images for a predetermined viewpoint by either left or right eye through visible light transmitting sections of the parallax barrier. The moire cancelling effect does not change at the moiré cancelling position even if the subject person of video image presentation moves leftward, rightward, upward, or downward in parallel to the autostereoscopic display. It should be noted that the concept of moire cancelling position includes a diagonal moire cancelling position and horizontal moire cancelling position that will be described later.

That is, moire that need to be cancelled includes moire generated in a diagonal direction such as diagonal stripes and moire generated in a horizontal direction such as horizontal stripes.

Diagonal moire is generated when the slits (visible light transmitting sections) of the parallax barrier of the autostereoscopic display are provided at a slant.

It should be noted that when the slits are provided vertically, vertical moire such as vertical stripes are generated.

On the other hand, horizontal moire are generated when visible light transmitting sections of the parallax barrier are holes or when the shape of the edges of the slits is staircase pattern or a shape in which arcs, elliptic arcs, or polygons are repeated.

With the parallax barrier of the above structure, while moire is adequately cancelled at the predetermined moire cancelling position, when a person moves close to the parallax barrier from the moire cancelling position, moire is gradually generated, and, similarly, when the person moves away from the moire cancelling position, moire is again gradually generated.

However, a position where three-dimensional image can be particularly effectively seen (a most appropriate three-dimensionally viewable position), a position where diagonal moire is cancelled (a diagonal moire cancelling position), and a position where horizontal moire is cancelled (a horizontal moire cancelling position) are different concepts, and the distances from these positions to the parallax barrier are not necessarily the same.

However, if these predetermined moire cancelling position and most appropriate three-dimensionally viewable position are the same distance, three-dimensional images can be most effectively seen over the whole surface of the display.

In this way, if a moire cancelling position and a most appropriate three-dimensionally viewable position are set as different distances, for example, the moire cancelling position is set farther than the most appropriate three-dimensionally viewable position from the parallax barrier, a three-dimensional video image for which moire is cancelled especially for a subject person of video image presentation at far place, can be seen by a subject person of video image presentation without causing a stress attributable to moire to draw attention of the subject person of video image presentation, which leads the subject person of video image presentation to the most appropriate three-dimensionally viewable position, to show particularly effective three-dimensional video images.

However, if a moire cancelling position is arranged at a different position and a subject person of video image presentation sees from a most appropriate three-dimensionally viewable position, some areas on both sides of the display become hard to see.

Let us take an example of a case in which a most appropriate three-dimensionally viewable position (L1) and a diagonal moire cancelling position (L2) are not the same position as in the case of FIG. 69A. For example, if video images for five viewpoints are used for video images for a plurality of viewpoints for displaying a three-dimensional video image, and the right eye of a subject person of video image presentation at a predetermined most appropriate three-dimensionally viewable position sees an image of the third viewpoint and the left eye sees an image of the fourth viewpoint at the center of the display (the third to fourth viewpoints do not always come the center), when the eyes shift from the center to either end of the display, the right eye is supposed to see the second viewpoint and the left eye supposed to see the third viewpoint, or the right eye is supposed to see the fourth viewpoint and the left eye supposed to see the fifth viewpoint. In this way, as an image of a viewpoint seen by the left eye always becomes an image of a viewpoint at right of an image of a viewpoint seen by the right eye, which does not significantly affect the three-dimensional effect. However, at the ends of the display, the right eye sees the first viewpoint and the left eye sees the second viewpoint, or the right eye sees the fifth viewpoint and the left eye sees the first viewpoint, and a jump point is generated at the right end thereof, causing a reverse phenomenon and making some part of the three-dimensional image hard to see. In this way, a reverse phenomenon is generated at most one point within a moire cancelling area (L2n to L3n) which is described later.

Also, "a visible light transmitting section" is a part that comprises a parallax barrier; is provided on a side of the parallax barrier that does not transmit visible light; and transmits visible light. That is, in "a visible light transmitting section" in the invention, the shape of the edge of the slit may be linear, a staircase pattern, a zigzag, or a shape in which certain arcs or elliptic arcs are repeated (a skewered dumpling like shape). Moreover, arrangement of the slit may be a sine arc. Further, the visible light transmitting section may be holes independently arranged on the parallax barrier.

It should be noted that not to transmit visible light means any one of optical characteristics of (1) absorbing visible light, (2) diffusely reflecting visible light, (3) specularly reflecting visible light.

It will be appreciated that "a display" in the invention includes a liquid crystal display, a plasma display, an organic electroluminescence display, and LED in which R, G, and B are arranged in a horizontal direction.

(2) The parallax barrier for an autostereoscopic display according to the invention is provided with a distance Z from an image display surface of a display on which a plurality of pixels each having horizontally arranged three subpixels displaying R, G, and B are arranged in horizontal and vertical directions, values relating to sizes and arrangements of a plurality of visible light transmitting sections and a value of the distance Z are calculated and designed based on a predetermined designing condition, and in autostereoscopic viewing under a condition in which: an average number of subpixels in a horizontal direction constituting pixels for three-dimensional display for one viewpoint of an autostereoscopic video image created from video images of a plurality of viewpoints is defined as α; a width of subpixels constituting the display is defined as Ph; a distance between centers of pixels for three-dimensional display that display video images of neighboring viewpoints is defined as αPh; a distance between pupils of left and right eyes of a subject person of video image presentation is defined as W; a horizontal resolution of the display is defined as Ir; and a number of viewpoints of the video images for creating the autostereoscopic video image is defined as N, and in a design condition in which: a most appropriate three-dimensionally viewable position is preset and a distance from such a position to the parallax barrier is defined as L1; and an appropriate three-dimensionally viewable position is preset as a position closest to the parallax barrier among positions from which one line of diagonal moire is seen, and a distance from such an appropriate three-dimensionally viewable position to the parallax barrier is defined as L2n, the parallax barrier is designed by: determining a value of the distance Z from the image display surface of the display to the parallax barrier by a following function (1); determining a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position by a following formula (3); and, determining a value of an interval Hh between a plurality of horizontally abutting visible light transmitting sections constituting the parallax barrier by a following function (4):

$$Z = \frac{\alpha Ph \times L1}{W} \quad (1)$$

$$Mh = int\left(\frac{3Ir - 1}{N}\right) + 1 \quad (3)$$

$$Hh = \frac{N \times Mh \times \alpha Ph \times L2n}{(Z + L2n) \times (Mh - 1)} \quad (4)$$

(3) Moreover, the parallax barrier for an autostereoscopic display according to the invention is provided with a distance Z from an image display surface of a display on which a plurality of pixels each having horizontally arranged three subpixels displaying R, G, and B are arranged in horizontal and vertical directions; values relating to sizes and arrangements of a plurality of visible light transmitting sections and a value of the distance Z are calculated and designed based on a predetermined designing condition; and in autostereoscopic viewing under a condition in which: an average number of subpixels in a horizontal direction constituting pixels for three-dimensional display for one viewpoint of an autostereoscopic video image created from video images of a plurality of viewpoints is defined as $\alpha$; a width of subpixels constituting the display is defined as Ph; a distance between centers of pixels for three-dimensional display that display video images of neighboring viewpoints is defined as $\alpha$Ph; a distance between pupils of left and right eyes of a subject person of video image presentation is defined as W; a horizontal resolution of the display is defined as Ir; and a number of viewpoints of the video images for creating the autostereoscopic video image is defined as N, and in a design condition in which: a most appropriate three-dimensionally viewable position is preset and a distance from such a position to the parallax barrier is defined as L1; and an appropriate three-dimensionally viewable position is preset as a position farthest to the parallax barrier among positions from which one line of diagonal moire is seen, and a distance from such an appropriate three-dimensionally viewable position to the parallax barrier is defined as L2f, the parallax barrier is designed by: determining a value of the distance Z from the image display surface of the display to the parallax barrier by a following function (1); determining a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position by a following formula (3); and determining a value of an interval Hh between a plurality of horizontally abutting visible light transmitting sections constituting the parallax barrier by a following function (5):

$$Hh = \frac{N \times (Mh - 2) \times \alpha Ph \times L2f}{(Z + L2f) \times (Mh - 1)} \quad (5)$$

According to the invention, the value of the interval Hh of a plurality of horizontally abutting visible light transmitting sections constituting the parallax barrier can be calculated based on the value from a position where one line of diagonal moire is seen to the parallax barrier, L2n or L2f, instead of the distance L2 from the predetermined diagonal moire cancelling position to the parallax barrier, At a moire cancelling position, while moire is completely cancelled and a three-dimensional video image can be seen particularly effectively, moire is gradually seen when moving closer to or away from the parallax barrier from the moire cancelling position.

However, even when moire is generated, a person as a subject person of video image presentation can see a three-dimensional video image effectively without feeling a stress of seeing moire as long as the moire is only one.

Thus, it is possible to design an interval Hh between a plurality of horizontally abutting visible light transmitting sections constituting the parallax barrier by assuming a position from which at most one line of moire is seen as a maximum distance within which a subject person of video image presentation can move close to the autostereoscopic display or away from the autostereoscopic display while effectively seeing a three-dimensional video image (an appropriate moire cancelling area). In this way, it is possible to provide a clear three-dimensional video image by clearly indicating the appropriate moire cancelling area to the subject person of video image presentation, or to adjust and set the moire cancelling area to an area where people are most likely to make a crowd.

It should be noted that the total number Ux of pixel units for three-dimensional display in a horizontal direction becomes as follows by defining the number of viewpoints for three-dimensional display as N, and a horizontal resolution as Ir:

$$Ux = 3 \times Ir/N$$

Here, the total number of visible light transmitting sections in a horizontal direction constituting the parallax barrier is required to be equal to or more than the total number Ux of pixel units for three-dimensional display in a horizontal direction. This is because, as a three-dimensional video image is seen from left and right sides in addition to the front, the visible light transmitting sections should be additionally provided so that pixels at both ends of the image display surface of the display can be seen, requiring additional visible light transmitting sections at left and right sides thereof.

Also, the number Mh of visible light transmitting sections in a horizontal direction from a visible light transmitting section of the parallax barrier corresponding to a pixel unit for three-dimensional display at the left end of the display to a visible light transmitting section of the parallax barrier corresponding to a pixel unit for three-dimensional display at the right end of the display seen from a predetermined diagonal moire cancelling position is, as shown in FIG. 55A, the number of the visible light transmitting sections of the parallax barrier required so that a subject person of video image presentation at a position of a predetermined diagonal moire cancelling position (L2) sees all pixels for three-dimensional display that display video images for the same viewpoint on a display and obtains an effective three-dimensional effect of the autostereoscopic display.

(4) It is preferable that, in the parallax barrier for an autostereoscopic display according to the invention, in autostereoscopic viewing under a condition in which: a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is a plurality of independently formed holes; a number of one unit of the visible light transmitting sections of the repeated shapes or the visible light transmitting sections of the plurality of holes in a vertical direction corresponding to one subpixel is defined as β; and a height of subpixels forming the display is defined as Pv, and in a design condition in which: the distance Z is calculated by the formula (1); and a horizontal moire cancelling position is preset and a distance from such a position to the parallax barrier is defined as L3, the parallax barrier is designed by: determining a value of an interval Hv between vertically abutting visible light transmitting sections of the staircase patterned or the skewered dumpling like shaped, or the plurality of holes by a following formula (6):

$$Hv = \frac{Pv \times L3}{(Z+L3) \times \beta} \quad (6)$$

As described above, if the shape of the edges of the slits as visible light transmitting sections constituting the parallax barrier is a staircase pattern, or a shape in which any of circular arcs, elliptic arcs, and polygons are repeated, or the visible light transmitting sections constituting the parallax barrier are a plurality of independently formed holes, as the parallax barrier displays a horizontal stripe pattern in addition to diagonal and vertical stripe patterns, an autostereoscopic display comprising the parallax barrier may generate horizontal moire.

That is, if the shape of the edges of the slits as visible light transmitting sections constituting the parallax barrier is a staircase pattern, or a shape in which any of circular arcs, elliptic arcs, and polygons are repeated, or the visible light transmitting sections are a plurality of holes, a certain kind of pattern is formed in a horizontal direction on a parallax barrier, unlike a case in which the shape of the edges of the slits of the parallax barrier is linear. For this reason, the ranges of pixels that can be seen through the visible light transmitting sections of the parallax barrier by a subject person of video image presentation become different, generating difference in strength of light that proceeds toward the subject person of video image presentation through the visible light transmitting sections. As the result, the lights interfere one another and the subject person of video image presentation may see linear interference stripes in a horizontal direction.

In this way, as the subject person of video image presentation cannot see a three-dimensional video image effectively when horizontal moire is generated, while cancelling the diagonal moire, vertical moire is also required to be cancelled.

Therefore, according to the above structure, according to the above structure, for example, a predetermined horizontal moire cancelling position is set at a position where people are most likely to make a crowd, and, by reverse calculation from these values, an interval Hv of vertically abutting visible light transmitting sections of the repeated shape or vertically abutting visible light transmitting sections of the plurality of holes can be calculated. In this way, a subject person of video image presentation at the predetermined horizontal moire cancelling position can always see a predetermined position of pixels for three-dimensional display that display an image of a predetermined viewpoint through the visible light transmitting sections of the parallax barrier, and moire is completely cancelled at the predetermined moire cancelling position.

Here, the case in which the shape of the edges of the slits is a staircase pattern refers to a case as shown as examples in FIGS. 10A and 10B.

The case in which the shape of the edges of the slits is circular arcs refers to a case as shown as examples in FIGS. 10C, 10D, and 10E.

Also, the case in which the shape of the edges of the slits are elliptic arc refers to a case as shown as examples in FIGS. 11A and 11B.

Also, the case in which the shape of the edges of the slits is a shape in which apertures of polygons are repeated refers to a case as shown as examples in FIGS. 12A, 12B, 12C, 12D, and 12E.

Also, the case in which the shape of the visible light transmitting sections is apertures of a plurality of independently formed holes refers to a case, as shown as examples in FIGS. 13A to 13D, 14A, 14B, and 15A to 15E, in which the holes are formed by surrounding the visible light transmitting sections by mask part of the parallax barrier.

Also, in such a case, one unit of a series of edges of slits or a visible light transmitting section may be used for one subpixel as shown in FIGS. 36A and 36B, one unit of a plurality of series of edges of slits or a plurality of visible light transmitting sections may be used for one subpixel as shown as examples in FIGS. 36B and 36E, or one unit of a series of edges of slits or a visible light transmitting section may be used for a plurality of subpixels as shown as examples in FIGS. 36A to 36F.

In this way, the value of coefficient β changes depending on a correlative relationship between the number of subpixels and the number of corresponding one unit of a series of edges of slits or visible light transmitting sections.

That is, β is a number of one unit of visible light transmitting sections of the repeated shape or of visible light transmitting sections of the plurality of holes in a horizontal direction.

Also, "the number of one unit of visible light transmitting sections of the repeated shape" refers to, for example, if the shape of the slits as visible light transmitting sections of the parallax barrier is elliptic arcs, the number of how many elliptic arcs are formed on each slit corresponding to the array of pixels for three-dimensional display that display a video image of the same viewpoint.

Also, "the number of the visible light transmitting sections of a plurality of holes" refers to the number of how many visible light transmitting sections of a plurality of holes are formed in a vertical direction corresponding to the array of pixels for three-dimensional display that display a video image of the same viewpoint.

(5) It is preferable that, in the parallax barrier for an autostereoscopic display of the invention, generation of a horizontal moire is prevented by irregularly arranging only vertical arrangement positions (arrangement starting positions) of the plurality of visible light transmitting sections of the staircase patterned, the skewered dumpling like shaped, or the plurality of holes for each of the slits that abut in a horizontal direction.

According to this, as the arrangement positions of the visible light transmitting sections in a vertical direction of the parallax barrier become irregular, moire generated for each slit also becomes irregular and continuity of the horizontal moire disappears, whereby significant horizontal moire is not generated any more.

(6) It is preferable that in the parallax barrier for an autostereoscopic display, the irregularity is characterized by determining the arrangement positions (arrangement starting positions) using random digits. In this way, the parallax barrier can have irregularity more surely and simply by generating random digits.

(7) It is preferable that, in the parallax barrier for an autostereoscopic display of the invention in autostereoscopic viewing, under a condition in which: a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is a plurality of independently formed holes; a number of one unit of the visible light transmitting sections of the repeated shapes or the visible light transmitting sections of the plurality of holes in a vertical direction corresponding to one subpixel is defined as $\beta$; a vertical resolution of the display is defined as Jr; and a height of subpixels forming the display is defined as Pv, and in a design condition in which: the distance Z is calculated by the formula (1); and a position closest to the parallax barrier among positions from which one line of horizontal moire is seen is preset, and a distance from such a position to the parallax barrier is defined as L3n, the parallax barrier is designed by: determining a value of a number Mv of one unit of the visible light transmitting sections of the repeated shape or visible light transmitting sections of the plurality of holes in a vertical direction from a visible light transmitting section of the shape corresponding to a subpixel at an upper end of the display to a visible light transmitting section of the shape corresponding to a subpixel at a lower end of the display seen from a horizontal moire cancelling position by a following formula (7); and determining a value of an interval Hv of vertically abutting visible light transmitting sections of the staircase patterned, the skewered dumpling like shaped, or the plurality of holes by a following formula (8):

$$Mv = Jr \times \beta \qquad (7)$$

$$Hv = \frac{(Jr - 1/\beta + 1) \times Pv \times L3n}{(Z + L3n) \times (Mv - 1)} \qquad (8)$$

(8) It is preferable that, in the parallax barrier for an autostereoscopic display of the invention, in autostereoscopic viewing under a condition in which: a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is a plurality of independently formed holes; a number of one unit of the visible light transmitting sections of the repeated shape or the visible light transmitting sections of the plurality of holes in a vertical direction corresponding to one subpixel is defined as $\beta$; a vertical resolution of the display is defined as Jr; and
a height of subpixels forming the display is defined as Pv, and in a design condition in which: the distance Z is calculated by the formula (1); and a position farthest to the parallax barrier among positions from which one line of diagonal moire is seen is preset, and a distance from such a position to the parallax barrier is defined as L3f, the parallax barrier is designed by: determining a value of a number Mv of one unit of the visible light transmitting sections of the repeated shape or visible light transmitting sections of the plurality of holes in a vertical direction from a visible light transmitting section of the shape corresponding to a subpixel at an upper end of the display to a visible light transmitting section of the shape corresponding to a subpixel at a lower end of the display seen from a horizontal moire cancelling position by a following formula (7); and determining a value of an interval Hv of vertically abutting visible light transmitting sections of the staircase patterned, the skewered dumpling like shaped, or the plurality of holes by a following formula (9):

$$Hv = \frac{(Jr - 1/\beta - 1) \times Pv \times L3f}{(Z + L3f) \times (Mv - 1)} \qquad (9)$$

According to the invention, the value of interval Hv between visible light transmitting sections of the repeated shape or visible light transmitting sections of the plurality of holes that abut one another in a vertical direction and constitute the parallax barrier can be calculated based on the value of the distance L3n or L3f from a position where one line of horizontal moire is seen to the parallax barrier instead of the distance L3 from the predetermined horizontal moire cancelling position to the parallax barrier.

As described above, while moire is gradually generated when moving close to or away from the parallax barrier from the moire cancelling position, the three-dimensional video image can be seen without causing a stress of seeing moire as long as the generated moire is one or less.

Therefore, an interval Hh between a plurality of vertically abutting visible light transmitting sections constituting the parallax barrier can be designed by assuming a position from which at most one line of moire is seen as a maximum distance within which a subject person of video image presentation can see an effective three-dimensional video image while moving close to the autostereoscopic display or away from the autostereoscopic display (an appropriate moire cancelling area), which enables provision of a clear three-dimensional video image by clearly indicating the appropriate moire cancelling area to the subject person of video image presentation or adjusting and setting the moire cancelling area to an area where people are most likely to make a crowd.

(9) It is preferable that, in the parallax barrier for an autostereoscopic display of the invention, in autostereoscopic viewing under a condition in which: a distance between pupils of left and right eyes of a subject person of video image presentation is defined as W; a width of an effective viewable area seen by one eye of the subject person of video image presentation through visible light transmitting sections of width Sh constituting the parallax barrier from the most appropriate three-dimensionally viewable position is defined as Vh; an average number of subpixels in a horizontal direction constituting pixels for three-dimensional display for one viewpoint of an autostereoscopic video image created from video images of a plurality of viewpoints is defined as $\alpha$; a width of subpixels constituting the display is defined as Ph; and a distance between centers of pixels for three-dimensional display that display video images of neighboring viewpoints is defined as $\alpha$Ph, the parallax barrier is designed by: determining a value of the width Sh of the visible light transmitting sections constituting the parallax barrier by a following formula (10):

$$Sh = \frac{W \times Vh}{W + \alpha Ph} \quad (10)$$

According to the above structure, an appropriate width Sh of visible light transmitting sections of the parallax barrier can be calculated based on an arbitrary value of width Vh of effective viewable area seen by one eye of the subject person of video image presentation through the visible light transmitting sections constituting the parallax barrier.

Here, "an effective viewable area" refers to a range on an image display surface that a subject person of video image presentation can see through the visible light transmitting sections of the parallax barrier. The width of the effective viewable area is a design matter that can be arbitrary widened or narrowed by a designer. If the width of the effective viewable area is set narrow, the popping out degree of the three-dimensional video image felt by the subject person of video image presentation becomes large, while, if the width of the effective viewable area is designed wide, the jump points can be diminished by mixing views.

An effective viewable area seen by one eye through the visible light transmitting sections of the parallax barrier is controlled by simultaneously seeing pixels for three-dimensional display of a neighboring viewpoint disposed at left and/or right of pixels for three-dimensional display that are intended to be seen to cause mixing of views and diminish jump points.

In this way, as an effective viewable area is seen by being somewhat overlapped by another effective viewable area seen by another eye from the most appropriate three-dimensionally viewable position, the viewpoints transit smoothly by mixing views when a subject person of video image presentation moves leftward or rightward.

It should be noted that the width of the effective viewable area is in the discretion of a designer of the parallax barrier upon designing of how to present a three-dimensional video image such as whether narrowing the width thereof to enhance popping out degree of the three-dimensional image or widening the width to diminish jump points. However, the width of the effective viewable area must be equal to the width of pixels for three-dimensional display that display images of intended viewpoints or more.

It should be noted that a jump point is a position where a reverse phenomenon occurs in which, for example, in a case of a three-dimensional video image of five viewpoints, when a subject person of video image presentation sees a video image for right eye for the fifth viewpoint by the right eye and a video image for left eye for the first viewpoint by the left eye, an object in front is seen in the back and an object in the back is seen in front. That is, a jump point is a position where, when moving rightward from a position from which a three-dimensional effect can be adequately obtained, the left eye sees a video image of fifth viewpoint for right eye and the right eye sees a video image of first viewpoint for left eye, whereby an inappropriate reverse phenomenon is obtained, which, in some cases, makes the subject person of video image presentation feel sick.

To overcome this, by causing the subject person of video image presentation to gradually see pixels for three-dimensional display that display a video image for each viewpoint intended to be seen by either right eye or left eye and pixels for three-dimensional display that display a video image for neighboring viewpoints, a position where a three-dimensional image can be appropriately seen through the visible light transmitting sections and a position where a reverse phenomenon occurs can be simultaneously seen as vertically arranged positions by mixing views, whereby, although the popping out objects are seen doubly blurred, jump points can be diminished by suppressing the reverse phenomenon.

It should be noted that, while the visible light transmitting sections are a part that actually exists on a parallax barrier, the effective viewable area is an area that can be conceptually imagined.

The effective viewable area Vh can be calculated as $\delta \times \alpha Ph$. Here, $\delta$ is a coefficient indicating how large the value Vh is compared to the value of $\alpha Ph$.

(10) It is preferable that in the designing method of the parallax barrier for an autostereoscopic display of the invention, wherein, in autostereoscopic viewing under a condition in which: a shape of an edge of slits as the visible light transmitting sections constituting the parallax barrier is a staircase pattern, or a skewered dumpling like shape in which any of circular arcs, elliptic arcs, and polygons are repeatedly concatenated, or the shape of the visible light transmitting sections constituting the parallax barrier is independently formed plurality of holes; a height of a predetermined effective viewable area seen from a subject person of video image presentation through visible light transmitting sections of height Sv constituting the parallax barrier from the most appropriate three-dimensionally viewable position is defined as Vv; an interval of the visible light transmitting sections of the plurality of holes that abut one another in a vertical direction of the parallax barrier is defined as Hv; and an aperture ratio (a coefficient for Hv) of the vertical direction is defined as $\lambda$, and in a design condition in which: a most appropriate three-dimensionally viewable position is preset, and a distance from such a position to the parallax barrier is defined as L1; and the distance Z is calculated by the formula (1), a value of the height Sv of visible light transmitting sections of the staircase patterned, the skewered dumpling like shaped, or the plurality of holes is determined by a following formula (11) or (11)':

$$Sv = \frac{L1 \times Vv}{(L1 + Z)} \quad (11)$$

$$Sv = \lambda \times Hv \quad (11)'$$

According to the above structure, even if the shape of the edges of the slits of visible light transmitting sections constituting the parallax barrier is a staircase pattern, or a shape in which circular arcs, elliptic arcs, or polygons are repeated, or the shape of the visible light transmitting sections is apertures of a plurality of independently formed holes, the distance L1 from the subject person of video image presentation at the most appropriately viewable position to the parallax barrier and a height Vv of effective viewable area seen through the visible light transmitting sections by the subject person of video image presentation at the most appropriately viewable position are defined as predetermined values, and, based on the values, the height Sv of one unit of the repeated shape of the parallax barrier or the height of the visible light transmitting sections can be calculated by reverse calculation.

Also, based on the value of an interval Hv between the visible light transmitting sections of the plurality of holes that abut in a vertical direction of the parallax barrier, the value of the height Sv can be calculated by multiplying a coefficient λ which represents how short the value of the height Sv is compared with the value of the interval Hv.

In this way, the parallax barrier may be easily designed by setting the most appropriate three-dimensionally viewable position to a position where people are most likely to make a crowd and setting the height Vv of the effective viewable area in consideration of needs and situations of the subject person of video image presentation.

It should be noted that the value of the height Vv of the effective viewable area should necessarily be slightly smaller than the value of the height of pixels for three-dimensional display. That is, the height Vv of the effective viewable area can be expressed by the following formula when the number of vertically concatenated subpixels that constitute a pixel for three-dimensional display is defined as ε and the height of each subpixel as Pv.

$$Vv \leq \epsilon \times Pv$$

(11) It is preferable that, in the designing method of the parallax barrier for an autostereoscopic display of the invention, wherein: using the distance Z calculated by the formula (1); a distance W between pupils of left and right eyes of a subject person of video image presentation; and a width Vh of an effective viewable area seen by one eye of the subject person of video image presentation through visible light transmitting sections of width Sh constituting the parallax barrier from the most appropriate three-dimensionally viewable position, the parallax barrier is designed by: determining a shortest distance L1n within an appropriate three-dimensionally viewable area by a following formula (12); determining a longest distance L1f within the appropriate three-dimensionally viewable area by a following formula (13); and presetting a distance L2 from the diagonal moire cancelling position to the parallax barrier within the appropriate three-dimensionally viewable area from L1n to L1f:

$$L1n = \frac{Z \times W}{Vh} \quad (12)$$

$$L1f = \frac{2 \times Z \times W}{Vh} \quad (13)$$

According to the above structure, as a moire cancelling position can be formed in a range where a three-dimensional video image can be most effectively seen, moire can be cancelled while providing a three-dimensional effect to a subject person of video image presentation.

"An appropriate three-dimensionally viewable area" is a range of a distance from the subject person of video image presentation to the parallax barrier, in which a subject person of video image presentation can appropriately see a three-dimensional video image. A three-dimensional effect can be obtained even outside the appropriate three-dimensionally viewable area, while a three-dimensional effect cannot be obtained effectively.

Here, the shortest distance L1n of the appropriate three-dimensionally viewable area is a position in which effective viewable areas seen by both eyes do not overlap and an area where both eyes cannot see is not generated at the center. The three-dimensional image can be effectively and clearly seen from this L1n to L1. It should be noted that the three-dimensional effect gradually diminishes behind L1 and eventually a two dimensional video image is seen, and the longest distance L1f in the appropriate three-dimensional viewable area is approximately twice the value of L1n when the value of the width Vv of the effective viewable area and the value of the distance αPh between the centers of pixels for three-dimensional display that display a video image of neighboring viewpoints are the same values, despite there are differences attributable to the popping out degree of the contents and differences among individuals. Also, when moving closer to L1n, while a parallax becomes large and the three-dimensional effect is enhanced, the image is gradually defocused.

Therefore, an appropriate three-dimensionally viewable area from L1n to L1f is a range in which an appropriate three-dimensional effect can be obtained.

In this way, calibration of the interval Hh between the visible light transmitting sections for cancelling moire may be performed by defining a position where people are most likely to make a crowd in a range from L1n to L1f as a moire cancelling position.

It should be noted that the design of the distance Z from the image display surface of the display to the parallax barrier can be calculated by calculation using whether L1, L1n, or L1f.

(12) It is preferable that, in the designing method of the parallax barrier for an autostereoscopic display of the invention, wherein: a distance L1 from the most appropriate three-dimensionally viewable position to the parallax barrier is set as a same distance as a distance L2 from the diagonal moire cancelling position to the parallax barrier.

According to the structure, diminishing of jump points and cancelling of diagonal moire can be simultaneously achieved at the same position.

(13) it is preferable that, in the parallax barrier for an autostereoscopic display of the invention, wherein: a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is independently formed plurality of holes; values relating to sizes and arrangements of the plurality of visible light transmitting sections and a value of the distance Z are calculated and designed based on a predetermined design condition; and a distance L1 from the most appropriate three-dimensionally viewable position to the parallax barrier is preset as a same distance as a distance L2 from the diagonal moire cancelling position to the parallax barrier and a distance L3 from the horizontal moire cancelling position to the parallax barrier.

According to the above structure, diminishing of jump points, cancelling of diagonal moire, and cancelling of horizontal moire can be simultaneously achieved at the same position.

That is, if a most appropriate three-dimensionally viewable position and a diagonal moire cancelling position are the same position, for example, when video images for five viewpoints are used as video images for a plurality of viewpoints that display a three-dimensional video image as shown in FIG. 69B, if, at a predetermined most appropriate three-dimensionally viewable position, the right eye sees an image of the third viewpoint and the left eye sees an image of the fourth viewpoint in the center of the display, the right eye sees the image of the third viewpoint and the left eye sees the image of the fourth viewpoint over the whole surface of the display. As the result, jump points are not generated anywhere and the subject person of video image presentation can see an appropriate three-dimensional video image.

(14) It is preferable that, in the parallax barrier for an autostereoscopic display of the invention, in autostereoscopic viewing under a condition in which: an average number of subpixels in a horizontal direction constituting pixels for three-dimensional display for one viewpoint of an autostereoscopic video image created from video images of a plurality of viewpoints is defined as α; a width of subpixels constituting the display is defined as Ph; and a distance between centers of pixels for three-dimensional display that display video images of neighboring viewpoints is defined as αPh, the parallax barrier is designed by: defining a maximum area on an image display surface intended to be seen by one eye of a subject person of video image presentation through visible light transmitting sections of width Sh constituting the parallax barrier from the most appropriate three-dimensionally viewable position as a rectangular area; determining a width Vh max of the rectangular area as being 2×αPh or more and less than 3×αPh; determining a width Vh of a predetermined effective viewable area seen by one eye of the subject person of video image presentation through visible light transmitting sections of width Sh constituting the parallax barrier as being αPh or more and Vh max or less.

To mix views and diminish jump points, the width of the effective viewable area is required to be larger than the distance between the centers of pixels for three-dimensional display that display video images of neighboring viewpoints, and not only pixels for three-dimensional display that display a video image of one viewpoint but also pixels for three-dimensional display that display video images of neighboring viewpoints are required to be seen by the subject person of video image presentation. However, if the width of the effective viewable area becomes too large, the subject person of video image presentation sees video images of a plurality of viewpoints at once and the three-dimensional video image seen by the subject person of video image presentation is blurred, while, if the width of the effective viewable area becomes too small, even pixels for three-dimensional display that display a video image of one viewpoint cannot be seen.

Thus, the width Vh max of a rectangular area on an image display surface having a predetermined width and predetermined height as a maximum area on the image display surface intended to be seen by a subject person of video image presentation at a predetermined most appropriate three-dimensionally viewable position through visible light transmitting sections of width Sh constituting a parallax barrier is defined as equal to 2αPh or more and less than 3αPh, and, even if the width of the rectangular area and the width of the effective viewable area are not the same, the width Vh of a predetermined effective viewable area seen by one eye of a subject person of video image presentation through visible light transmitting sections of width Sh constituting the parallax barrier is defined as equal to 1αPh or more and equal to the Vh max or less, whereby an effective three-dimensional effect can be maintained while adequately mixing views and diminishing jump points.

That is, as illustrated in FIGS. 24A to 24E, when concatenation of subpixels are considered, if the width Vh of the effective viewable area is not a value twice the average width of a pixel for three-dimensional display (2αPh) or more, a range in which a subject person of video image presentation sees subpixels that display an intended video image becomes narrow at this concatenating position, and the three-dimensional video image cannot be seen appropriately by the subject person of video image presentation.

Thus, the width Vh max of the rectangular area is required to be 2αh or more so that the subject person of video image presentation can see a three-dimensional video image appropriately even at a concatenating position of the subpixels.

On the other hand, if the width Vh max of the rectangular area is equal to 3αPh or more, subpixels that display a video image other than the one intended to be seen by the subject person of video image presentation is seen by the subject person of video image presentation, and the three-dimensional video image becomes unclear. For this reason, the width Vh max of the rectangular area is required to be less than 3αPh.

Also, even when the width of the rectangular area and the width of the effective viewable area are not the same, the value of the width Vh of the effective viewable area seen by one eye of a subject person of video image presentation is required to be 1αPh or more and the Vh max or less for causing the three-dimensional video image to be appropriately seen.

As illustrated in FIG. 24A, if the effective viewable area is a parallelogram within the rectangular area and the value of the width Sh thereof is smaller than the value of the width Vh max of the rectangular area, the three-dimensional video image seen by the subject person of video image presentation becomes sharper, while mixing of views is relatively hard to occur.

On the other hand, as illustrated in FIG. 24B, if the value of the width Sh of the effective viewable area and the value of the width Vh max of the rectangular area are the same, while mixing of views occurs more often and the three-dimensional effect of the video image is somewhat lost, jump points can be effectively diminished.

(15) It is preferable that, in the designing method of the parallax barrier for an autostereoscopic display of the invention, wherein, in autostereoscopic viewing under a condition in which: an interval of vertically abutting subpixels is defined as Hpv; and a number of one unit of the visible light transmitting sections of the repeated shape or the visible light transmitting sections of the plurality of holes in a vertical direction corresponding to one subpixel is defined as β, the parallax barrier is designed by determining an interval Hv of vertically abutting visible light transmitting sections of the staircase patterned, the skewered dumpling like shaped, or the plurality of holes using an equation Hv=Hpv/β (β is a natural number).

It should be noted that an interval Hv between vertically abutting visible light transmitting sections that exceeds an interval Hpv between the vertically abutting subpixels is excluded.

As in the above structure, the fine horizontal stripes can be cancelled by defining the value of Hv as the value that satisfies a relationship indicated by the above equation.

If the shape of the edges of the slits as visible light transmitting sections constituting the parallax barrier is a staircase pattern, or a shape in which circular arcs, elliptic arcs, or polygons are repeated, or the shape of the visible light transmitting sections constituting the parallax barrier is a plurality of independently formed holes, fine horizontal stripes corresponding to the intervals of vertically concatenated visible light transmitting sections are generated, which could degrade the image quality of the three-dimensional image.

These fine horizontal stripes are not horizontal moire that is cancelled at the horizontal moire cancelling position, and are a stripe pattern that can only be seen when the subject person of three-dimensional video image presentation moves close to the monitor, and may be minutely generated in correspondence to the intervals of vertically concatenated visible light transmitting sections.

For example, fine horizontal stripes are seen only when the distance from the subject person of video image presentation to the monitor is as short as 2 to 30 cm with a 17 inch monitor. However, with a 40 inch monitor or larger one, horizontal stripes are seen by the subject person of video image presentation even though the person is away from the monitor by approximately 50 cm to 100 cm.

Therefore, with a large monitor, as image quality of a three-dimensional image is degraded particularly by generation of the fine horizontal stripes, it is effective to set the value of the Hv as the value that satisfies the relationship indicated by the equation.

It should be noted that, as the horizontal moire is not generated at all in the appropriate moire cancelling area, fine horizontal stripes are not very significant with small or middle sized monitors of up to some 17 inch. The moire can be ignored particularly when the interval of the visible light transmitting sections is smaller than the interval of vertically abutting subpixels. It will be appreciated that the moire can be ignored when the interval of visible light transmitting sections is a fraction of the interval of the subpixels even with a large monitor.

It should be noted that the interval Hv of the vertically abutting visible light transmitting sections that exceeds the interval Hpv of the vertically abutting subpixels is eliminated.

(16) It is preferable that, in the parallax barrier for an autostereoscopic display of the invention, wherein a calibration line of vertical slit shape that transmits visible light is provided at least either left end or right end thereof, and the parallax barrier is fixed to the display by calibration operation by: being placed on the display; adjusting a position so that visible light seen through the calibration line becomes a same color; and being moved in a parallel manner to a position at which a subject person of video image presentation does not see the calibration line.

According to the above structure, calibration conducted when setting the parallax barrier to the display can be accurately performed.

That is, calibration lines that transmit vertical visible light used when an operator performs calibration to set the parallax barrier are provided on both ends of the parallax barrier. In calibration, when the distance from the parallax barrier to one eye of the operator is defined as L4, the visible light transmitting sections of the parallax barrier become appropriate inclination to the display when the color of pixels seen through the calibration lines from L4 looks one color from top to bottom. In this state, calibration is completed by moving the parallax barrier to an appropriate position while maintaining the inclination of the visible light transmitting sections of the parallax barrier. The appropriate position of the parallax barrier is that when the center of the display and the center of the parallax barrier are almost at the same position and, for example, the display displays an image of the third viewpoint of a three-dimensional image for a plurality of viewpoints that displays five viewpoint video images white and other images black, an image seen by one eye through the parallax barrier from the most appropriate three-dimensionally viewable position right in front of the monitor may evenly look white.

(17) It is preferable that, in the parallax barrier for an autostereoscopic display of the invention, wherein a width of the calibration line Ch is determined by a following formula (14) using a width Ph of subpixels forming the display, and a distance L4 from one eye of an operator to the parallax barrier when performing the calibration operation $$Ch = \frac{L4 \times Ph}{Z + L4} \qquad (14)$$

When performing a calibration operation as described above, if the width Ch of calibration lines is wider than the width Ph of subpixels, neighboring subpixels are also seen and accurate calibration cannot be performed. Also, if the width Ch of the calibration lines is too narrow than the width Ph of the subpixels, appropriate inclination of visible light transmitting sections of the parallax barrier cannot be confirmed and accurate calibration cannot be performed. Thus, calibration operation can be performed more accurately by calculating the width of appropriate calibration lines using the formula (14).

The distance L4 from one eye of the operator to the parallax barrier upon performing calibration operation may be calculated as a length of the reach of the operator from the pupil of the one eye of the operator when calibration operation is manually performed.

(18) In the designing method of a parallax barrier for an autostereoscopic display of the invention, wherein the distance Z from an image display surface of the display to the parallax barrier may be determined by, instead of the formula (1), the following formula (15) using: a width Vh of an effective viewable area seen by one eye through visible light transmitting sections of width Sh from a shortest distance L1n from the parallax barrier to a predetermined appropriate three-dimensionally viewable area; and a distance W between pupils of left and right eyes of a subject person of video image presentation:

$$Z = \frac{Vh \times L1n}{W} \qquad (15)$$

(19) The distance Z from an image display surface forming the display to the parallax barrier may be determined by, instead of the formula (1), the following formula (16) using: a width Vh of an effective viewable area seen by one eye through visible light transmitting sections of width Sh from a longest distance L1f from the parallax barrier to a predetermined appropriate three-dimensionally viewable area; and a distance W between pupils of left and right eyes of a subject person of video image presentation:

$$Z = \frac{Vh \times L1f}{2W} \qquad (16)$$

According to the invention, the value of the distance Z can be calculated based on the value of the shortest distance L1n or the longest distance L1f from the parallax barrier to the appropriate three-dimensionally viewable area, instead of the value of the distance L1 from the parallax barrier to the most appropriate three-dimensionally viewable position.

(20) It is preferable that the parallax barrier for an autostereoscopic display of the invention is a plasma display, and, in a case in which: a shape of visible light transmitting sections constituting the parallax barrier is a plurality of independently formed holes; a width of the visible light transmitting sections constituting the parallax barrier is defined as Sh; a height of the visible light transmitting sections of the plurality of holes is defined as Sv; and an effective maximum amplitude that blocks electromagnetic waves generated from the plasma display is defined as Er, the parallax barrier is designed by: determining a value of a number β of the visible light transmitting sections in a vertical direction corresponding to the one subpixel by a following formula (17) (calculating a smallest integer equal to or more than a value calculated by calculation between ⌈s the same goes for a formula (18)); determining a value of a number γ of the visible light transmitting sections in a horizontal direction corresponding to the one subpixel by the following formula (18); and forming with material that blocks electromagnetic waves generated from the plasma display:

$$\beta = \lceil \frac{Sv}{Er} \rceil \qquad (17)$$

$$\gamma = \lceil \frac{Sv}{Er} \rceil \qquad (18)$$

The plasma display is required to be provided with an electromagnetic wave shield made with electrically conductive material in front of the plasma panel to prevent health problems caused by electromagnetic waves to human body.

Here, a parallax barrier is required to be provided further before the plasma panel to produce an autostereoscopic display of a parallax barrier method using a plasma display, making the whole device large.

Also, while the steps of producing and embedding the parallax barrier are additionally required, the yield of the plasma display that requires a lot of high cost components becomes very poor.

Thus, by making one component to function both as an electromagnetic wave shield and a parallax barrier, the number of steps decreases and the yield is improved, which is convenient.

The parallax barrier of the invention provides a significant advantage that, as described above, the parallax barrier also functions as an electromagnetic wave shield and can be produced only in one step, thus, the autostereoscopic display using a plasma display can be easily produced.

It is preferable that the parallax barrier is formed with electronically conductive material.

The parallax barrier also functions as an electromagnetic wave shield by using electronically conductive material for the parallax barrier.

In such a case, there is an advantage that the parallax barrier and electromagnetic wave shield can be formed in one step.

Particularly, it is an extremely significant advantage that displacement of arrangements of the parallax barrier and electromagnetic wave shield can be eliminated regardless of the accuracy of printing.

It is preferable to mix electrically conductive material with the original material of parallax barrier when forming a parallax barrier by printing.

The parallax barrier is preferably formed by being superimposed by an electromagnetic wave shield.

The parallax barrier also functions as an electromagnetic wave shield by superimposing and forming an electromagnetic wave shield on the parallax barrier.

In such a case, the use amount of high cost electrically conductive material can be minimized.

The parallax barrier is preferably formed by being superimposed with the electromagnetic wave shield.

In the parallax barrier, when the length of the slits or the visible light transmitting sections in a longitudinal direction exceeds a predetermined width required to block electromagnetic waves, the slits and visible light transmitting sections are preferably divided into two or more areas by the electromagnetic wave shield.

In such a case, even when the height and width of the slits or holes as visible light transmitting sections of the parallax barrier exceed the width of design standard required for the parallax barrier to also function as an electromagnetic wave shield, the height and width of the slits and holes can be within the design standard by dividing or partitioning the slits or holes.

It should be noted that the width Sh of visible light transmitting sections and the height Sv of visible light transmitting sections refer to the width and height of visible light transmitting sections when one visible light transmitting section is provided for one subpixel. In other words, β and γ herein indicate the values of how many divisions of one visible light transmitting section for one subpixel are provided in horizontal and vertical directions.

Therefore, upon designing a parallax barrier, after calculating the appropriate values of Sh and Sv using the formulas (10) and (11), the number β and γ of horizontal and vertical divisions of a visible light transmitting section may be calculated to adjust in order that the parallax barrier also functions as an electromagnetic wave barrier.

It should be noted that the symbol ⌈x⌉ indicates the minimum integer of x or more. That is, if x is 1.6, ⌈x⌉ becomes 2

(21) In the parallax barrier for an autostereoscopic display of the invention, the visible light transmitting sections of the plurality of independently formed holes constituting the parallax barrier are preferably an elliptic arc shape, a Japanese lantern shape with flatten top and button elliptic arcs, or a convex polygon with more than of four even number corners.

The above structure provides an advantage that the structure contributes alleviation of transition of effective viewable areas and jump points (a reverse phenomenon) that occur when the subject person of video image presentation moves in a horizontal direction while maintaining an effective three-dimensional effect.

That is, to alleviate the transition of effective viewable areas caused by transition of the viewpoints and the jump points, some pixels other than pixels intended to be seen are required to be seen (mixing the views) by the subject person of video image presentation. However, the three-dimensional effect is, of course, diminished when some pixels other than pixels intended to be seen is seen by the subject person of video image presentation for mixing the views.

On that point, according to the structure of the invention, a desired three-dimensional effect and view-mixing can be easily obtained by making the shape of the holes as visible light transmitting sections of the parallax barrier as an elliptic arc and adjusting the curve of the elliptic arc in a horizontal direction.

Moreover, by the above advantage, a desired three-dimensional effect and view-mixing can be obtained by making the shape of holes a convex polygon with more than four corners and adjusting the inner angle of left and right convexes.

(22) In the parallax barrier for an autostereoscopic display of the invention, the visible light transmitting sections of the plurality of independently formed holes constituting the parallax barrier are preferably of a shape formed by inclining in a horizontal direction, by a predetermined angle, the elliptic arc shape, the Japanese lantern shape with flattened top and button elliptic arcs, or the convex polygon with more than four even number corners.

According to the above structure, the effective viewable area that can be seen through the visible light transmitting sections of the shape can be an effective viewable area that is more appropriate to inclination of arrangement of pixels for three-dimensional display for each viewpoint and/or inclination of arrangement of subpixels within a pixel for three-dimensional display, which allows the subject person of video image presentation to see subpixels that display the intended video image more adequately.

Here, the case in which the visible light transmitting sections of a plurality of independently formed holes are elliptic arcs refers to a case as illustrated in FIG. 15A. Also, the case in which the visible light transmitting sections are Japanese lantern shapes with flattened top and button elliptic arcs refers to a case as illustrated in FIG. 15B. Further, FIG. 15C illustrates the visible light transmitting sections of hexagon, and 15E illustrates the visible light transmitting sections of octagon.

(23) In the parallax barrier for an autostereoscopic display of the invention, the visible light transmitting sections of a plurality of independently formed holes constituting the parallax barrier is preferably designed by: determining a rectangular area which is a maximum area on an image display surface intended to be seen by one eye of a subject person of video image presentation through visible light transmitting sections of width Sh constituting the parallax barrier from the most appropriate three-dimensionally viewable position; defining a shape inscribed in upper, lower, left, and right sides or only left and right sides of an area which is a like figure with the rectangular area and is formed by, using either left or right eyes of the subject person of video image presentation at the most appropriate three-dimensionally viewable position as a base point, intersections of line segments connecting the either eye to the rectangular area and the parallax barrier surface; and defining an area on a pixel array surface seen by the subject person of video image presentation through the hole using either left or right eyes of the subject person of video image presentation at the most appropriate three-dimensionally viewable position as a base point, as an effective viewable area of a like figure with the hole.

The structure is that the role of the slits of the parallax barrier is played by a plurality of independent visible light transmitting sections corresponding to one or more blended subpixels instead of the slits as literally sequential visible light transmitting sections. In other words, the visible light transmitting sections of the invention is a plurality of holes provided as areas that transmit visible light on a surface that does not transmit visible light (a visible light impermeable section).

According to the above structure, there is an advantage that the most appropriate shape for visible light transmitting sections can be easily designed, as an area on a display intended to be seen by one eye at once so as to mix views and alleviate jump points is first determined, and the visible light transmitting sections on a parallax barrier are determined by reverse calculation therefrom.

(24) The parallax barrier for an autostereoscopic display of the invention is preferably a plate type transparent medium, and reflection is prevented by: providing visible light impermeable sections on a side of a subject person of video image presentation; and forming the visible light impermeable sections with material that absorbs visible light and/or material that diffusely reflects visible light.

Reflection herein refers to a phenomenon in which external light is specularly reflected off the display surface and, thus, the subject person of video image presentation cannot see the image on the display. That is, when the surface of the display is formed with glossy material such as glass, the sunlight or light emitted from a luminous object such as illumination is reflected off the surface of the display and the subject person of video image presentation cannot effectively see the video image displayed on the display.

Conventionally, to prevent such reflection on the autostereoscopic display of a parallax barrier method, double layers: a reflection preventing layer to prevent specular reflection of external light; and a parallax barrier layer, were required to be provided.

However, according to the above structure, as the visible light impermeable sections of the parallax barrier are formed either with material that absorbs visible light and/or material that diffusely reflects visible light, the parallax barrier can also function as a reflection preventing layer, without a need to provide double layers of a reflection preventing layer and a parallax barrier as described above.

(25) The autostereoscopic display of the invention uses the parallax barrier for an autostereoscopic display according to any one of Claims 1 to 24.

(26) The designing method of a parallax barrier for an autostereoscopic display according to the invention calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and a value of the distance Z, based on a predetermined designing condition, wherein in autostereoscopic viewing under a condition in which: an average number of subpixels in a horizontal direction constituting pixels for three-dimensional display for one viewpoint of an autostereoscopic video image created from video images of a plurality of viewpoints is defined as $\alpha$; a width of subpixels constituting the display is defined as Ph; a distance between centers of pixels for three-dimensional display that display video images of neighboring viewpoints is defined as $\alpha$Ph; a distance between pupils of left and right eyes of a subject person of video image presentation is defined as W; and a number of viewpoints of the video images for creating the autostereoscopic video image is defined as N, and in a design condition in which: a most appropriate three-dimensionally viewable position is preset and a distance from such a position to the parallax barrier is defined as L1; and a diagonal moire cancelling position is preset and a distance from such a position to the parallax barrier is defined as L2, a value of the distance Z from the image display surface of the display to the parallax barrier is determined by a following function (1); and a value of an interval Hh of a plurality of horizontally abutting visible light transmitting sections constituting the parallax barrier is determined by a following function (2):

$$Z = \frac{\alpha Ph \times L1}{W} \qquad (1)$$

$$Hh = \frac{N \times \alpha Ph \times L2}{Z + L2} \qquad (2)$$

According to the above structure, for example, a predetermined most appropriate three-dimensionally viewable position and a predetermined diagonal moire cancelling position can be set at a position where people are most likely to make a crowd, and the distance Z and an interval of one or a plurality of neighboring horizontal visible light transmitting sections can be determined by reverse calculation from these values. Thus, the subject person of video image presentation at a predetermined diagonal moire cancelling position can always see a predetermined position of pixels for three-dimensional display that display an image of a predetermined viewpoint through visible light transmitting sections of the parallax barrier, and moire is completely cancelled at the predetermined moire cancelling position.

Further, the value of the distance Z can be designed based on the value of a distance L1 from the parallax barrier to a predetermined most appropriate three-dimensionally viewable position.

(27) The designing method of a parallax barrier for an autostereoscopic display according to the invention calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and a value of the distance Z, based on a predetermined designing condition, wherein in autostereoscopic viewing under a condition in which: an average number of subpixels in a horizontal direction constituting pixels for three-dimensional display for one viewpoint of an autostereoscopic video image created from video images of a plurality of viewpoints is defined as α; a width of subpixels constituting the display is defined as Ph; a distance between centers of pixels for three-dimensional display that display video images of neighboring viewpoints is defined as αPh; a distance between pupils of left and right eyes of a subject person of video image presentation is defined as W; a horizontal resolution of the display is defined as Ir; and a number of viewpoints of the video images for creating the autostereoscopic video image is defined as N, and in a design condition in which: a most appropriate three-dimensionally viewable position is preset and a distance from such a position to the parallax barrier is defined as L1; and an appropriate three-dimensionally viewable position is preset as a position closest to the parallax barrier among positions from which one line of diagonal moire is seen, and a distance from such an appropriate three-dimensionally viewable position to the parallax barrier is defined as L2n, a value of the distance Z from the image display surface of the display to the parallax barrier is determined by a following function (1); a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position is determined by a following formula (3); and, a value of an interval Hh of a plurality of horizontally abutting visible light transmitting sections constituting the parallax barrier is determined by a following function (4):

$$Z = \frac{\alpha Ph \times L1}{W} \qquad (1)$$

$$Mh = \operatorname{int}\left(\frac{3Ir - 1}{N}\right) + 1 \qquad (3)$$

$$Hh = \frac{N \times Mh \times \alpha Ph \times L2n}{(Z + L2n) \times (Mh - 1)} \qquad (4)$$

(28) The designing method of a parallax barrier for an autostereoscopic display according to the invention calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and a value of the distance Z, based on a predetermined designing condition, wherein in autostereoscopic viewing under a condition in which: an average number of subpixels in a horizontal direction constituting pixels for three-dimensional display for one viewpoint of an autostereoscopic video image created from video images of a plurality of viewpoints is defined as α; a width of subpixels constituting the display is defined as Ph; a distance between centers of pixels for three-dimensional display that display video images of neighboring viewpoints is defined as αPh; a distance between pupils of left and right eyes of a subject person of video image presentation is defined as W; a horizontal resolution of the display is defined as Ir; and a number of viewpoints of the video images for creating the autostereoscopic video image is defined as N, and in a design condition in which: a most appropriate three-dimensionally viewable position is preset and a distance from such a position to the parallax barrier is defined as L1; and an appropriate three-dimensionally viewable position is preset as a position farthest from the parallax barrier among positions from which one line of diagonal moire is seen, and a distance from such an appropriate three-dimensionally viewable position to the parallax barrier is defined as L2f, a value of the distance Z from the image display surface of the display to the parallax barrier is determined by a following function (1); a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position is determined by a following formula (3); and a value of an interval Hh of a plurality of horizontally abutting visible light transmitting sections constituting the parallax barrier is determined by a following function (5):

$$Z = \frac{\alpha Ph \times L1}{W} \quad (1)$$

$$Mh = int\left(\frac{3Ir - 1}{N}\right) + 1 \quad (3)$$

$$Hh = \frac{N \times (Mh - 2) \times \alpha Ph \times L2f}{(Z + L2f) \times (Mh - 1)} \quad (5)$$

According to the invention, the value of interval Hh of a plurality of horizontally abutting visible light transmitting sections constituting the parallax barrier can be calculated based on the value of the distance L2n or L2f from a position from which one line of diagonal moire is seen to the parallax barrier, instead of the distance L2 from the predetermined diagonal moire cancelling position to the parallax barrier.

Advantageous Effect of the Invention

The autostereoscopic display of the invention provides an advantage that a three-dimensional video image can be presented to a subject person of video image presentation in a state in which moire is particularly effectively cancelled.

BRIEF DESCRIPTION OF THE DRAWINGS

FIGS. 10A to 10E are diagrams showing examples of visible light transmitting sections of a parallax barrier.

FIG. 22 is an explanatory view of an appropriate moire cancelling area.

FIGS. 25A and 25B are explanatory views of minimum values and maximum values of the width Vh of an effective viewable area.

FIGS. 36A to 36F are explanatory views of the number β of visible light transmitting sections in a vertical direction corresponding to one subpixel.

FIGS. 44A and 44B are reference views showing examples of the shapes of visible light transmitting sections of a parallax barrier.

FIGS. 59A to 59J are diagrams showing examples of specific shapes of visible light transmitting sections.

FIGS. 60A to 60C are diagrams showing variants of rectangular areas.

FIG. 61 is a diagram showing an example of a combination of a blending method of subpixels and visible light transmitting sections designed as elongated rectangular areas.

FIG. 62 is a diagram showing an example of a combination of a blending method of subpixels and visible light transmitting sections designed as rectangular areas deformed into parallelograms.

FIG. 63 is a diagram showing an example of a combination of a blending method of subpixels and visible light transmitting sections designed as elongated rectangular areas.

FIG. 64 is a diagram showing an example of a combination of a blending method of subpixels and visible light transmitting sections designed as rectangular areas deformed into parallelograms.

FIG. 65 is a diagram showing an example of a combination of a blending method of subpixels and visible light transmitting sections designed as elongated rectangular areas.

FIG. 66 is a diagram showing an example of a combination of a blending method of subpixels and visible light transmitting sections designed as rectangular areas deformed into parallelograms.

FIG. 68 is an explanatory diagram when a parallax barrier has a reflection preventing function.

FIGS. 70A to 70D are diagrams showing a state in which vertical arrangement positions of holes of slits are different in a horizontal direction.

MODE FOR CARRYING OUT THE INVENTION

The following will describe an embodiment of the invention with reference to the drawings.

With reference to FIGS. 1 to 32(*iv*), the width Sh of visible light transmitting sections is calculated.

Vh indicates a width of an effective viewable area that can be seen by one eye through visible light transmitting sections of width Sh; $\alpha$Ph indicates a distance between the centers of pixels for three-dimensional display that display images for neighboring viewpoints; Z indicates a distance from the image display surface of a display to a parallax barrier; L1 is a distance from a subject person of video image presentation at the most appropriate three-dimensionally viewable position to the parallax barrier; W indicates a distance between the pupils of the left and right eyes of the subject person of video image presentation; and K indicates a distance between focal points of both eyes of the subject person of video image presentation. Also, the alternate long and short dash line extends from one eye of the subject person of video image presentation to the display indicates the line of fixation of the subject person of video image presentation.

For example, the most appropriate three-dimensionally viewable position may be a position where a subject person of video image presentation can see an autostereoscopic video image particularly effectively in consideration of the purpose and the installation location of the autostereoscopic image display and the like. That is, the distance L1 from the most appropriate three-dimensionally viewable position to the parallax barrier may be an arbitrary value.

Also, the distance W between the left and right pupils of the subject person of video image presentation for calculation may be set approximately 65 mm if the main audience of a three-dimensional image is European, approximately 70 mm for Asian, and approximately 50-60 mm for children.

Figure 32I:
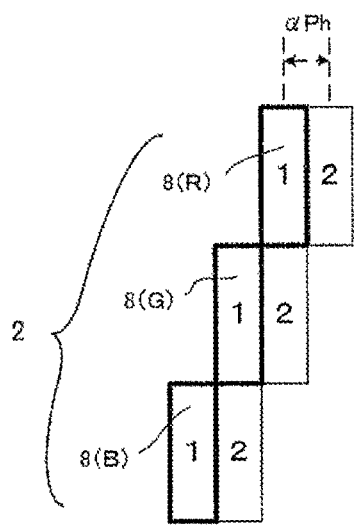
FIGS. 32(i) to 32(iv) are diagrams showing examples of a distance αPh between centers of pixels for three-dimensional display that display video images for neighboring viewpoints.
Figure 32:
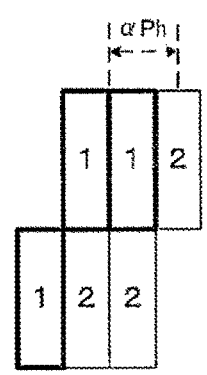
Figure 32:
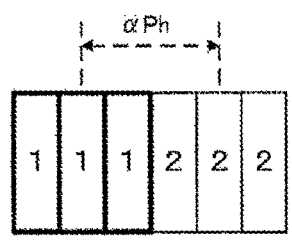

Also, the distance $\alpha$Ph between the centers of the pixels for three-dimensional display that display video images for neighboring viewpoints is, as illustrated in FIG. 32, for example, 1Ph when three subpixels constitute a pixel for three-dimensional display and the subpixels are regularly concatenated and arranged in a diagonal direction (FIG. 32(*i*)).

Next, a value of the width Vh of an effective viewable area that is seen by one eye of a subject person of video image presentation through visible light transmitting sections of a parallax barrier is determined.

The effective viewable area refers to an area on an image display surface that a subject person of video image presentation at a most appropriate three-dimensionally viewable position can see through visible light transmitting sections of a parallax barrier. That is, a range of a display intended to be seen by a subject person of video image presentation at a most appropriate three-dimensionally viewable position.

The width Vh of an effective viewable area is a horizontal width on an image display surface seen by one eye which is required to appropriately mix views by seeing part of left and right pixels for three-dimensional display centering on pixels for three-dimensional display that display video images for neighboring viewpoints that are supposed to be seen by both eyes in order to decrease jump points that occur due to mixedup of video images upon transition of views to video images of other viewpoints and viewing of left-right reverse video images by the left and right eyes when the person is moving.

Therefore, if Vh is large, transition of viewpoints and jump points are alleviated, while a three-dimensional effect decreases for that portion as the person sees pixels for three-dimensional display that are different from pixels for three-dimensional display that display images of neighboring viewpoints that are supposed to be seen by both eyes (particularly, both eyes see an identical video image overlappingly). On the other hand, if Vh value is small, a three-dimensional effect of the image is enhanced and the video image is displayed clearly, while the jump points increase. However, the above effects will largely depend on the shape and arrangement of slits or visible light transmitting sections.

In this way, a more effective three-dimensional video image can be provided by widening/narrowing the width and size of the effective viewable area depending on the purpose of the three-dimensional video image or the like to cater to the need and situation of a subject person of video image presentation.

Figure 1:
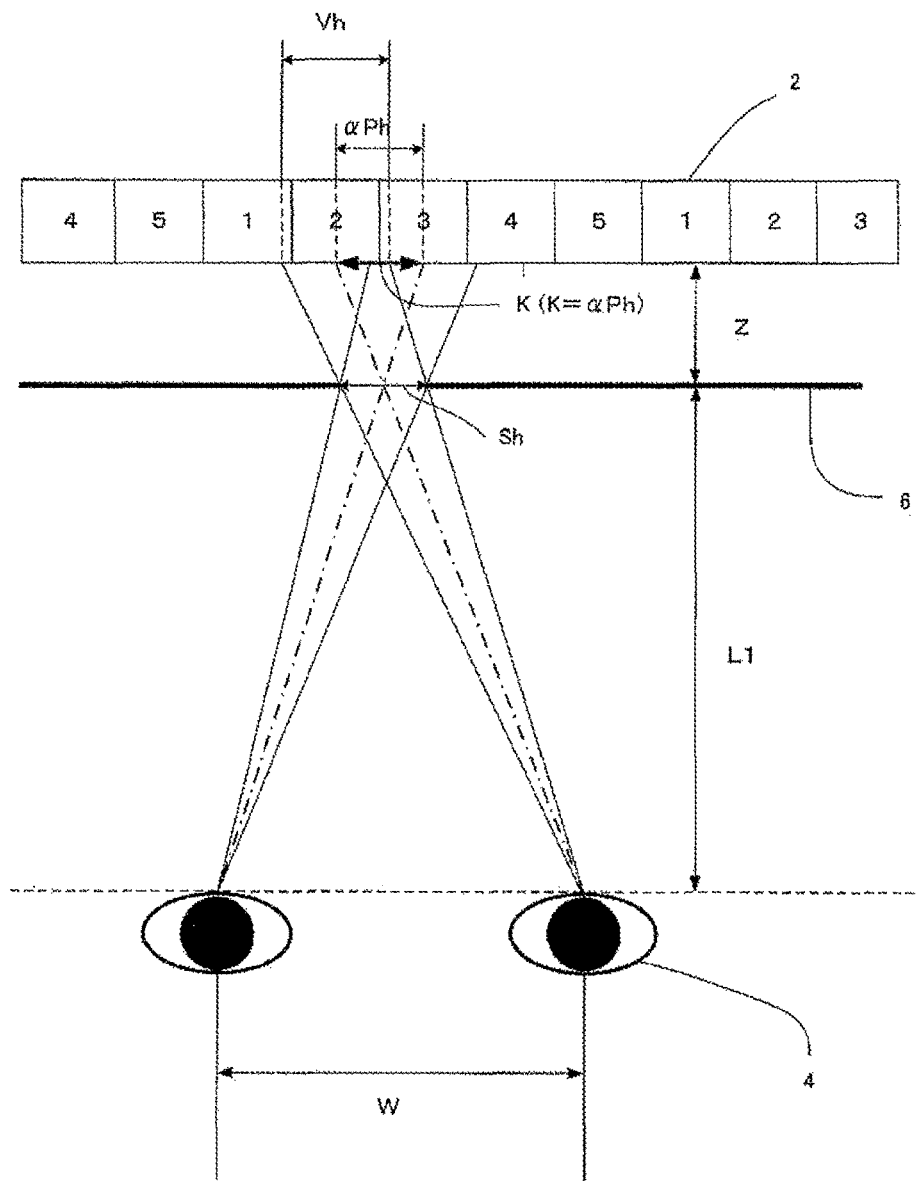
FIG. 1 is an explanatory view for calculating the width Sh of a visible light transmitting section.

It should be noted that, as seen from FIG. 1, as the lines of fixation (alternate long and short dash lines in FIG. 1) of the subject person of video image presentation proceed to the centers of respective pixels for three-dimensional display, the distance K between the focal points becomes the same value as αPh.

Next, based on the value of the width Vh of the determined effective viewable area, the value of a distance Z from the image display surface of the display to the parallax barrier is calculated. Z will be calculated by the following formula.

It should be noted that Z is a distance from the display surface to the parallax barrier even after processing reflection preventing treatment to the display surface of the three-dimensional video image display or attaching a transparent sheet for preventing reflection thereto.

As seen from FIG. 1, there is a relationship between Z:L1 and αPh:W as expressed by the following formula:

$$\frac{Z}{\alpha Ph} = \frac{L1}{W} \qquad <1>$$

Therefore, the distance Z is expressed by the following formula:

$$Z = \frac{\alpha Ph \times L1}{W}$$

Next, based on the value of the determined distance Z, the value of the width Sh of the visible light transmitting section is calculated:

From the above formula <1>, L1 is expressed as the following formula:

$$L1 = \frac{Z \times W}{\alpha Ph} \qquad <2>$$

Also, as seen from FIG. 1, there is a relationship between S:Vh and L1: (L1+Z) as expressed by the following formula:

$$\frac{Sh}{L1} = \frac{Vh}{L1+Z}$$

Therefore, the height Sh of the visible light transmitting section is expressed by the following formula:

$$Sh = \frac{L1 \times Vh}{L1+Z} \qquad <3>$$

Then, if formula <2> is assigned to <3>, Sh is expressed by the following formula:

$$Sh = \frac{Z \times W / \alpha Ph \times Vh}{Z \times W / \alpha Ph + Z} = \frac{Z \times W \times Vh}{(Z \times W) + (Z \times \alpha hP)}$$

$$Sh = \frac{W \times Vh}{W + \alpha hP}$$

In this way, the value of Sh can be calculated by the values of W, αPh, and Vh.

Figure 2:
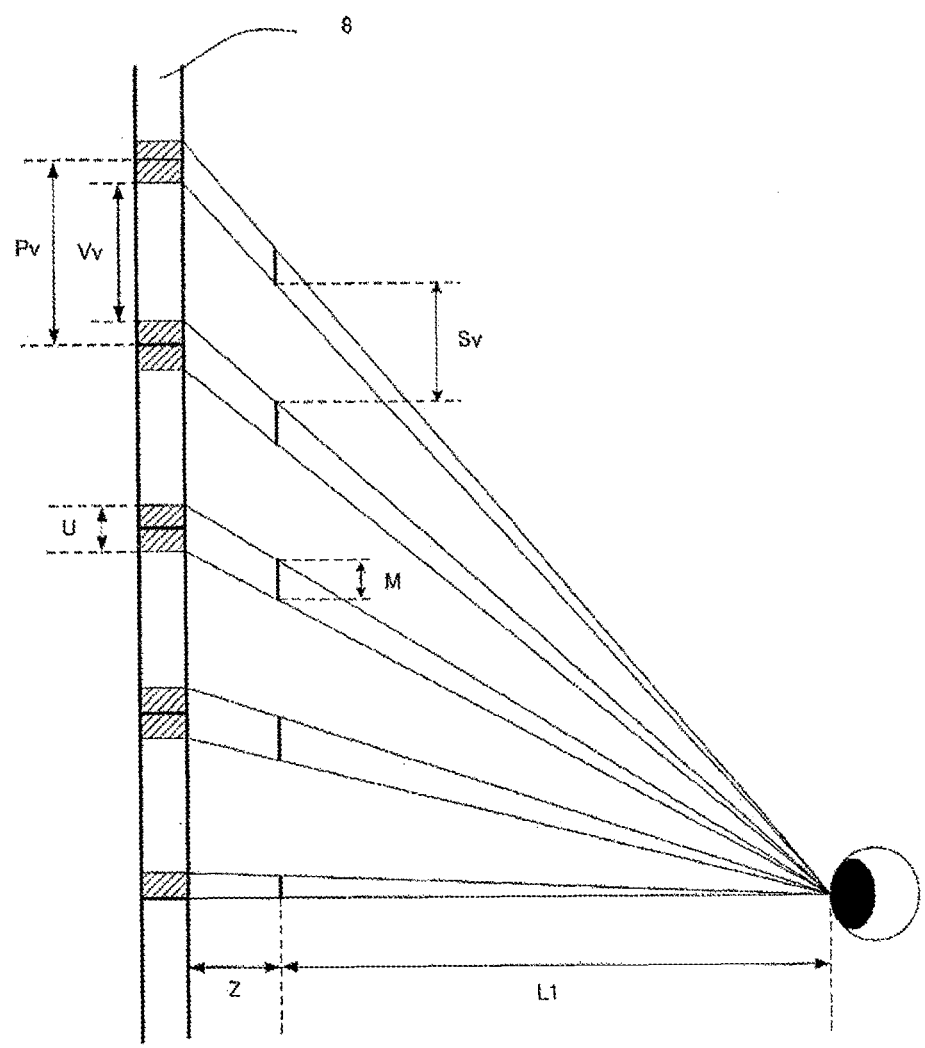
FIG. 2 is an explanatory view for calculating the height Sv of a visible light transmitting section.

The height Sv will be calculated with reference to FIG. 2. In the autostereoscopic display, when the shape of the edges of the slits as visible light transmitting sections constituting the parallax barrier is a staircase pattern or a shape in which circular arcs, elliptic arcs, or polygons are repeated, or the shape of the visible light transmitting sections constituting the parallax barrier is a plurality of independently formed holes, the height Sv is a height of the visible light transmitting sections of the repeated shape or the visible light transmitting section of the plurality of holes.

Here, the height Vv of the effective viewable area of the parallax barrier is a range of a display seen through the visible light transmitting sections of height Sv from a most appropriate three-dimensionally viewable position, and the value can be a predetermined value depending on the conditions of the installing location of the autostereoscopic display or the like.

For example, in order to suppress the aperture ratio of the parallax barrier to lower the illuminance of the display, the value of the effective viewable area may be set small.

Also, as another method to adjust the aperture ratio of the parallax barrier, one unit of the edges of a plurality of repeated slits or one unit of visible light transmitting sections may be used for each subpixel, or a visible light transmitting section of the repeated shape or visible light transmitting sections of the plurality of holes may be used for two or more subpixels.

In this way, even when the ratio of the number of visible light transmitting sections for one subpixel is other than 1:1, the height of the effective viewable area Vv still refers to the range of the display seen through the height of the visible light transmitting sections.

As seen from FIG. 2, there is a relationship between Sv:Vh and L1: (L1+Z) as expressed by the following formula:

$$\frac{Sv}{L1} = \frac{Vv}{L+Z}$$

Therefore, the height Sh of the visible light transmitting sections is expressed by the following formula:

$$Sv = \frac{L1 \times Vv}{L+Z}$$

In this way, the value Sv of the visible light transmitting sections can be reverse calculated by determining the value of the height Vv of the effective viewable area.

Also, the height Sv of the visible light transmitting sections can be calculated by the following formula based on the interval Hv of the visible light transmitting sections.

$$Sv = \lambda \times Hv$$

Figure 56:
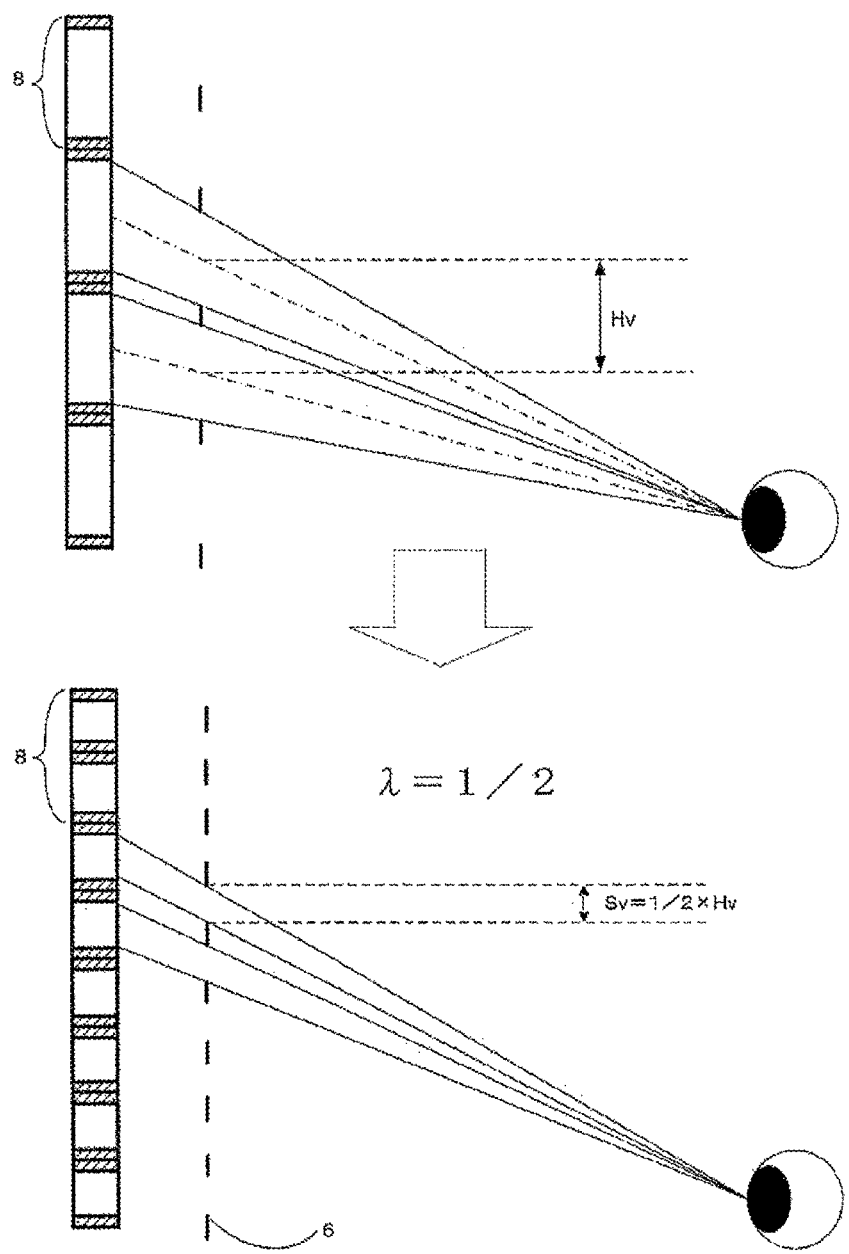
FIG. 56 is an explanatory view for calculating the value of Sv using a coefficient $\lambda$ based on the value of Hv.

That is, as shown in FIG. 56, after first calculating the interval Hv of the visible light transmitting sections according to the above formula, the value of λ is determined (½ in FIG. 56) and assigned to the above formula, whereby the height of the visible light transmitting sections can be calculated.

Figure 3:
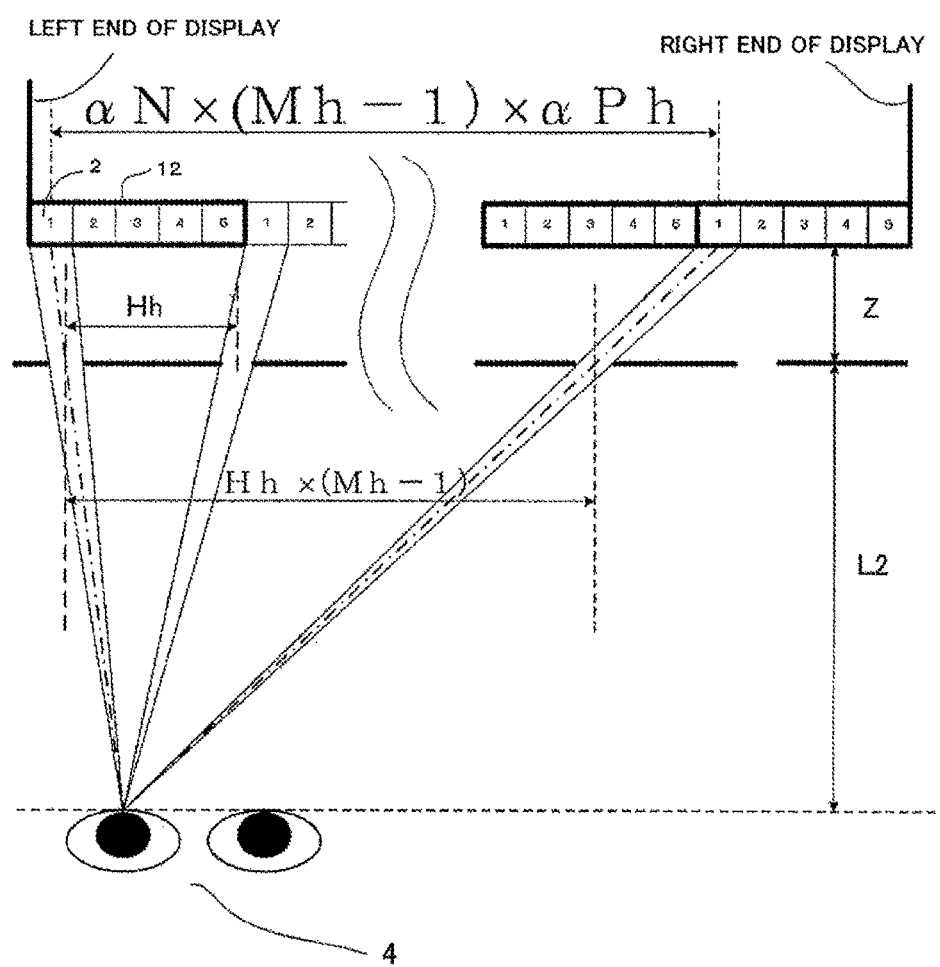
FIG. 3 is an explanatory view for calculating the interval Hh of horizontally abutting visible light transmitting sections.

Next, with reference to FIG. 3, the interval Hh of the plurality of horizontally abutting visible light transmitting sections constituting the parallax barrier is calculated based on a distance L2 from a predetermined diagonal moire cancelling position to the parallax barrier.

In FIG. 3 a subject person of video image presentation 4 at a predetermined diagonal moire cancelling position sees a pixel for three-dimensional display 2 constituting a pixel unit for three-dimensional display 12 at the lift end of the display through a visible light transmitting section of a parallax barrier by one eye (the left eye) and sees a pixel for three-dimensional display 2 constituting a pixel unit for three-dimensional display 12 at the right end of the display. The pixels for three-dimensional display 2 that the subject person of video image presentation 4 sees display a video image for the same viewpoint.

In this way, if the subpixels for displaying a two-dimensional image seen through the visible light transmitting sections of the parallax barrier always display video images of the same viewpoint, the subject person of video image presentation will never see moire on the screen.

Here, firstly, the number Mh of visible light transmitting sections in a horizontal direction from a visible light transmitting section of the parallax barrier corresponding to a pixel unit for three-dimensional display at the left end of the display to a visible light transmitting section of the parallax barrier corresponding to a pixel unit for three-dimensional display at the right end of the display seen from a predetermined diagonal moire cancelling position can be expressed by the following formula using the number N of viewpoints and the horizontal resolution Ir of video images for displaying a three-dimensional video image.

$$Mh = int\left(\frac{3Ir - 1}{N}\right) + 1$$

Figure 34:
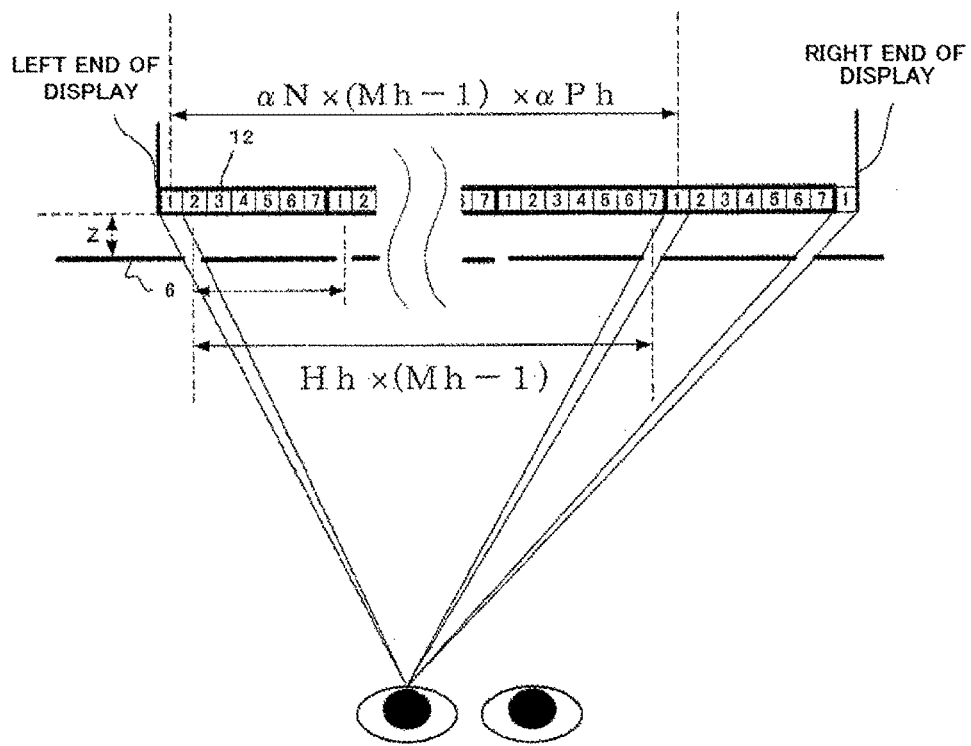
FIG. 34 is an explanatory view for calculating the number Mh of visible light transmitting sections.

That is, 3Ir obtained by multiplying the horizontal resolution Ir by 3 (R·G·B) is the number of subpixels in a horizontal direction. Subtracting 1 therefrom is because, as illustrated in FIG. 34, for example, if the number of viewpoints is 7, subpixels at the right end of the display may not display a video image for the seventh viewpoint which is the last viewpoint of the viewing viewpoint and, instead, display a video image for the first viewpoint, in such a case, calculation should be done after subtracting the number of subpixels that display the video image for the first viewpoint. Also, adding 1 at the end thereto is to compensate the lacking 1 to the actual Mh value as 1 is subtracted from the total number of subpixels and rounded to the whole number even when subpixels for displaying a video image of the first viewpoint do not exceed the right end of the display.

Also, a distance from the center of a visible light transmitting section corresponding to the pixel for three-dimensional display constituting a pixel unit for three-dimensional display at the left end of the display to the center of a visible light transmitting section corresponding to the pixel for three-dimensional display constituting a pixel unit for three-dimensional display at the right end of the display becomes a value obtained by multiplying Hh (the interval of visible light transmitting sections in a horizontal direction) by (Mh−1).

$$Hh \times (Mh-1)$$

Further, a distance in a horizontal direction from the center of the pixel for three-dimensional display constituting a pixel unit for three-dimensional display at the left end of the display to the center of the pixel for three-dimensional display that displays a video image of the same viewpoint and constitutes a pixel unit for three-dimensional display at the right end of the display seen by a subject person of video image presentation through the visible light transmitting sections of the parallax barrier, can be expressed by the following formula using the number N of viewpoints of video images for generating an autostereoscopic video image and a distance αPh between the centers of pixels for three-dimensional display that display video images of neighboring viewpoints.

$$N \times (Mh-1) \times \alpha Ph$$

As seen from FIG. 3, there is a relationship between [Hh×(Mh−1)]:[N×(Mh−1)×αPh] and L2:(Z+L2) as expressed by the following formula:

$$\frac{Hh \times (Mh-1)}{L2} = \frac{N \times (Mh-1) \times \alpha Ph}{Z+L2}$$

Thus, the value of Hh can be calculated by the following formula:

$$Hh = \frac{N \times \alpha Ph \times L2}{Z+L2}$$

In this way, based on the distance L2 from a predetermined diagonal moire cancelling position to the parallax barrier, the value of the interval Hh of a plurality of horizontally abutting visible light transmitting sections constituting a parallax barrier can be calculated.

Figure 4:
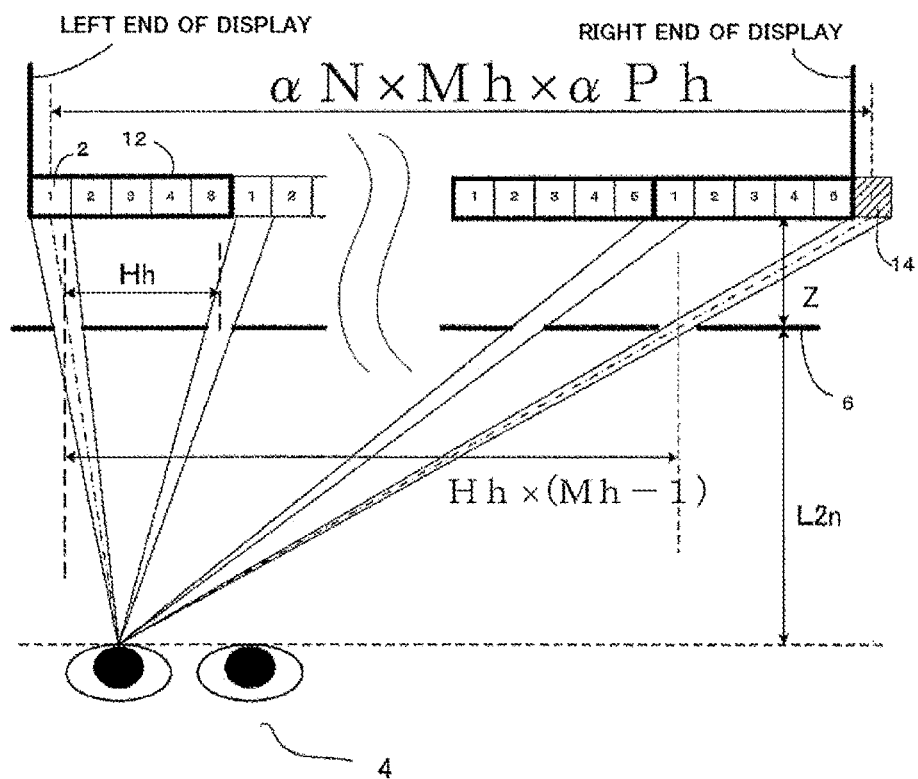
FIG. 4 is an explanatory view for calculating the interval Hh of horizontally abutting visible light transmitting sections.
Figure 5:
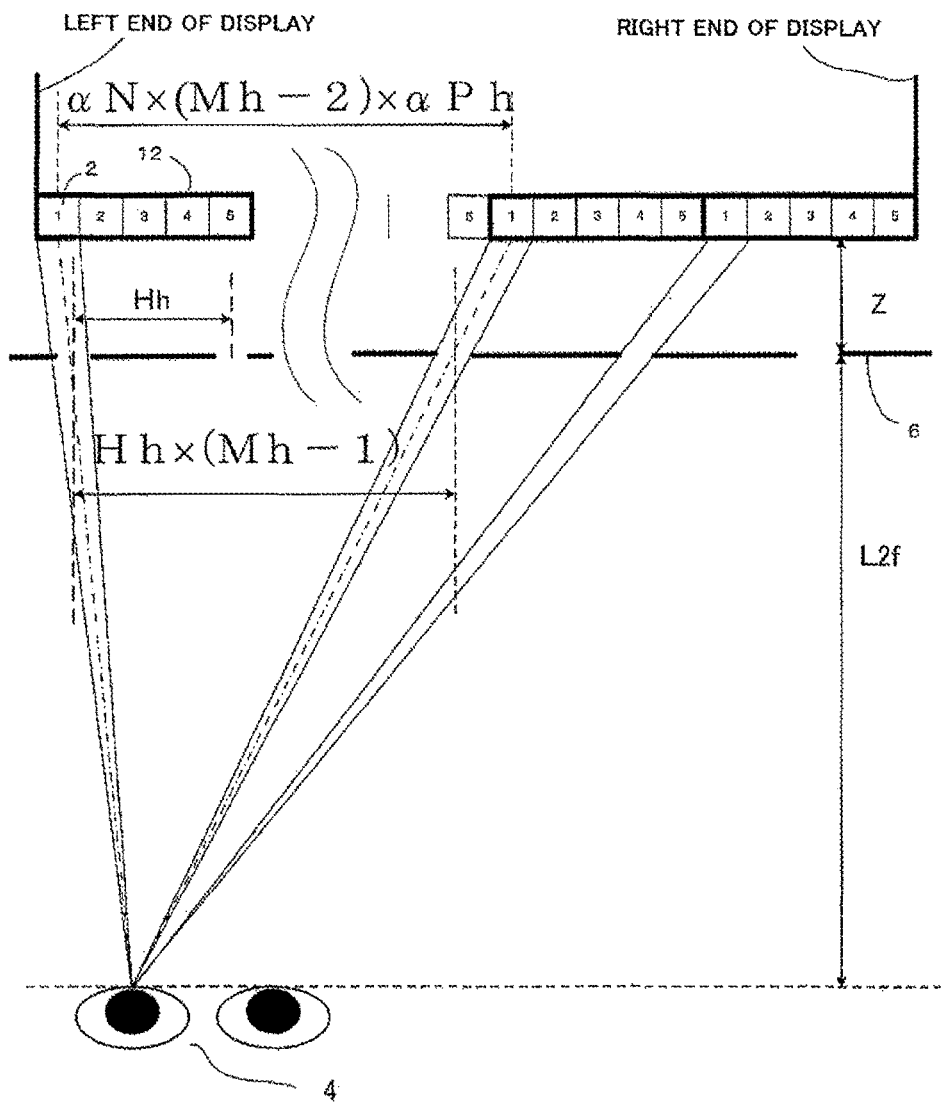
FIG. 5 is an explanatory view for calculating the interval Hh of horizontally abutting visible light transmitting sections.

Next, with reference to FIGS. 4 and 5, the interval Hh of a plurality of horizontally abutting visible light transmitting sections constituting the parallax barrier is calculated based on a distance from the parallax barrier to the position from which one line of diagonal moire is seen.

Figure 33:
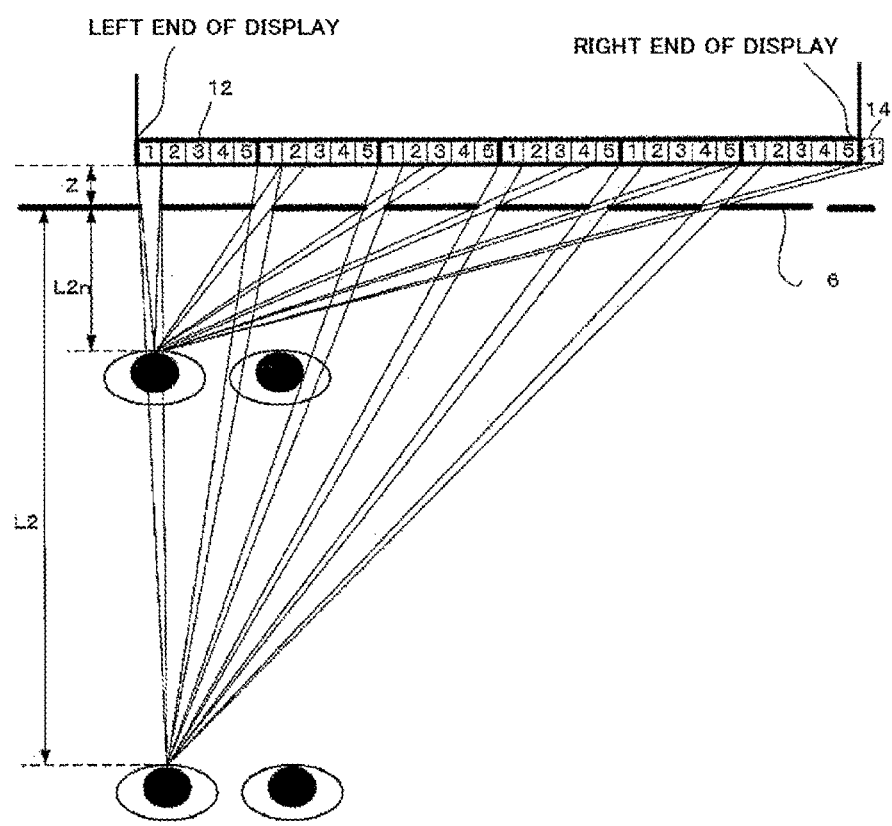
FIG. 33 is a correlation diagram of a horizontal moire cancelling position and the shortest distance L2n of an appropriate moire cancelling area.

As illustrated in FIG. 4, as a predetermined distance from a position from which one line of diagonal moire is seen to the parallax barrier 6, while there are two kinds of such positions, away and close to the parallax barrier, L2n is defined as a distance from the closer one of such position to the parallax barrier. At L2n, as illustrated in FIG. 33, similarly to a predetermined diagonal moire cancelling position (L2), a subject person of video image presentation 4 sees pixels that display an image for the first viewpoint among pixels for three-dimensional display 2 constituting a pixel unit for three-dimensional display 12 at the left end of the display through the visible light transmitting sections of the parallax barrier. However, when the viewpoint shifts to the right direction, the subject person of video image presentation 4 sees pixels for three-dimensional display for other viewpoints instead of the pixels for three-dimensional display for the first viewpoint through the visible light transmitting sections. Then, if a virtual pixel 14 is assumed at right of the right end of the display through the visible light transmitting sections through which visible light transmits when the subject person of video image presentation 4 at position L2 sees pixels for three-dimensional display 2 for the first viewpoint among a pixel unit for three-dimensional display 12 at the right end of the display, the subject person of video image presentation 4 eventually sees the (virtual) pixel for three-dimensional display 14 for the first viewpoint again. As such a cycle occurs once, it is considered that moire is generated once at L2$n$.

When the value of L2$n$ is defined as a predetermined value, based on this value, the interval Hh of the plurality of horizontally abutting visible light transmitting sections constituting the parallax barrier is calculated.

That is, as seen from FIG. 4, there is a relationship between [Hh×(M−1)]:[N×M×αPh] and L2$n$:(Z+L2$n$) as expressed by the following formula:

$$\frac{Hh \times (Mh-1)}{L2n} = \frac{N \times Mh \times \alpha Ph}{Z+L2n}$$

Thus, Hh can be calculated by the following formula:

$$Hh = \frac{N \times Mh \times \alpha Ph \times L2n}{(Z+L2n) \times (Mh-1)}$$

Also, similarly to calculating the value of Hh based on L2$n$, as a distance from the position from which one line of diagonal moire is seen to the parallax barrier, L2$f$ is defined as a distance from the position away from the parallax barrier among the two kinds of such positions, away and close to the parallax barrier, to the parallax barrier, and the value of Hh can be calculated based on the predetermined distance L2$f$.

As illustrated in FIG. 5, at L2$f$, similarly to a predetermined diagonal moire cancelling position (L2), a subject person of video image presentation sees pixels that display an image for the first viewpoint among pixels for three-dimensional display 2 constituting a pixel unit for three-dimensional display 12 at the left end of the display through the visible light transmitting sections of the parallax barrier. However, when the viewpoint shifts to the right direction, the subject person of video image presentation sees pixels for three-dimensional display 2 for other viewpoints instead of the pixels for three-dimensional display 2 for the first viewpoint through the visible light transmitting sections. Then, the subject person of video image presentation eventually sees pixels for three-dimensional display 2 for the first viewpoint among a pixel unit for three-dimensional display at left of the pixel unit for three-dimensional display 12 at right end of the display through visible light transmitting sections through which visible light transmits when the subject person of video image presentation at position L2 sees pixels for three-dimensional display 2 for the first viewpoint among a pixel unit for three-dimensional display 12 at the right end of the display. As such a cycle occurs once, it is considered that moire is generated once at L2$f$.

Figure 6:
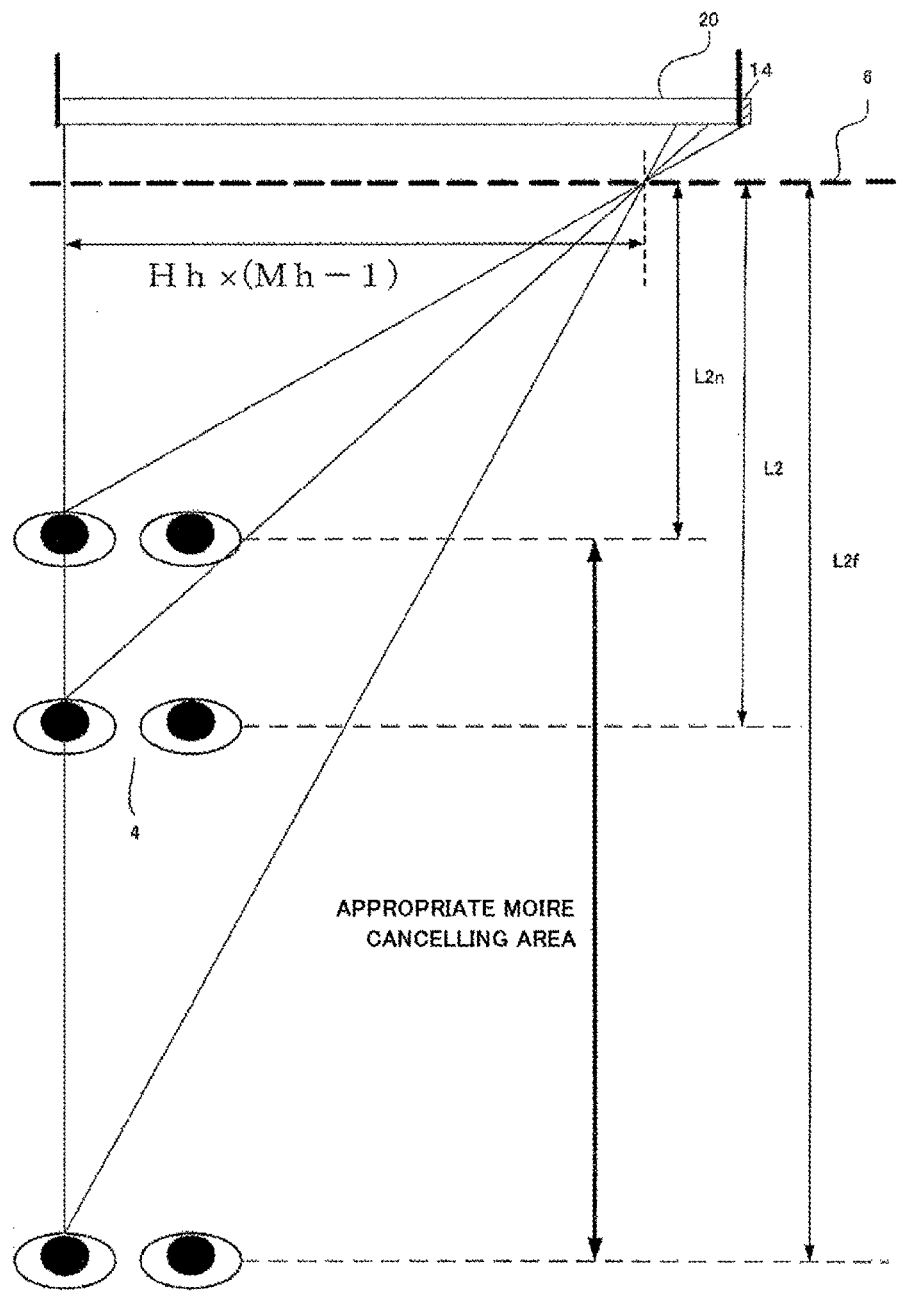
FIG. 6 is an explanatory view for calculating the interval Hh of horizontally abutting visible light transmitting sections.

It should be noted that FIG. 6 illustrates a relative relationship among L2, L2$n$ and L2$f$.

When such a value of L2$f$ is defined as a predetermined value, based on this value, the interval Hh between the plurality of horizontally abutting visible light transmitting sections constituting the parallax barrier is calculated.

That is, as seen from FIG. 5, there is a relationship between [Hh×(M−1)]:[N×(M−2)×αPh] and Z:(Z+L2$n$) as expressed by the following formula:

$$\frac{Hh \times (Mh-1)}{L2n} = \frac{N \times (Mh-2) \times \alpha Ph}{Z+L2n}$$

Thus, the value of Hh can be calculated by the following formula:

$$Hh = \frac{N \times (Mh-2) \times \alpha Ph \times L2f}{(Z+L2f) \times (Mh-1)}$$

In this way, as the interval Hh of the plurality of horizontally abutting visible light transmitting sections constituting the parallax barrier can be calculated based on the value of a position (L2$n$·L2$f$) from which one line of moire is seen, for example, a position at which a three-dimensional video image can be particularly effectively seen can be clearly indicated to a subject person of video image presentation by defining the range from the position L2$n$ to the position L2$f$ as an appropriate moire cancelling area. Further, by setting the moire cancelling area to the range where people are most likely to make a crowd, attention of the subject person of video image presentation can be attracted.

Also, the values of L2$n$ and L2$f$ can be calculated based on the value of L2 by the calculation described below.

Figure 16:
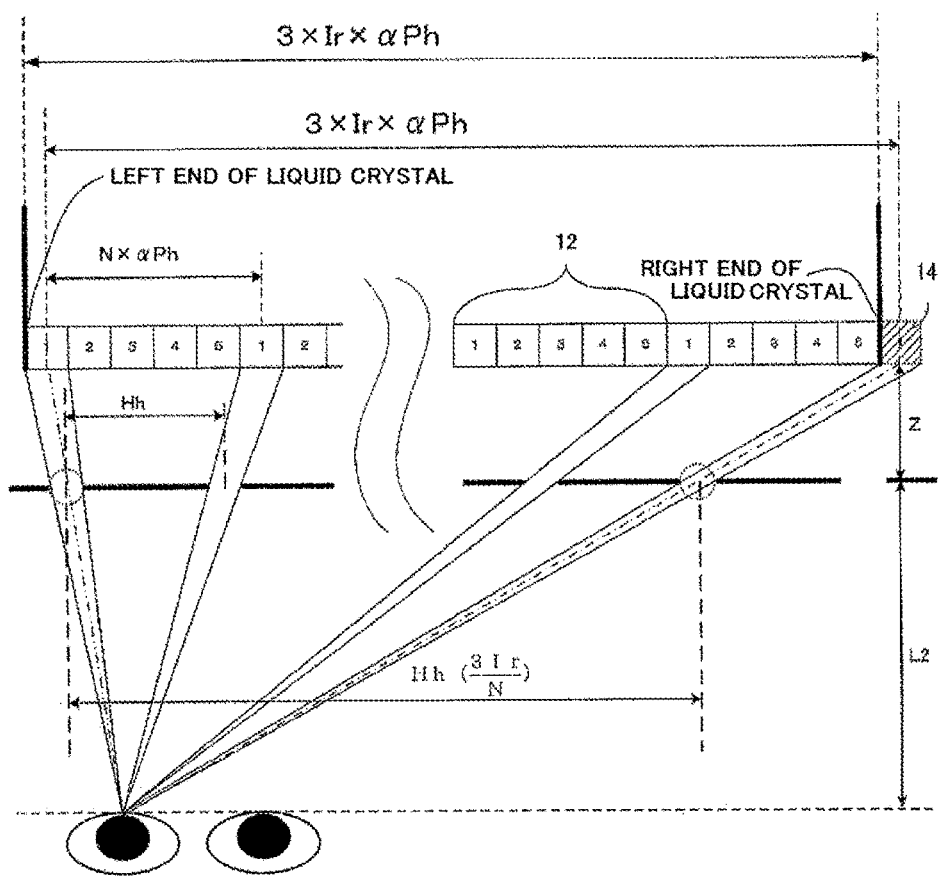
FIG. 16 is an explanatory view of a diagonal moire cancelling position.
Figure 17:
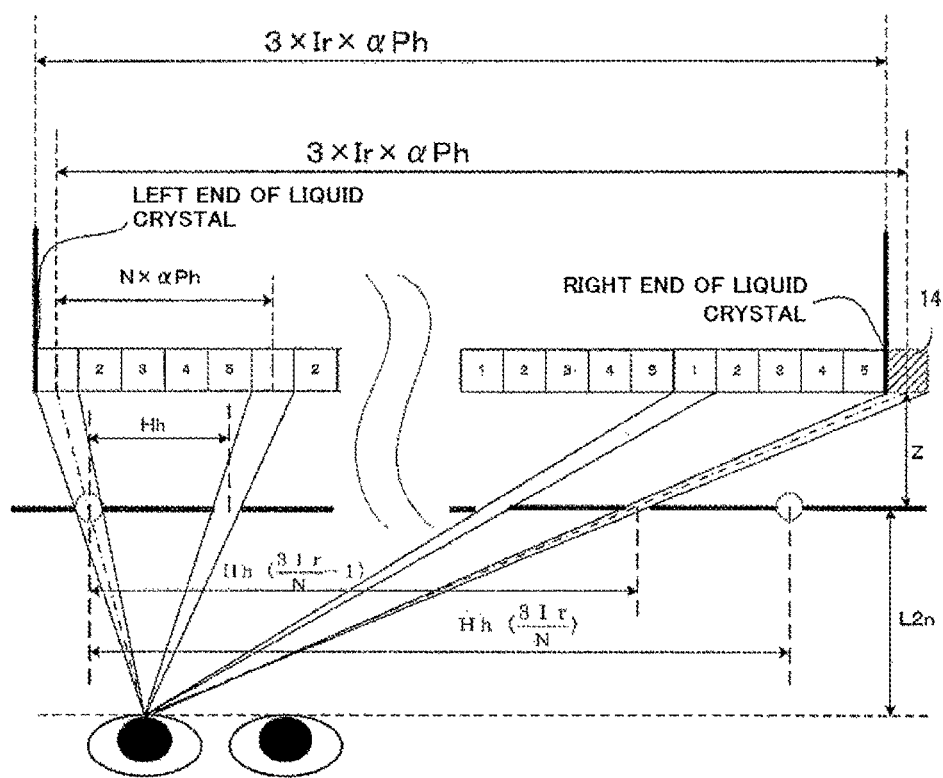
FIG. 17 is an explanatory view for calculating the shortest distance L2n of an appropriate diagonal moire cancelling area.
Figure 18:
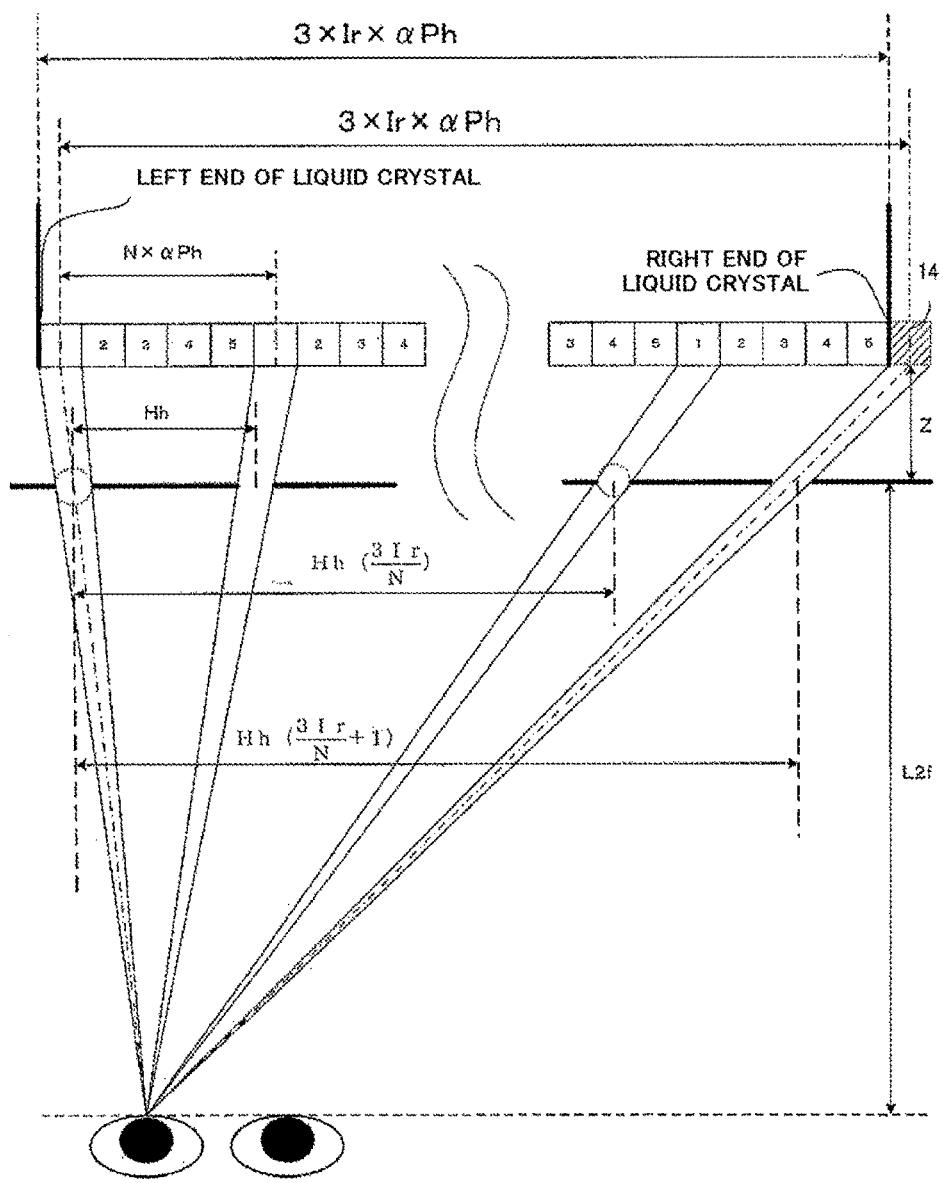
FIG. 18 is an explanatory view for calculating the longest distance L2n of an appropriate diagonal moire cancelling area.

With reference to FIGS. 16, 17 and 18, the following describes how much the subject person of video image presentation has moved closer to or away from the parallax barrier from a diagonal moire cancelling position (L2) when one line of moire is seen by the subject person of video image presentation, from a different standpoint from the above one.

Ir indicated in FIG. 16 indicates a horizontal resolution of the display. Also, the circle represented by the dash line indicates: pixels for three-dimensional display that display a video image of a predetermined viewpoint and that constitute a pixel unit for three-dimensional display at the left end of the display; and visible light transmitting sections of the parallax barrier corresponding to a virtual pixel for a video image for the same viewpoint at right of the right end of the display when seen from a predetermined moire cancelling position.

As a subject person of video image presentation at the diagonal moire cancelling position always sees pixels for three-dimensional display that display a video image for the same viewpoint through all the visible light transmitting sections of the parallax barrier, the subject person of video image presentation does not see a diagonal moire. However, if the subject person of video image presentation moves closer to or away from the parallax barrier from the moire cancelling position, the subject person of video image presentation gradually sees pixels for three-dimensional display that display a video image of a neighboring viewpoint, and eventually sees pixels for three-dimensional display that display a video image of a viewpoint that supposed to be seen again through a visible light transmitting section next to the visible light transmitting section of the parallax barrier that the subject person of video image presentation saw at the diagonal moire cancelling position. When this cycle occurs once, the subject person of video image presentation sees one line of diagonal moire.

Therefore, if the value of a distance L2 from a parallax barrier to a predetermined moire cancelling position is determined, the position from which one line of moire is seen can be calculated by the following formula based on that value.

It should be noted that the shortest distance from the parallax barrier, from which one line of diagonal moire is seen, is defined as L2n, the longest distance from the parallax barrier, from which one line of diagonal moire is seen, is defined as L2f, and the range from L2n to L2f is defined as an appropriate moire cancelling area.

First, if the distance from the parallax barrier to the subject person of video image presentation is L2, as shown in FIG. 16, the subject person of video image presentation always sees pixels for three-dimensional display that display a video image for the same viewpoint through the visible light transmitting sections of the parallax barrier.

Here, the number of subpixels in a horizontal direction constituting the display can be calculated by trebling Ir, and a distance from the left end of the display to the right end of the display is calculated by further multiplying the value of the distance αPh between the centers of the pixels for three-dimensional display that display a video image for neighboring viewpoint:

$$3 \times Ir \times \alpha Ph$$

Thus, a distance from the center of the pixel of the left end of the display to the center of the virtual pixel at right of the right end of the display can be expressed by (3×Ir×αPh).

Further, at the diagonal moire cancelling position, a distance from the center of the visible light transmitting section of the parallax barrier corresponding to the pixel for three-dimensional display at the left end of the display to the visible light transmitting section of the parallax barrier corresponding to the virtual pixel at right of the right end of the display can be expressed as follows:

$$Hh\left(\frac{3Ir}{N}\right)$$

Also, as seen from FIG. 16, there is a relationship between Hh:(N×αPh) and L2:(L2+Z) as expressed by the following formula:

$$\frac{Hh}{L2} = \frac{N \times \alpha Ph}{L2 + Z}$$

Thus, Hh is expressed by the following formula:

$$Hh = \frac{N \times \alpha Ph \times L2}{L2 + Z} \qquad <6>$$

Next, with reference to FIG. 17, based on the value of L2, the value of L2n in a horizontal direction is calculated.

As a subject person of video image presentation sees one line of diagonal moire at L2n, the number of visible light transmitting sections of the parallax barrier, through which the subject person of video image presentation sees a three-dimensional video image, is smaller than the number of pixel units for three-dimensional display by one, while the subject person of video image presentation sees all pixels for three-dimensional display constituting the pixel units for three-dimensional display through the visible light transmitting sections.

Therefore, L2n can be deemed as a position where the diagonal moire generation cycle has occurred once.

That is, at L2n, the distance from the center of the visible light transmitting section of the parallax barrier corresponding to the pixels for three-dimensional display constituting a pixel unit for three-dimensional display at the left end of the display to the visible light transmitting section of the parallax barrier corresponding to the virtual pixel for a video image for the same viewpoint at right of the right end of the display can be expressed as follows:

$$Hh\left(\frac{3Ir}{N} - 1\right)$$

Here, if Hh of the formula <6> is assigned thereto, this formula can be expressed as follows:

$$\left(\frac{N \times \alpha Ph \times L2}{L2 + Z}\right) \times \left(\frac{3Ir}{N} - 1\right) = \frac{(3Ir - N) \times N \times \alpha Ph \times L2}{N(L2 + Z)}$$

Also, as seen from FIG. 17, there is a relationship between L2n:(L2n+Z) and $$\frac{(3Ir - N) \times N \times \alpha Ph \times L2}{N(L2 + Z)} : (3 \times Ir \times \alpha Ph)$$

as expressed by the following formula:

$$\frac{L2n}{\frac{(3Ir - N) \times N \alpha PhL2}{N(L2)}} = \frac{L2n + Z}{3 \times Ir \times \alpha hP}$$

$$\therefore \frac{L2n \times N(L + Z)}{(3Ir - N) \times N \alpha PhL2} = \frac{L2n + Z}{3 \times Ir \times \alpha Ph}$$

$$\therefore L2n \times N(L+Z) \times 3 \times Ir \times \alpha Ph = (L2n + Z) \times (3Ir - N) \times (N \alpha PhL2)$$

$$\therefore L2n\{(3 \times L2 \times Ir) + (3 \times Z \times Ir) - (3 \times Ir \times L2) + (N \times L2)\} =$$
$$(Z \times L2)(3Ir - N)$$

Therefore, L2n can be expressed by the following formula:

$$\therefore L2n = \frac{(Z \times L2)(3Ir - N)}{3ZIr + NL2}$$

Next, with reference to FIG. 18, the value of L2f is calculated based on the value of L2.

While, as a subject person of video image presentation also sees one line of diagonal moire at L2f, the number of visible light transmitting sections of the parallax barrier through which a three-dimensional video image is seen by the subject person of video image presentation is larger than the number of pixel units for three-dimensional display by one, the subject person of video image presentation sees pixels for three-dimensional display constituting all the pixel units for three-dimensional display through the visible light transmitting sections.

That is, at L2f, the distance from the center of the visible light transmitting section of the parallax barrier corresponding to the pixels for three-dimensional display at the left end of the display to the visible light transmitting section of the parallax barrier corresponding to a virtual pixel 14 for the same viewpoint at right of the right end of the display can be expressed as follows:

$$Hh\left(\frac{3lr}{N}+1\right)$$

Therefore, similarly to the way of calculating the above L2n, L2f can be expressed by the following formula:

$$L2f = \frac{(Z \times L2)(3lr+N)}{3Zlr - NL2}$$

In this way, the values of L2n and L2f can also be calculated based on the value of L2.

It should be noted that the values of L2n and L2f in the invention can be determined as necessarily by a designer of a parallax barrier, and are not limited to the values determined by the formula based on the above described value of L2.

Figure 7:
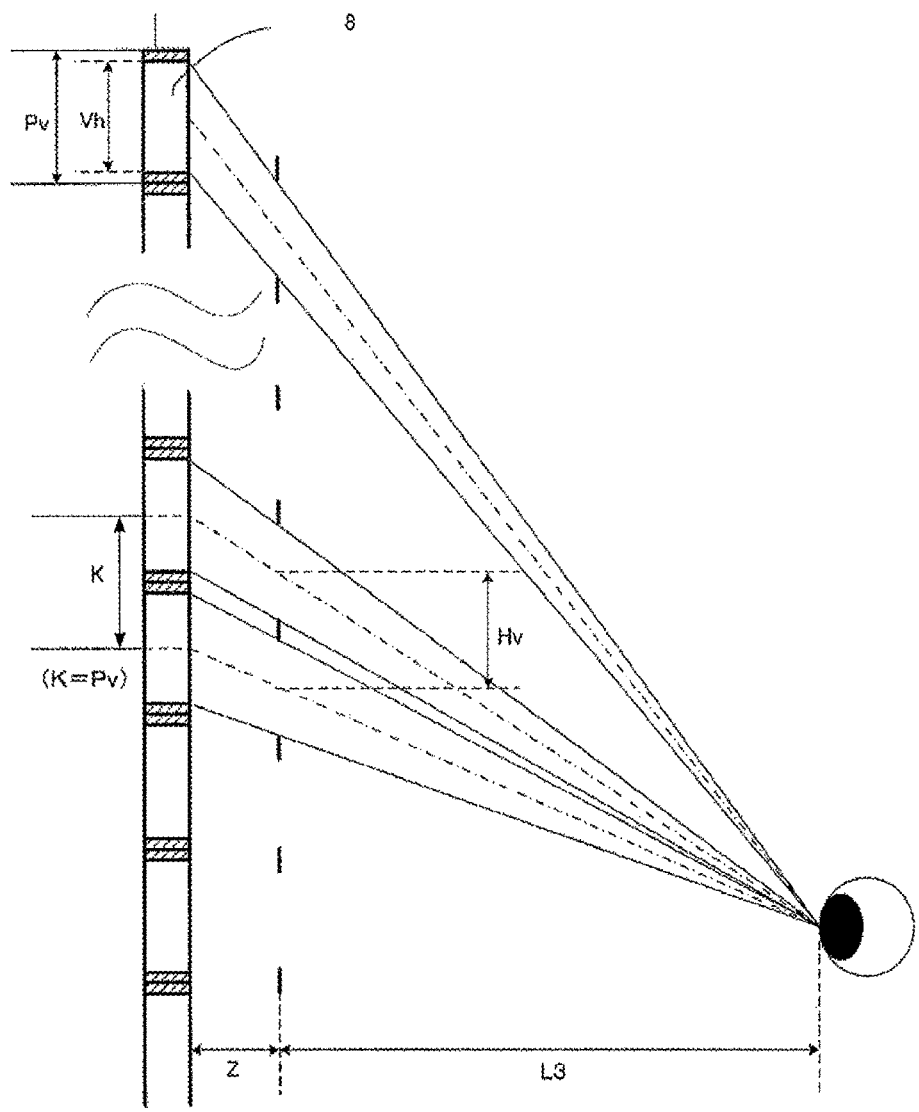
FIG. 7 is an explanatory view for calculating the interval Hv of vertically abutting visible light transmitting sections.

Next, with reference to FIG. 7, the following describes a method for calculating the value of interval Hv of visible light transmitting sections of the repeated shape that abut in a vertical direction of the parallax barrier or visible light transmitting sections of a plurality of holes based on the value of the distance L3 from a predetermined horizontal moire canceling position to the parallax barrier when the shape of the edges of the slits as visible light transmitting sections constituting the parallax barrier is a staircase pattern, or a shape of repeated circular arcs, elliptic arcs, or pentagons, or the shape of the visible light transmitting sections constituting the parallax barrier is a plurality of independently formed holes.

Here, the alternate long and short dash line in FIG. 7 indicates the line of fixation of a subject person of video image presentation, and K indicates the distance between the upper and lower focal points of the subject person of video image presentation.

The value of the distance L3 from the parallax barrier to the horizontal moire cancelling position is determined by especially at which distance the three-dimensional video image is intended to be presented to a subject person of video image presentation in a condition in which moire is cancelled.

Also, as a subject person of video image presentation at a horizontal moire canceling position always gazes the centers of subpixels through the visible light transmitting sections of the parallax barrier, the distance K between the focal points of a subject person of video image presentation becomes equal to the height of the subpixel Pv.

Also, β represents the number of visible light transmitting sections in a vertical direction corresponding to one subpixel, and as shown in FIGS. 36A and 36D, if one visible light transmitting section is formed for one subpixel 8, β becomes 1. Similarly, as shown in FIGS. 36B and 36E, if two visible light transmitting sections are formed for one subpixel 8, β becomes 2. Further, as shown in FIGS. 36C and 36F, if one visible light transmitting section is formed for three subpixels 8, β becomes ⅓.

That is, β is the number of one unit of the visible light transmitting sections of the repeated shape or the visible light transmitting sections of a plurality of holes in a vertical direction corresponding to one subpixel.

It should be noted that the number of a plurality of visible light transmitting sections provided for each subpixel is preferably integer number. Also, when providing one visible light transmitting section for a plurality of subpixels, integer number of visible light transmitting sections are preferably provided for one pixel for three-dimensional display.

Here, the value of an interval Hv of one unit of the repeated shapes or the visible light transmitting sections is calculated.

Figure 31:
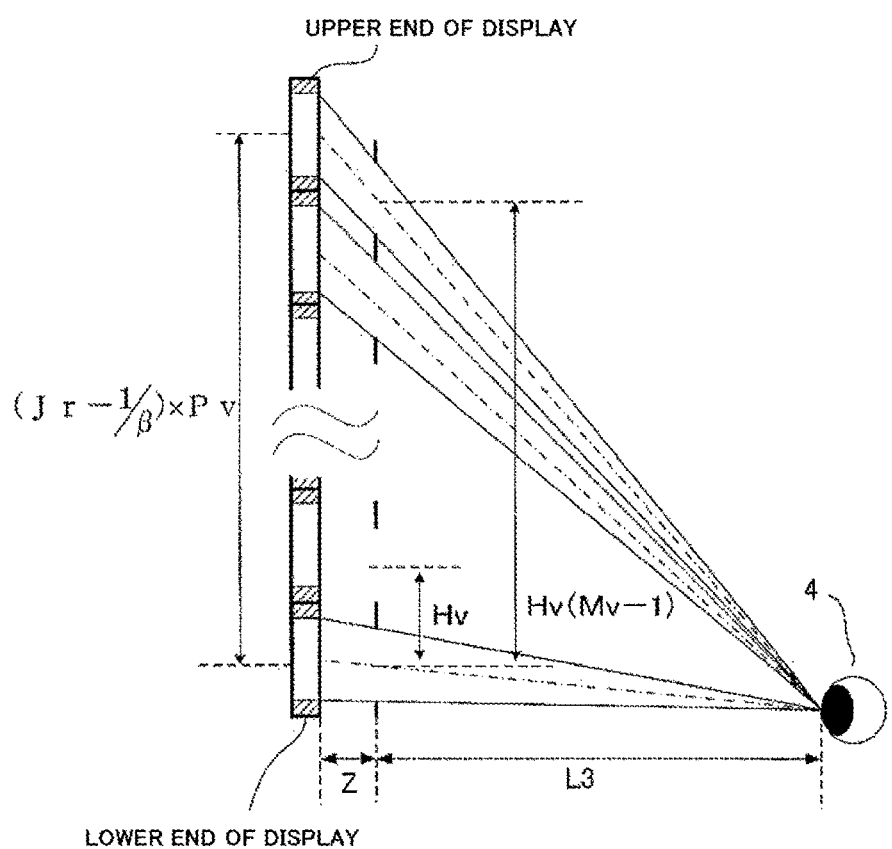
FIG. 31 is an explanatory view for calculating the interval Hh of vertically abutting visible light transmitting sections.

As seen from FIG. 31, the relationship between the distance between the vertical focal points K (=Pv) and L3(L3+Z) in Hv×β:L3 can be expressed by the following formula:

$$\frac{Hv \times \beta}{L3} = \frac{Pv}{Z+L3}$$

Therefore, Hv is expressed by the following formula:

$$Hv = \frac{Pv \times L3}{(Z+L3) \times \beta}$$

In this way, the value of Hv with which moiré is particularly cancelled can be determined by reverse calculation from the value of L3 at a predetermined horizontal moiré canceling position.

Figure 8:
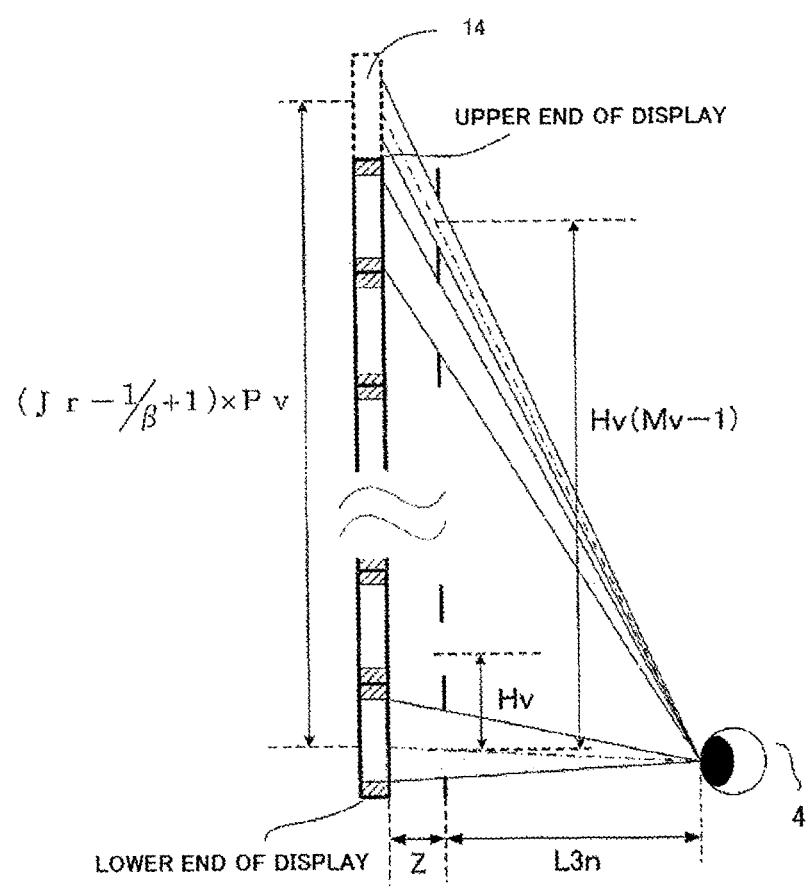
FIG. 8 is an explanatory view for calculating the interval Hv of vertically abutting visible light transmitting sections.
Figure 9:
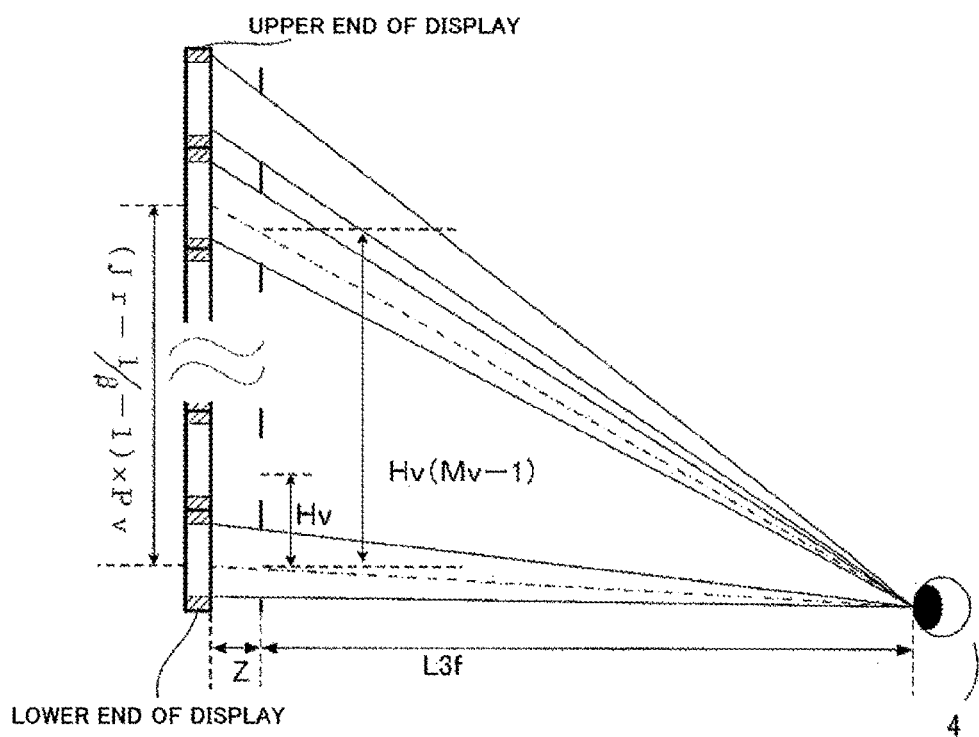
FIG. 9 is an explanatory view for calculating the interval Hv of vertically abutting visible light transmitting sections.
Figure 11A:
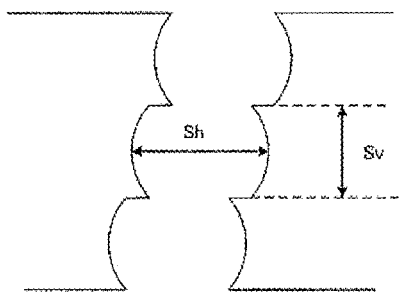
FIGS. 11A and 11B are diagrams showing examples of visible light transmitting sections of a parallax barrier.
Figure 11B:
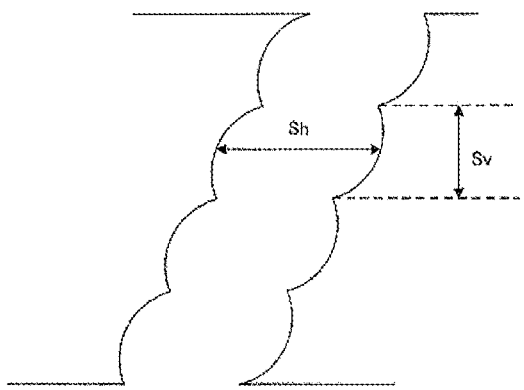
Figure 12A:
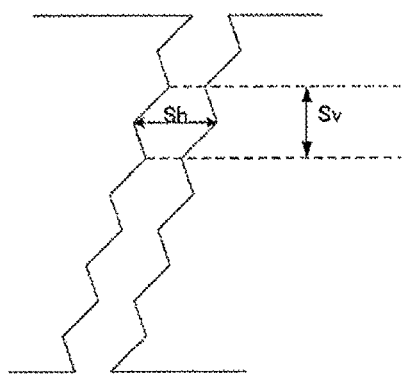
FIGS. 12A to 12E are diagrams showing examples of visible light transmitting sections of a parallax barrier.
Figure 12B:
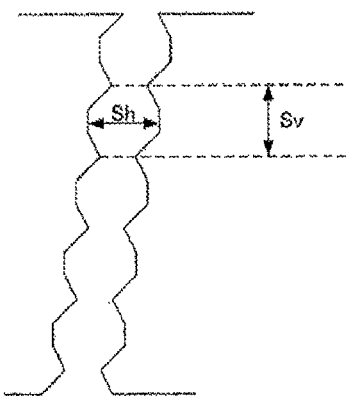
Figure 12C:
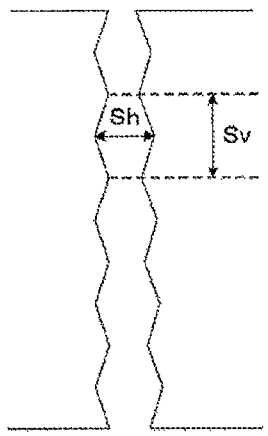
Figure 12D:
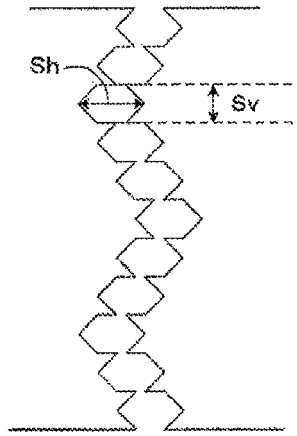
Figure 12E:
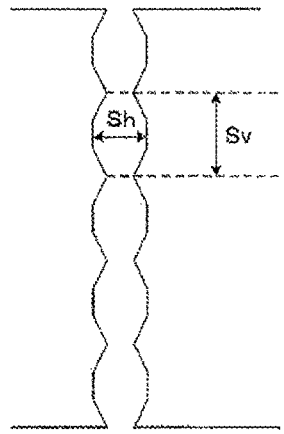
Figure 13A:
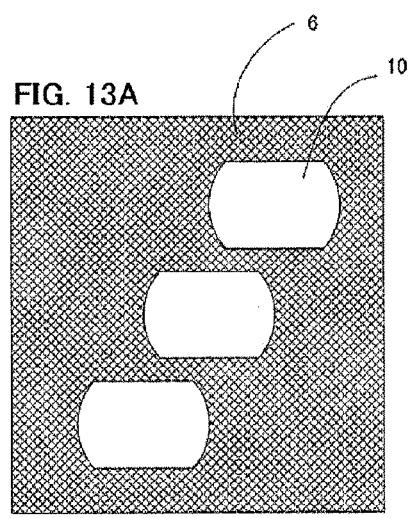
FIGS. 13A to 13D are diagrams showing examples of visible light transmitting sections of a parallax barrier.
Figure 13B:
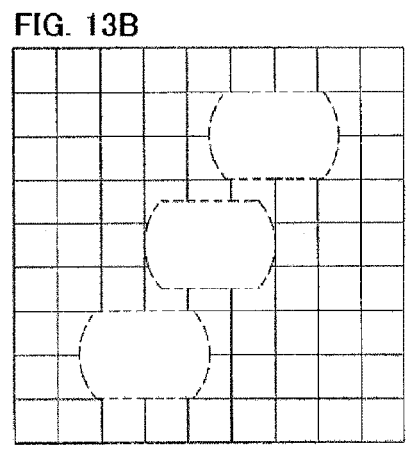
Figure 13C:
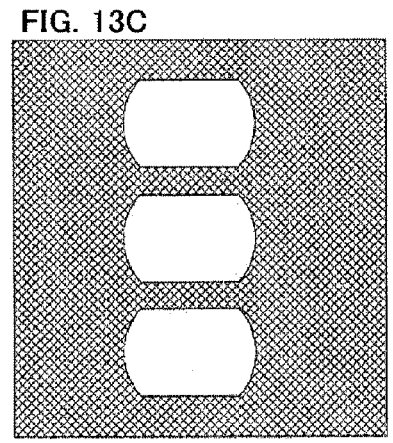
Figure 13D:
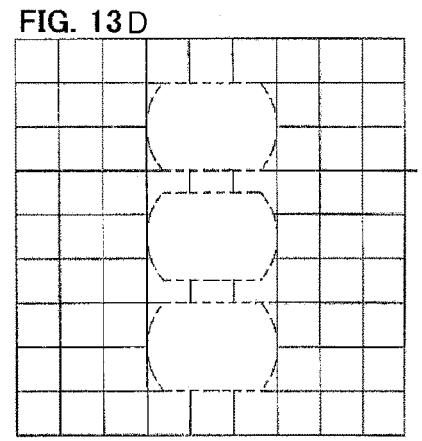
Figure 14A:
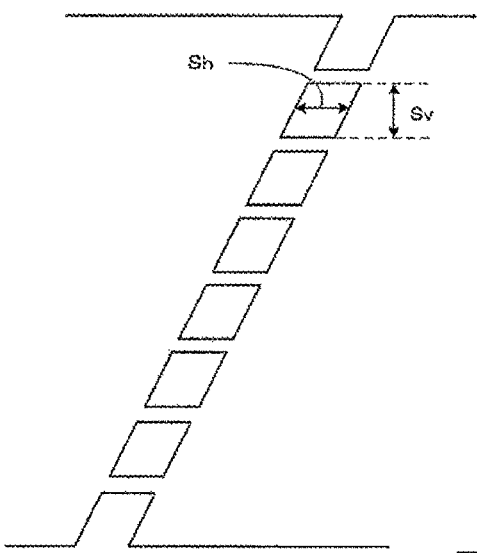
FIGS. 14A to 14G are diagrams showing examples of visible light transmitting sections of a parallax barrier.
Figure 14B:
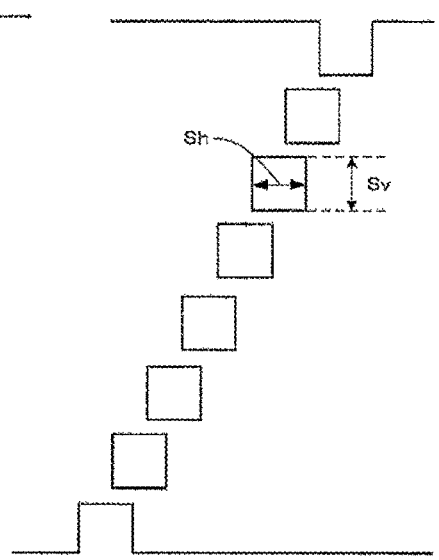
Figure 14C:
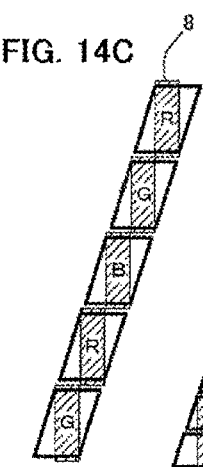
Figure 14D:
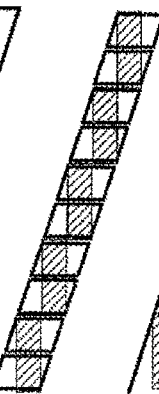
Figure 14E:
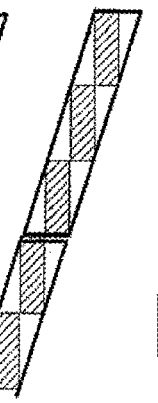
Figure 14F:
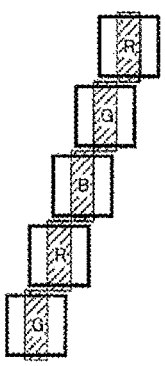
Figure 14G:
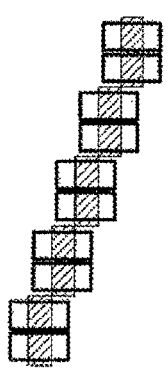
Figure 15A:
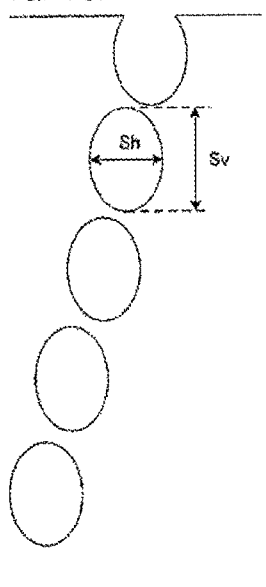
FIGS. 15A to 15E are diagrams showing examples of visible light transmitting sections of a parallax barrier.
Figure 15B:
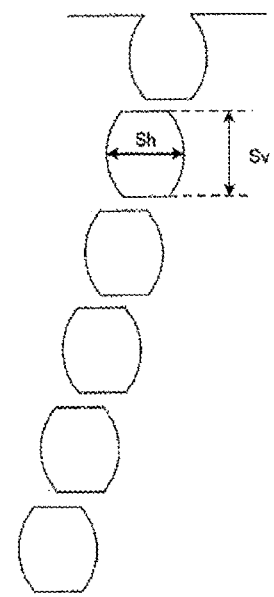
Figure 15C:
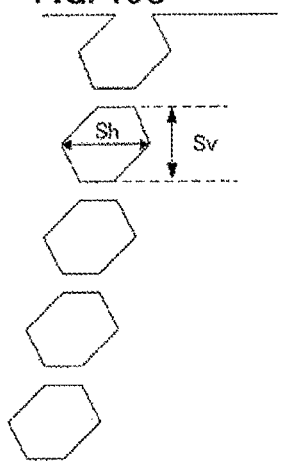
Figure 15D:
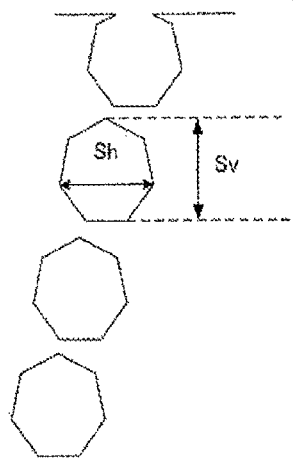
Figure 15E:
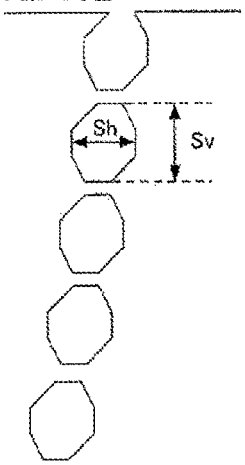

With reference to FIGS. 8 and 9, the following describes a method for calculating the value of an interval Hv of visible light transmitting sections of the repeated shapes that abut in a vertical direction of the parallax barrier or visible light transmitting sections of a plurality of holes based on the value of a distance L3n as a distance from the position close to the parallax barrier among the two kinds of such positions where one line of horizontal moiré is seen, away and close to the parallax barrier, to the parallax barrier when the shape of the edges of the slits as visible light transmitting sections constituting the parallax barrier is a staircase pattern, or a shape of repeated circular arcs, elliptic arcs, or pentagons, or the shape of the visible light transmitting sections constituting the parallax barrier is a plurality of independently formed holes.

As illustrated in FIG. 8, at L3n, similarly to a predetermined horizontal moire cancelling position (L3), a subject person of video image presentation 4 sees subpixels at the lower end of the display through the visible light transmitting sections of the parallax barrier. However, when the viewpoint shifts upward, the subject person of video image presentation sees subpixels above and instead of the subpixels that are supposed to be seen from L3 through the visible light transmitting sections. Then, when virtual subpixels 16 are assumed above the upper end of the display seen through the visible light transmitting sections that transmits visible light when seeing subpixels at the upper end of the display from L3, the subject person of video image presentation eventually sees the virtual subpixels 16. As such a cycle occurs once, it is considered that moire is generated once at L3n.

First, the following describes the number Mv of one unit of the visible light transmitting sections of the repeated shapes or the visible light transmitting sections of a plurality holes in a vertical direction from the visible light transmitting section of the above described shape corresponding to the subpixels at the upper end of the display to the visible light transmitting sections of the above described shape corresponding to the subpixels at the lower end of the display.

Figure 55A:
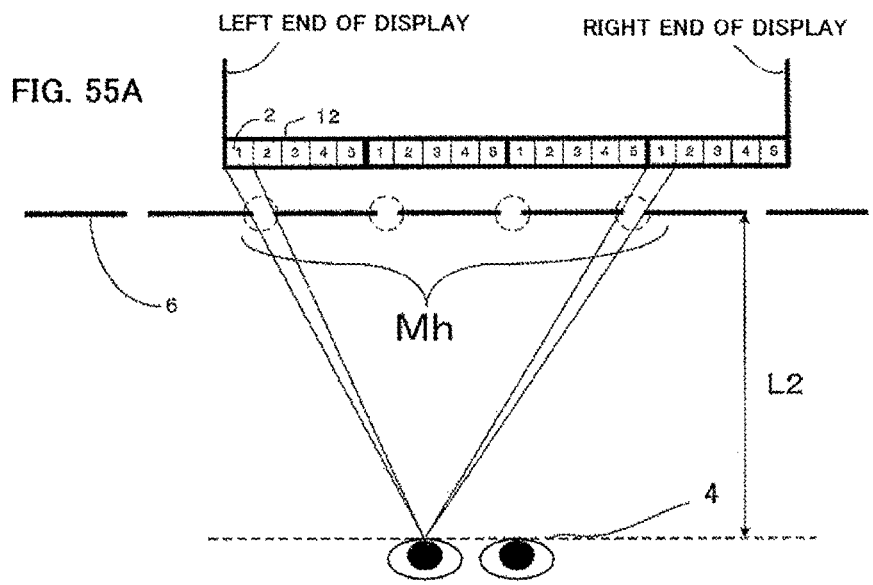
FIGS. 55A and 55B are explanatory views of Mh and Mv.
Figure 55B:
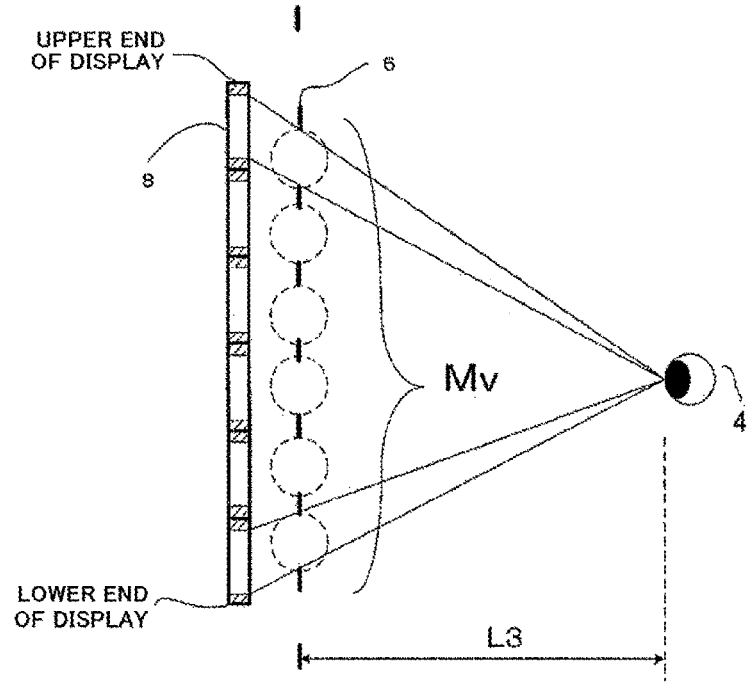

It should be noted that Mv is the number of visible light transmitting sections of a parallax barrier required to attain a three-dimensional effect of a video image on an autostereoscopic display when the subject person of video image presentation sees all pixels for three-dimensional display that display video images of the same viewpoint from one of the predetermined horizontal moire cancelling position (L3) as shown in FIG. 55B.

The "the number of one unit of visible light transmitting sections of the repeated shape" herein means, for example, if the shape of the slits as visible light transmitting sections of the parallax barrier is elliptic arcs, the number of how many elliptic arcs are formed along the slit corresponding to the arrangement of the pixels for three-dimensional display that display video images for the same viewpoint. Also, "the number of visible light transmitting sections of a plurality of holes" means the number of how many visible light transmitting sections of a plurality of holes are formed corresponding to the arrangement of pixels for three-dimensional display that display video images for the same viewpoint. Also, Jr indicates a vertical resolution of the display.

Therefore, Mv can be expressed by a formula $Jr \times \beta$.

$$Mv = Jr \times \beta$$

When the value of L3$n$ is a predetermined value, based on this value, the interval Hv of a plurality of vertically abutting visible light transmitting sections constituting a parallax barrier is calculated.

That is, as seen from FIG. 8, there is a relationship between [Hv (Mv−1)]: [(Jr−1/β+1)×Pv] and Z:(z+L3$n$) as expressed by the following formula:

$$\frac{Hv \times (Mv-1)}{L3n} = \frac{\left(Jr - \frac{1}{\beta} + 1\right) \times Pv}{Z + L3n}$$

Therefore, Hv can be calculated by the following formula:

$$Hv = \frac{\left(Jr - \frac{1}{\beta} + 1\right) \times Pv \times L3n}{(Z + L3n) \times (Mv-1)}$$

Next, the following describes a method for calculating the value of an interval Hv of visible light transmitting sections of the repeated shapes that abut in a vertical direction of the parallax barrier or visible light transmitting sections of a plurality of holes based on the value of a distance L3$f$ as a distance from the position away from the parallax barrier among the two kinds of such positions where one line of horizontal moiré is seen, away and close to the parallax barrier, to the parallax barrier when the shape of the edges of the slits as visible light transmitting sections constituting the parallax barrier is a staircase pattern, or a shape of repeated circular arcs, elliptic arcs, or pentagons, or the shape of the visible light transmitting sections constituting the parallax barrier is a plurality of independently formed holes.

As illustrated in FIG. 9, at L3$f$, similarly to a predetermined horizontal moire cancelling position (L3), a subject person of video image presentation 4 sees subpixels at the lower end of the display through the visible light transmitting sections of the parallax barrier. However, when the viewpoint shifts upward, the subject person of video image presentation sees subpixels below and instead of the subpixels that are supposed to be seen from L3 through the visible light transmitting sections. Then, the subject person of video image presentation eventually sees the subpixels below the upper end of the display through visible light transmitting sections that transmit visible light when seeing subpixels at the upper end of the display from the position L3. As such a cycle occurs once, it is considered that moire is generated once at L3$n$.

When the value of L3$f$ is a predetermined value, based on this value, the interval Hv of a plurality of vertically abutting visible light transmitting sections constituting a parallax barrier is calculated.

That is, as seen from FIG. 9, there is a relationship between [Hv×(Mv−1)]: [(Jr−1/β−1)×Pv] and Z:(Z+L3$f$) as expressed by the following formula:

$$\frac{Hv \times (Mv-1)}{L3f} = \frac{\left(Jr - \frac{1}{\beta} - 1\right) \times Pv}{Z + L3f}$$

Therefore, Hv can be expressed by the following formula:

$$Hv = \frac{\left(Jr - \frac{1}{\beta} - 1\right) \times Pv \times L3f}{(Z + L3f) \times (Mv-1)}$$

Figure 42:
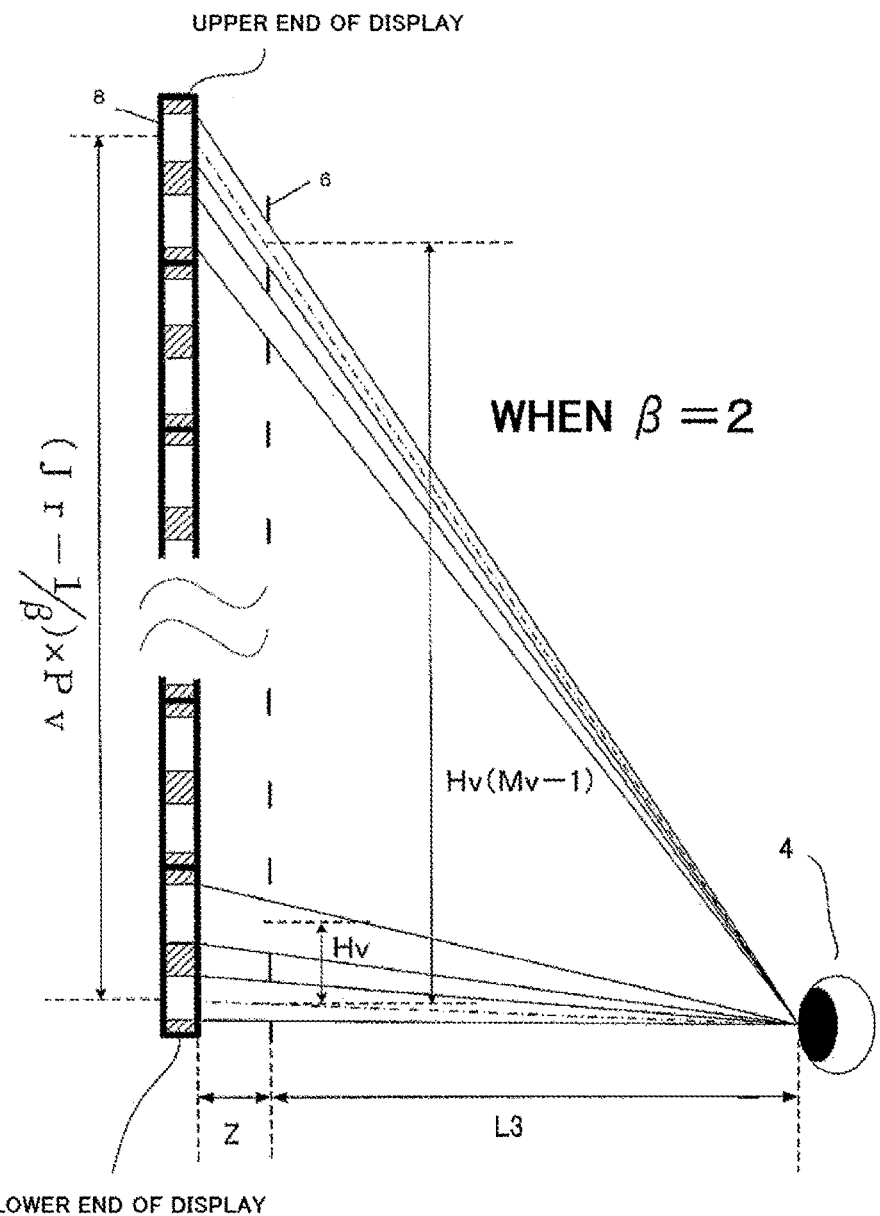
FIG. 42 is an explanatory view for calculating an interval Hv of vertically abutting visible light transmitting sections.

It should be noted that, if β=2, the relationship between [Hv×(Mv−1)] and [(Jr−1/β)×Pv] is as shown in FIG. 42.

It is preferable that, if the interval of vertically abutting subpixels is defined as Hpv, the value of Hv is a value that satisfies the relationship of an equation Hv=Hpv/β (β is a natural number).

Figure 38A:
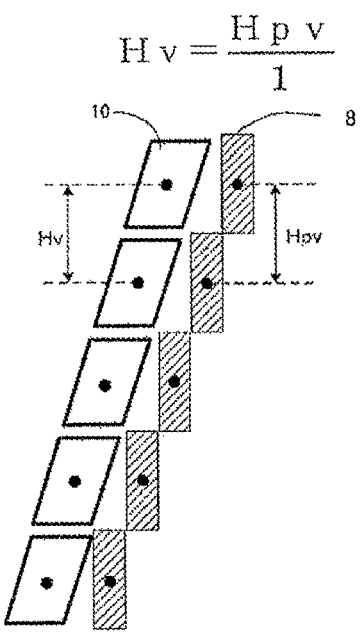
FIGS. 38A to 38D are diagrams showing a relationship between an interval Hpv of vertically abutting subpixels and an interval Hv of vertically abutting visible light transmitting sections.
Figure 38B:
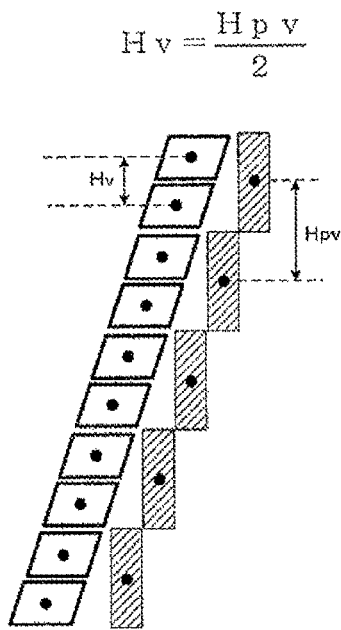
Figure 38C:
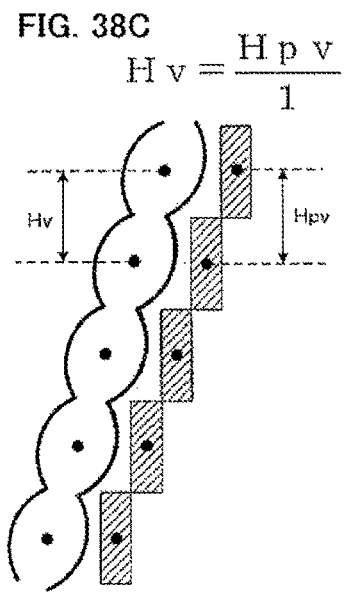
Figure 38D:
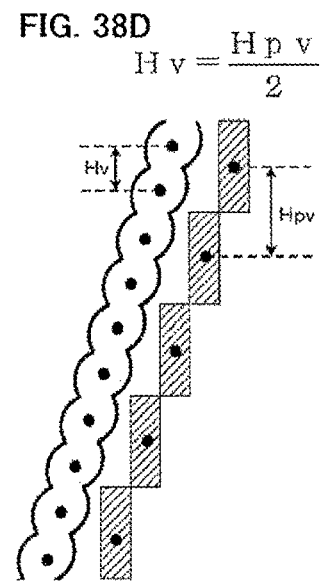
Figure 39:
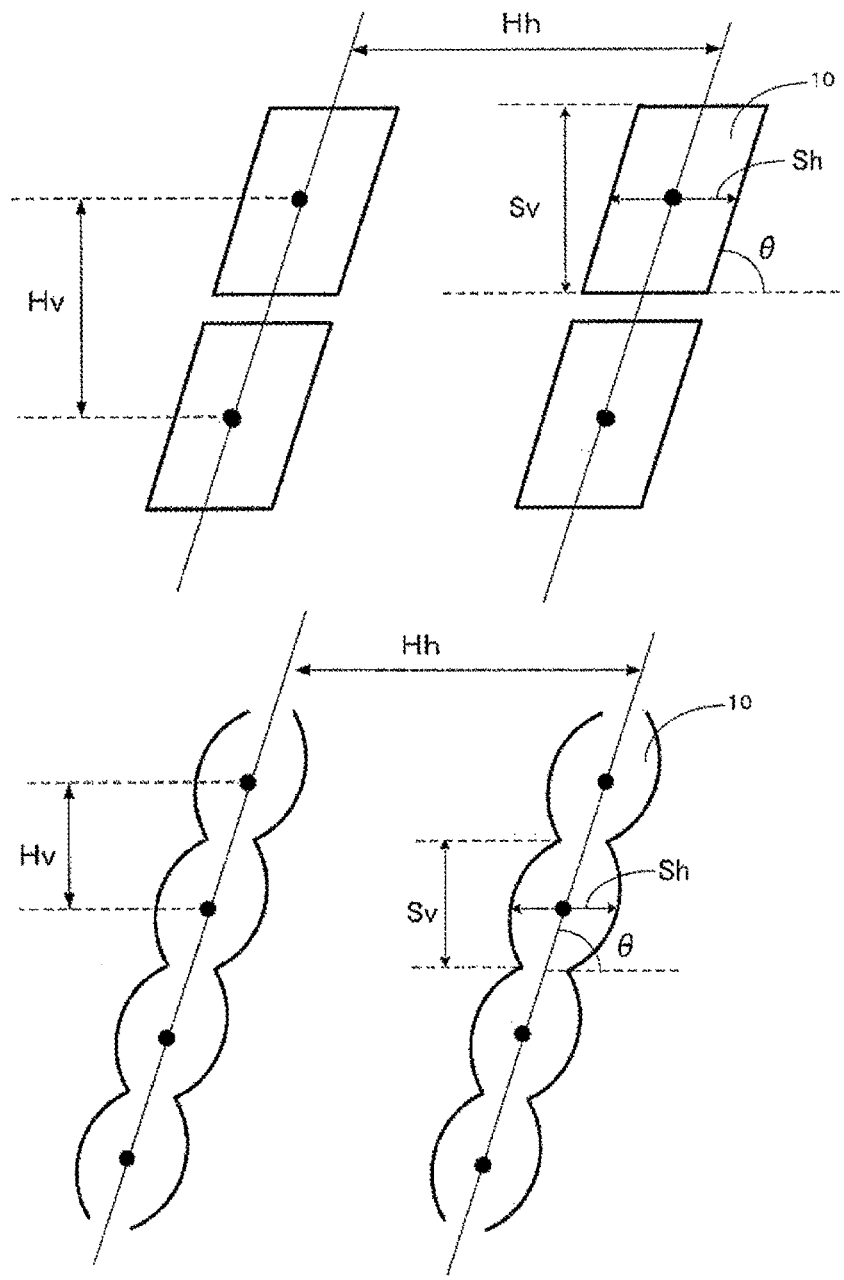
FIG. 39 is a reference diagram showing Sh, Sv, Hh, and Hv.

As illustrated in FIGS. 38A and 38C, if one visible light transmitting section is formed for one subpixel, Hv=Hpv/1. As illustrated in FIGS. 38B and 38D, if two visible light transmitting sections are formed for one subpixel, Hv=Hpv/2.

It should be noted that, as it is not preferable that the interval Hv of the vertically abutting visible light transmitting sections exceeds the interval Hpv of the vertically abutting subpixels, for example, the case in which the value of n becomes ½ is excluded.

Figure 19:
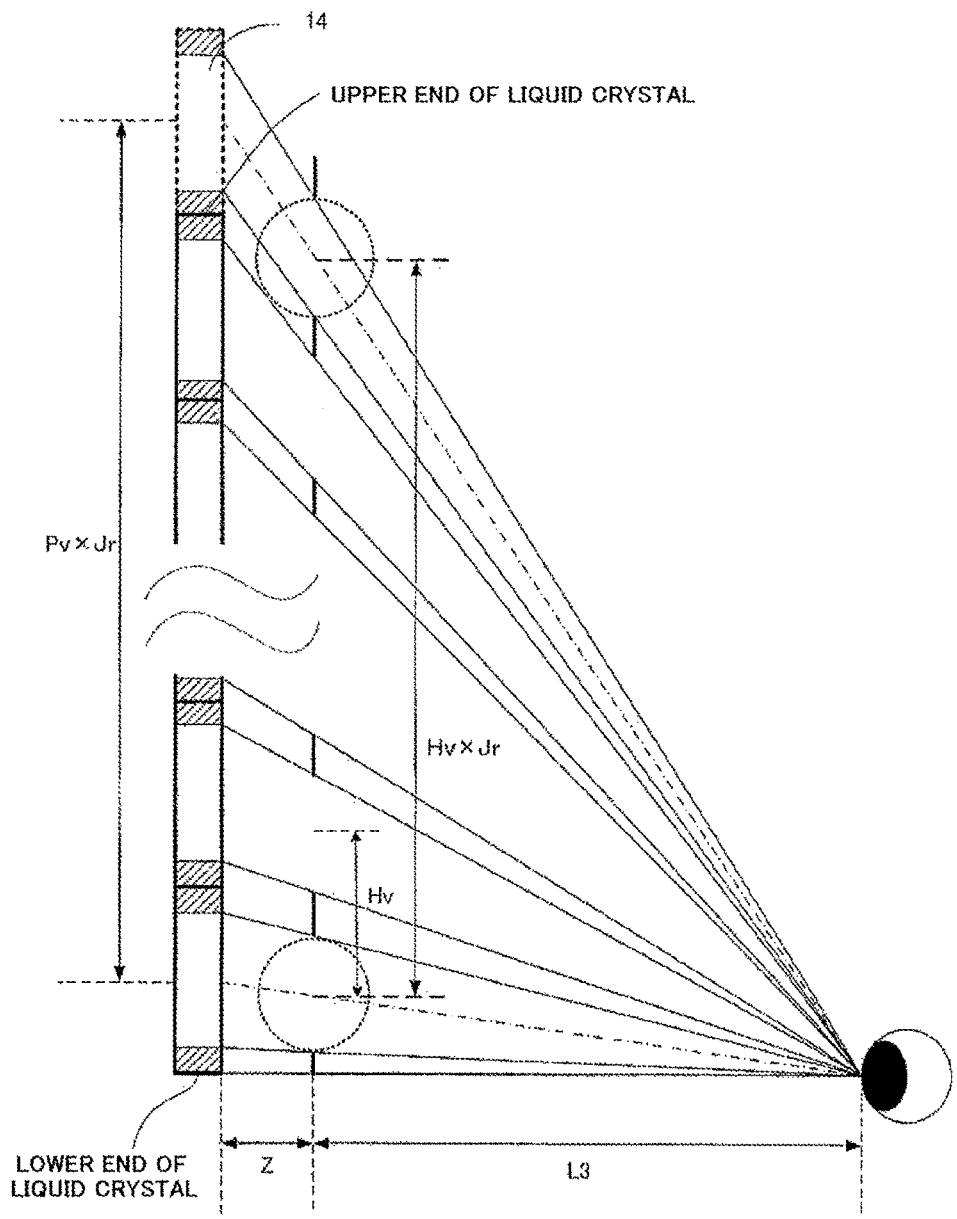
FIG. 19 is an explanatory view of a horizontal moire cancelling position.

Also, the values of L3$n$ and L3$f$ can be determined based on the value of L3, which will be described with reference to FIGS. 19 to 21.

If a vertical resolution Jr is multiplied by a height Pv of each subpixel, a distance from the lower end of the display to the upper end of the display can be obtained. A distance from the center of the subpixel at the lower end of the display to the center of a virtual subpixel 14 above the upper end of the display can also be expressed by (Pv×Jr).

Also, if Jr is multiplied by an interval Hv of vertically abutting visible light transmitting sections, a distance from the center of the visible light transmitting section corresponding to a subpixel at the lower end of the display to the center of the visible light transmitting section corresponding to a virtual subpixel 14 above the upper end of the display when seen from a moire cancelling position can be obtained: (Hv×Jr).

Figure 20:
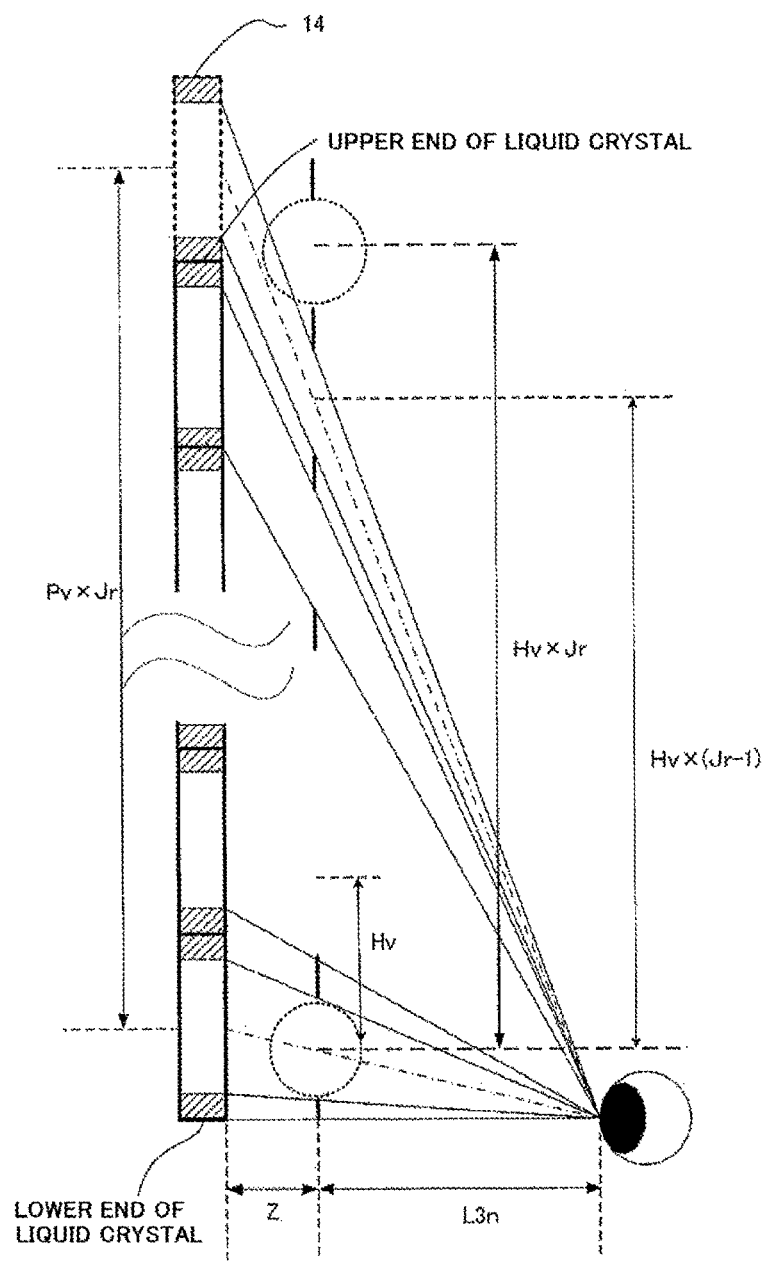
FIG. 20 is an explanatory view for calculating the shortest distance L3n of an appropriate horizontal moire cancelling area.

Next, with reference to FIG. 20, L3$n$ is calculated.

At L3$n$, as one line of vertical moire is recognized by a subject person of video image presentation, the number of visible light transmitting sections of a parallax barrier through which the subject person of video image presentation sees a three-dimensional video image is smaller than the number of vertical subpixels by one, the subject person of video image presentation sees all subpixels through the visible light transmitting sections.

Therefore, L3$n$ is a point where a cycle of moire generation in a vertical direction occurs once.

Therefore, the distance from the center of visible light transmitting section of a parallax barrier corresponding to the subpixel at lower end of the display to the visible light transmitting section of the parallax barrier corresponding to the virtual subpixel above the upper end of the display when seen from L3n can be expressed as Hv×(Jr−1).

Here, by assigning Hv in the above formula (4) into this formula, the following formula can be expressed:

$$\left(\frac{L3 \times Pv}{L3 + Z}\right) \times (Jr - 1)$$

Also, as seen from FIG. 20, there is a relationship between L3n: (L3n+Z) and $$\left(\frac{L3 \times Pv}{L3 + Z}\right) \times (Jr - 1) : (Pv \times Jr)$$

as expressed by the following formula:

$$\frac{L3n}{(L3 \times Pv/L3 + Z) \times (Jr - 1)} = \frac{L3n + Z}{Pv \times Jr}$$

$$\therefore \frac{L3n \times (L3 + Z)}{(L3 \times Pv) \times (Jr - 1)} = \frac{L3n + Z}{Pv \times Jr}$$

$$\therefore L3n \times (L3 + Z) \times (Pv \times Jr) = (L3n + Z) \times (Jr - 1) \times (L3 \times Pv)$$

$$\therefore L3n \times (L3 + Z) \times Jr = (L3n + Z) \times (Jr - 1) \times L2$$

$$\therefore L3n \times (L3 + Z) \times Jr = L3n(Jr - 1)L3 + Z(Jr - 1)L3$$

$$\therefore L3n\{(L3 \times Jr) + (Z \times Jr) - (Jr \times L3) + L3\} = Z(Jr - 1)L3$$

Therefore, L3n can be expressed by the following formula:

$$\therefore L3n = \frac{Z(Jr - 1)L3}{ZJr + L3}$$

Figure 21:
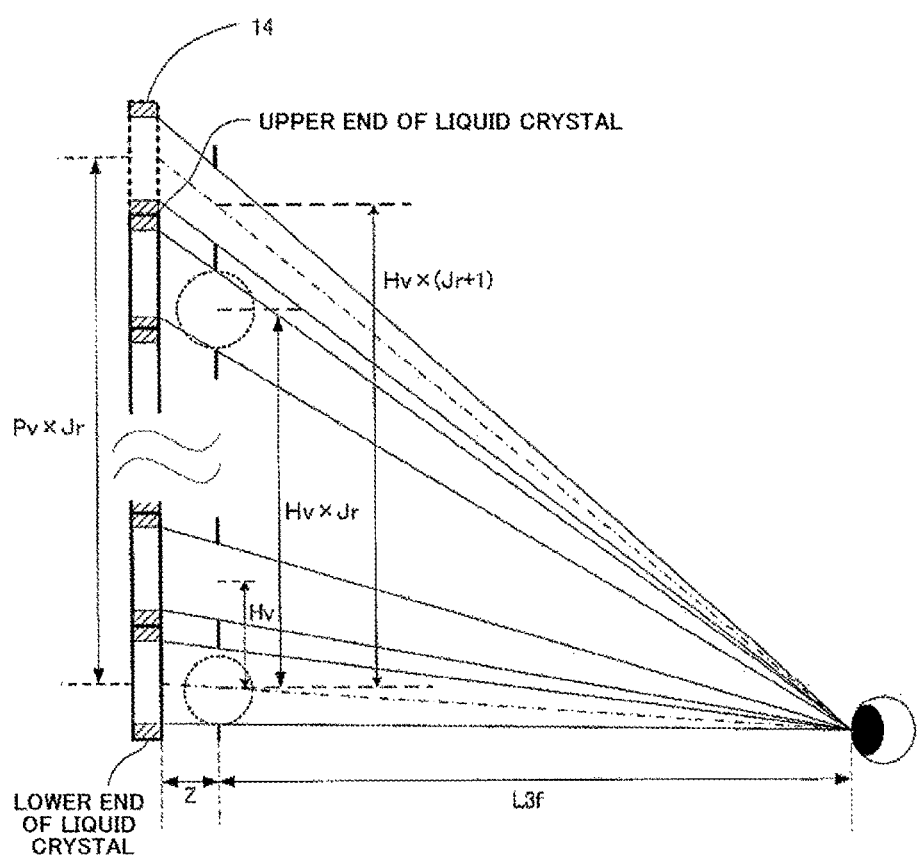
FIG. 21 is an explanatory view for calculating the longest distance L3f of an appropriate horizontal moire cancelling area.

Next, with reference to FIG. 21, based on the value of L3, the value of L3f can be calculated.

As one line of vertical moire is recognized by a subject person of video image presentation from L3f, the number of visible light transmitting sections of a parallax barrier through which the subject person of video image presentation sees a three-dimensional video image is greater than the number of vertical subpixels by one, the subject person of video image presentation sees all subpixels through the visible light transmitting sections.

Therefore, the distance from the center of a visible light transmitting section of a parallax barrier corresponding to the subpixel at the lower end of the display to a visible light transmitting section of the parallax barrier corresponding to the virtual subpixel 14 above the upper end of the display when seen from L3f can be expressed as Hv×(Jr+1).

Therefore, similarly to the way of calculating L3n, L3f can be calculated by the following formula:

$$L3f = \frac{Z(Jr + 1)L3}{ZJr - L3}$$

It should be noted that the range from L3n to L3f is the appropriate moire cancelling area in a vertical direction.

With reference to FIG. 68, a case in which a most appropriate three-dimensionally viewable position and a diagonal moire cancelling position are not the same position, and a case in which the most appropriate three-dimensionally viewable position and a diagonal moire cancelling position are the same position will be described. It should be noted that the value of a distance L1 from the most appropriate three-dimensionally viewable position to the parallax barrier and the value of a distance L2 from the diagonal moire cancelling position to the parallax barrier are values that can be determined by a designer of an autospectroscopic display according to the position, situation, and the like for displaying a three-dimensional video image.

FIG. 68A is a diagram illustrating a case in which the most appropriate three-dimensionally viewable position and a diagonal moire cancelling position are not the same position. For example, if video images for five viewpoints are used as video images for a plurality of viewpoints for displaying a three-dimensional video image, and if the right eye sees an image for the third viewpoint and the left eye sees an image for the forth viewpoint at the center of the display (the third and forth viewpoints are not necessarily at the center) from a most appropriate three-dimensionally viewable position, when the eyes moves from the center to each end, the right eye sees a video image for the second viewpoint and the left eye sees a video image for the third viewpoint, or the right eye sees a video image for the fourth viewpoint and the left eye sees a video image for the fifth viewpoint. In this way, as the left eye always sees an image of a viewpoint at right of the image of a viewpoint seen by the right eye, a three-dimensional effect is not affected. However, while the eyes move towards the ends, a reverse phenomenon occurs at a jump point at the right end where the right sees a video image for the first viewpoint and the left eye sees a video image for the second viewpoint, or the right eye sees a video image for the fifth viewpoint and the left eye sees a video image for the first viewpoint, and some part of the three-dimensional image becomes hard to see. In this way, at most one reverse phenomenon occurs in the moire cancelling area (L2n to L3n).

FIG. 68B is a drawing illustrating a case in which the most appropriate three-dimensionally viewable position and a diagonal moire cancelling position are the same position. For example, if video images for five viewpoints are used as video images for a plurality of viewpoints for displaying a three-dimensional video image, and if the right eye sees an image for the third viewpoint and the left eye sees an image for the fourth viewpoint at the center of the display (the third and fourth viewpoints are not necessarily at the center) from a most appropriate three-dimensionally viewable position, the right eye sees an image for the third viewpoint and the left eye sees an image for the fourth viewpoint over the whole surface of the display without generating any jump point, and thus, the subject person of video image presentation can see a most appropriate three-dimensional video image.

With reference to FIGS. 24A to 25B, the following describes the minimum value and the maximum value of the width Vh of a predetermined effective viewable area seen by one eye of a subject person of video image presentation through a visible light transmitting sections of the parallax barrier.

In FIGS. 24A to 25B, subpixels drawn by diagonal lines indicates subpixels that display a video image to be recognized by the subject person of video image presentation, and a collection of these subpixels indicated by the diagonal lines is a pixel for three-dimensional display.

First, while a rectangular area as a maximum area on an image display surface that is to be seen from a predetermined most appropriate three-dimensionally viewable position by a subject person of video image presentation through visible light transmitting sections of a parallax barrier is required to be determined, the width Vh max of the rectangular area is required to be a value of 2αPh or more as each subpixel is required to be seen even at a concatenation point of the subpixels when subpixels that display a video image for a plurality of viewpoints form one pixel for three-dimensional display by diagonally shifting. Further, if video images of two viewpoints or more are seen, video images except for images for main N viewpoints are seen, thus, the width Vh max of the rectangular area is required to be a value of 3αPh or less to prevent blurring of the video images.

Figure 24A:
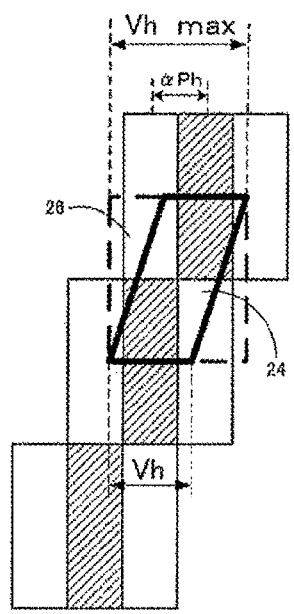
FIGS. 24A to 24E are explanatory views of minimum values and maximum values of the width Vh of an effective viewable area.

Also, as shown in FIGS. 24A and 25A, if the shape of the visible light transmitting sections of the parallax barrier is inclined, the value of the width Vh of the effective viewable area that can be seen through the visible light transmitting sections becomes smaller than the value of the width Vh max of the rectangular area. In such a case, Vh should be 1αPh or more to be larger than at least a distance αPh between the centers of pixels for three-dimensional display that display video images for neighboring viewpoints so that the subject person of video image presentation can see the three-dimensional image and the rectangular area can take a value more than the value of the width Vh max.

In this way, when a predetermined value of the width Vh of the effective viewable area is 1αPh or more and Vh max or less, the subject person of video image presentation can particularly effectively recognize a three-dimensional video image.

Figure 24B:
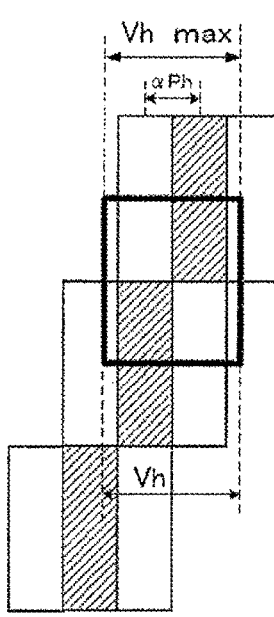
Figure 24C:
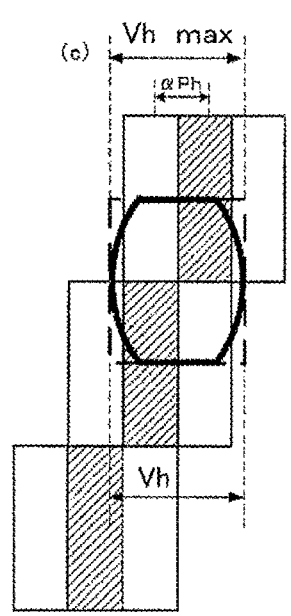

Also, as illustrated in FIGS. 24B and 24C, the shape of the effective viewable area can be arbitrary determined as long as the upper and lower sides and/or left and right sides of the shape abuts the rectangular area.

Figure 24D:
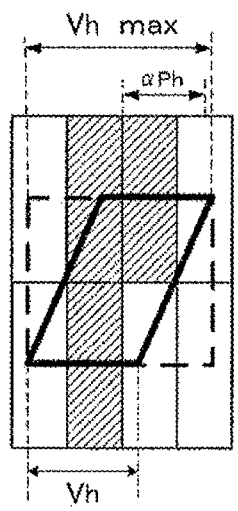
Figure 24E:
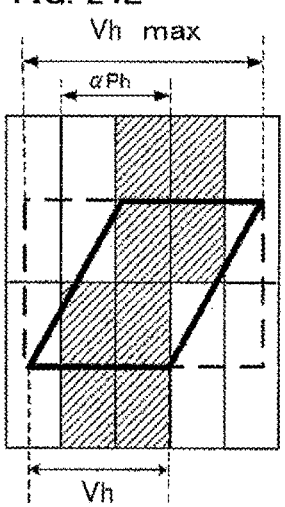

As illustrated in FIGS. 24D and 24E, if subpixels are blended, the value of Vh max is increased or decreased as necessary in proportion to the value of αPh.

It should be noted that, as shown in FIGS. 24A and 25A, if the shape of the visible light transmitting sections of the parallax barrier is inclined and the effective viewable area seen through the visible light transmitting sections is also inclined, a three-dimensional video image can be clearly seen while mixing of views hardly occurs. On the other hand, as in FIGS. 24B and 25B, if the rectangular area and the effective viewable area are the same, clarity of the three-dimensional video image is degraded while jump points are decreased by mixing of views.

Next, the appropriate three-dimensionally viewable area will be described with reference to FIGS. 29, 30 and 35.

Figure 35:
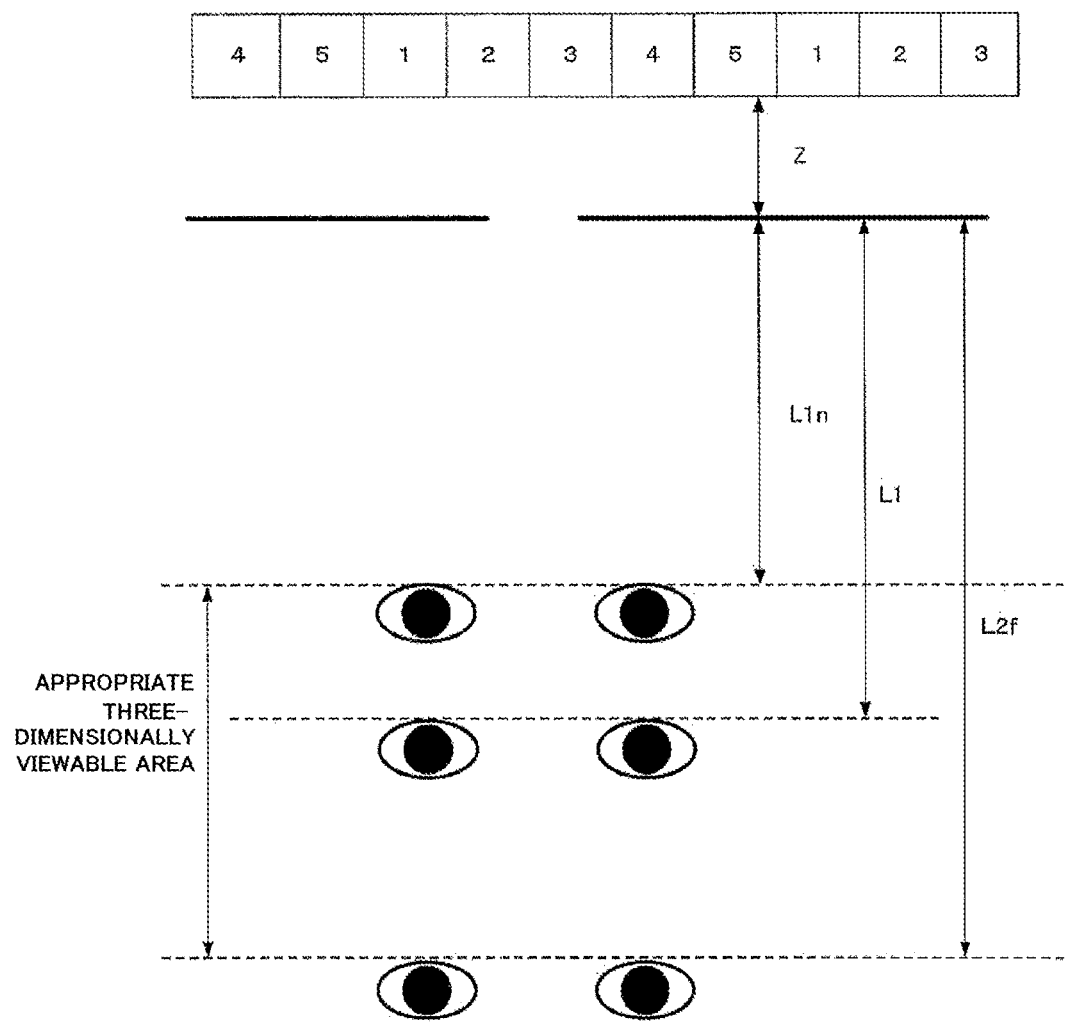
FIG. 35 is an explanatory view of an appropriate three-dimensionally viewable area.

The appropriate three-dimensionally viewable area refers to an area from L1*n* to L1*f* indicated in FIG. 35.

Figure 29:
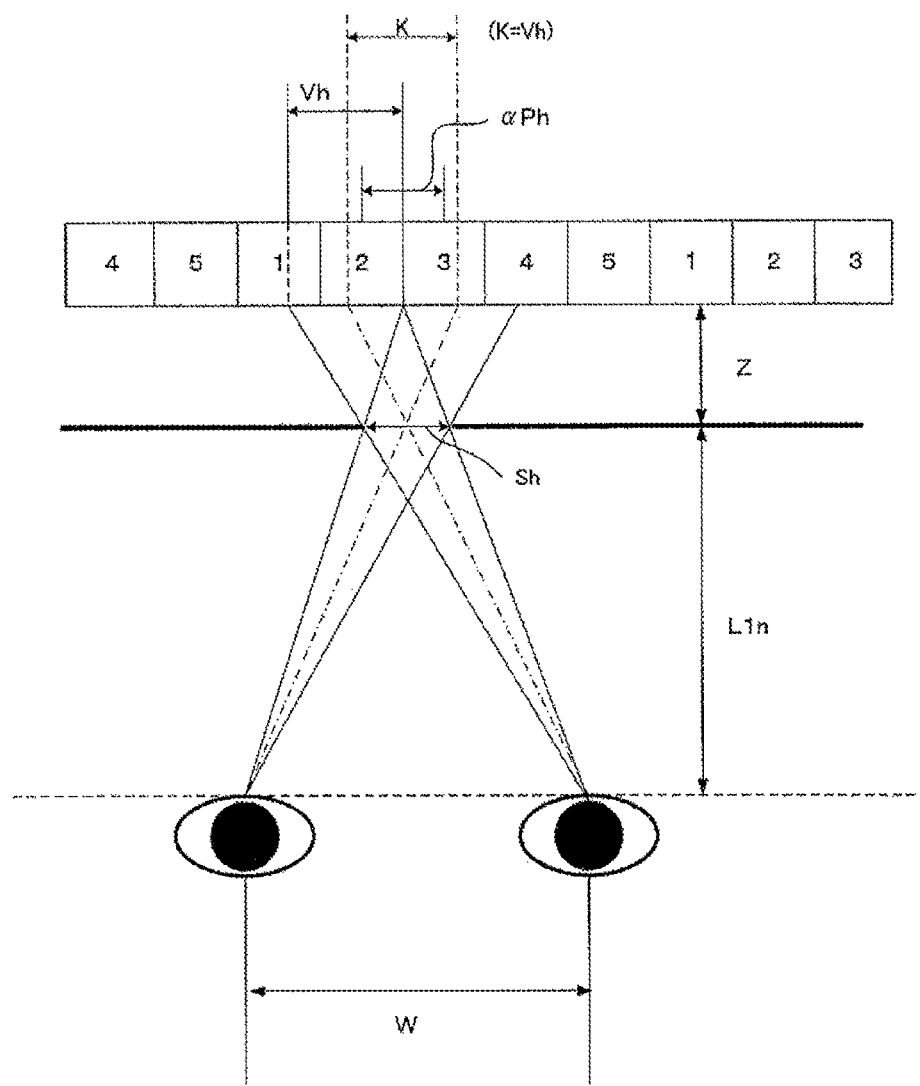
FIG. 29 is an explanatory view for calculating the shortest distance L1n of an appropriate three-dimensionally viewable area.

Here, L1*n* is the shortest distance in the appropriate three-dimensionally viewable area under a condition in which the effective viewable areas seen by both eyes do not overlap each other and an area that both eyes cannot see is not be generated at the center as shown in FIG. 29.

Therefore, as a distance K between the focal points of both eyes is a distance obtained by connecting the middle points of the effective viewable areas of respective eyes, the value becomes equal to the value of the effective viewable area Vh of one eye.

The range from L1*n* to L1 can offer a three-dimensional effect most largely and clearly, while the range hardly generate mixing of views, and, thus, the jump point becomes large.

It should be noted that the three-dimensional effect gradually becomes faint and a two-dimensional video image is eventually seen from behind L1. The range from which a three-dimensional effect can be appropriately attained can be considered approximately twice as much as L2 while a difference exists due to the popping out degree of the content and individual variation. Also, the parallax becomes large and the three-dimensional effect is enhanced from closer than L1*n*, while the image is defocused.

The appropriate three-dimensionally viewable area can be obtained by calculation.

First, the value of L1*n* is calculated with reference to FIG. 29.

As seen from FIG. 29, the relationship of a distance between the focal points of both eyes in Z:L1*n* and L1*n*, K (=Vh): W, can be expressed by the following formula:

$$\frac{L1n}{W} = \frac{Z}{Vh}$$

Therefore, the shortest distance L1*n* of the appropriate three-dimensionally viewable area can be expressed by the following formula:

$$L1n = \frac{Z \times W}{Vh}$$

It should be noted that if Vh is expressed as (δ×αh), L1*f* can be expressed by the following formula:

$$L1n = \frac{Z + W}{\delta \times \alpha Ph}$$

Here, δ represents an aperture of a parallax barrier in a horizontal direction, and is also a coefficient of how small the value of the width Vh of the effective viewable area of one eye seen through the visible light transmitting sections of a parallax barrier may take in relation to the value of αPh as a distance between the centers of pixels for three-dimensional display that display video images for neighboring viewpoints.

Figure 30:
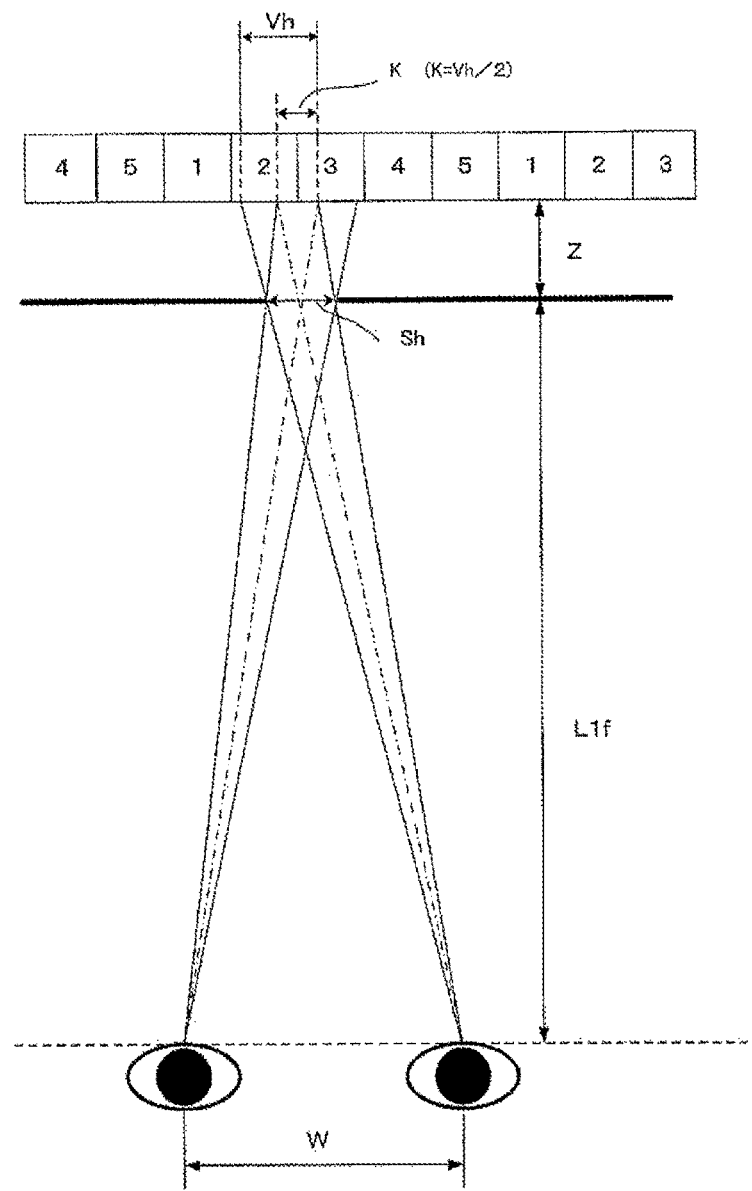
FIG. 30 is an explanatory view for calculating the farthest distance L1f of an appropriate three-dimensionally viewable area.

Next, with reference to FIG. 30, the value of the longest distance L1*f* of the appropriate three-dimensionally viewable area is calculated. At L1*f*, the distance K between the focal points of both eyes becomes a value of Vh/2. (K=Vh/2) That is, the value becomes ½ the value of a distance K between focal points of both eyes at L1.

As seen from FIG. 30, the relationship of a distance between the focal points of both eyes in Z:L1*f* and L1*f*, K(=Vh/2): W, can be expressed by the following formula:

$$\frac{L1f}{W} = \frac{Z}{V\frac{h}{2}}$$

Therefore, the longest distance L1*f* of the appropriate three-dimensionally viewable area can be expressed by the following formula:

$$L1f = \frac{2 \times Z \times W}{Vh}$$

Based on the above formula, a range from the determined L1*n* to L1*f* is referred to as an appropriate three-dimensionally viewable area.

In the appropriate three-dimensionally viewable area, almost all people can effectively see a three-dimensional video image without individual variation.

It should be noted that, while a three-dimensional video image can be seen even from outside the appropriate three-dimensionally viewable area, the three-dimensional effect cannot be attained effectively. If a distance L1 from the most appropriate three-dimensionally viewable position to the parallax barrier is expressed as in the following formula, while there is individual variation, the subject person of video image presentation can see a three-dimensional video image until L1ff which is a distance approximately twice the distance of L1 and will be described later.

As seen from FIG. 1, there is a relationship between L1:W and W:αPh as expressed by the following formula, and the value of L1 can be calculated by the following formula:

$$\frac{L1}{Z} = \frac{W}{\alpha Ph}$$

$$\therefore L1 = \frac{W \times Z}{\alpha Ph}$$

Based on this, the value of L1ff can be calculated by the following formula:

$$\frac{L1ff}{Z} = \frac{W}{\alpha P\frac{h}{2}}$$

$$\therefore L1ff = \frac{2 \times W \times Z}{\alpha Ph}$$

It is preferable to set a moire cancelling position within the determined appropriate three-dimensionally viewable area according to these formulas. That is, while it is possible to provide a moiré canceling position outside the appropriate three-dimensionally viewable area and moiré is cancelled even in such a case, a three-dimensional image cannot be adequately seen, which is not effective.

The value of the distance Z can be calculated based on the value of a predetermined shortest distance L1n or the value of a predetermined longest distance L1f from the parallax barrier to the appropriate three-dimensionally viewable area.

In such a case, the values of L1n and L1f can be defined as predetermined values.

That is, firstly, as seen from FIG. 29, there is a relationship between Z:L1f and K (=Vh): W as expressed by the following formula:

$$\frac{Z}{Vh} = \frac{L1n}{W}$$

Therefore, in such a case, the aperture distance Z is expressed by the following formula:

$$Z = \frac{Vh \times L1n}{W}$$

Also, as seen from FIG. 30, there is a relationship between Z:L1f and K (=Vh/2):W as expressed by the following formula:

$$\frac{Z}{Vh/2} = \frac{L1f}{W}$$

Therefore, in such a case, the distance Z can be expressed by the following formula:

$$Z = \frac{Vh \times L1f}{2W}$$

Figure 26:
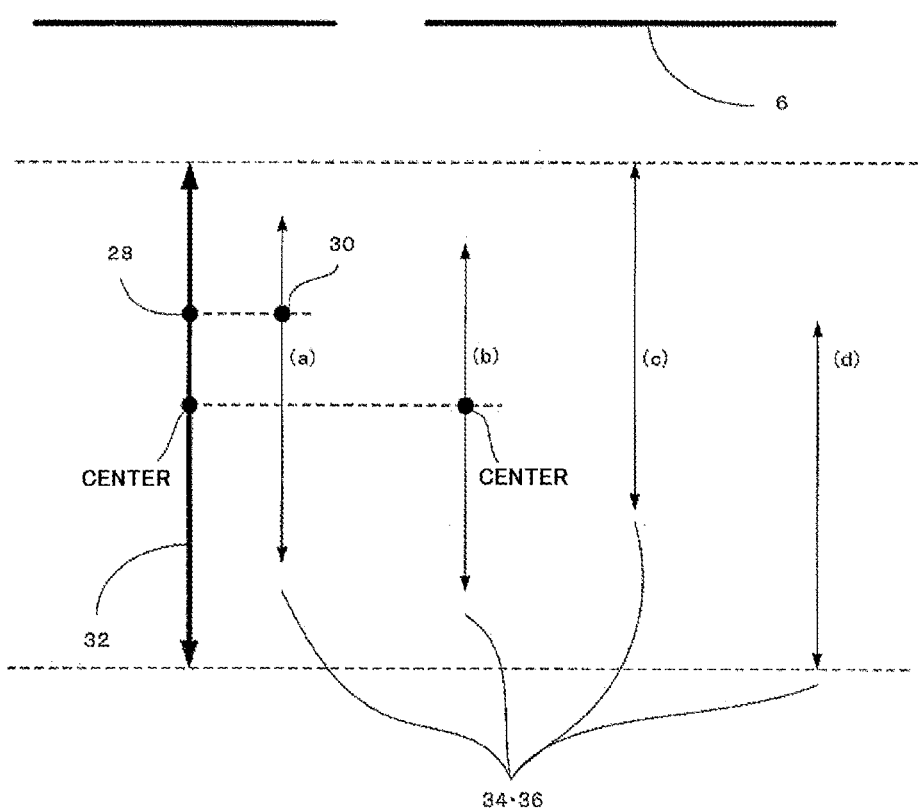
FIG. 26 is a diagram showing an example of a case in which an appropriate three-dimensionally viewable area and an appropriate moire cancelling area are overlapped.
Figure 27:
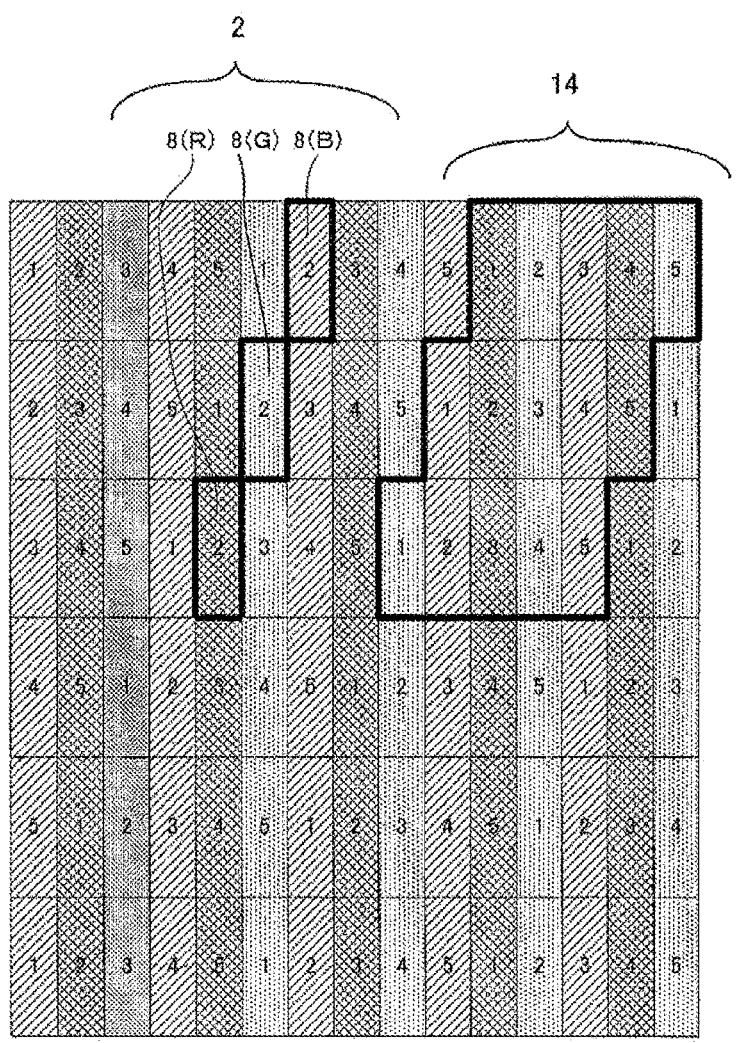
FIG. 27 is a diagram comparing pixels for three-dimensional display and a pixel unit for three-dimensional display.

Further, as shown in FIG. 26, by setting an area from L1n to L1f (an appropriate three-dimensionally viewable area 32), an area from L2n to L2f (a vertical moire cancelling area 34), and an area from L3n to L3f (a horizontal moire cancelling area 36) to overlap one another, it is possible to cause the subject person of video image presentation to see an appropriate three-dimensional video image within the overlapping area in a manner in which moire is appropriately cancelled.

Figure 28:
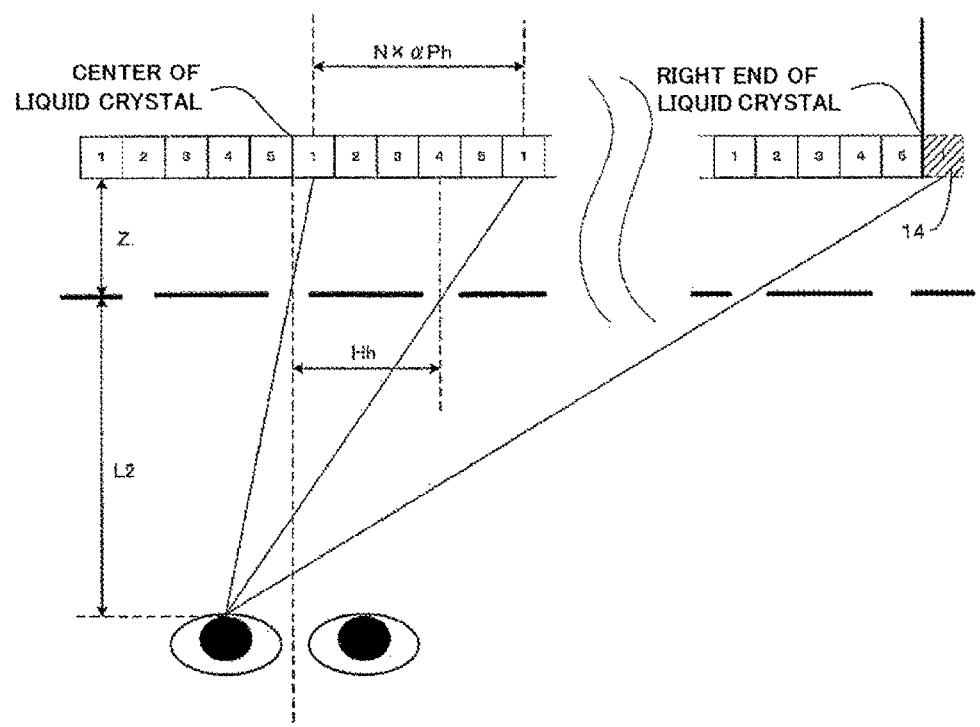
FIG. 28 is an explanatory view for calculating the interval Hh of horizontally abutting visible light transmitting sections.

As a method for setting the appropriate three-dimensionally viewable area and the appropriate moire cancelling areas to overlap one another, for example, there can be considered: a method for matching the value of a distance L1 from the parallax barrier to the most appropriate three-dimensionally viewable position 34 and the value of the distance L2 or/and L3 from the parallax barrier to the moiré canceling position as shown in FIG. 26A; a method for matching the center position of the appropriate three-dimensionally viewable area and the center position of the appropriate moiré canceling position as shown in FIG. 26B; a method for matching the value of the shortest distance L1n of the appropriate three-dimensionally viewable area and the value of the shortest distance L2n or/and L3n of the appropriate moiré canceling area as shown in FIG. 26C; or, a method for matching the value of the longest distance L1f of the appropriate three-dimensionally viewable area and the value of the longest distance L2f or/L3f of the appropriate moiré canceling area as shown in FIG. 26D Next, with reference to FIG. 28, an interval Hh between a plurality of horizontally abutting slit areas constituting the parallax barrier using other calculating formulas.

As seen from FIG. 28, there is a relationship between Hh:L2 and (N×αPh): (L2+Z) as expressed by the following formula:

$$\frac{Hh}{L2} = \frac{N \times \alpha Ph}{L2 + Z}$$

Therefore, the interval H of the slit areas can be expressed by the following formula:

$$Hh = \frac{L2 \times N \times \alpha Ph}{L2 + Z}$$

In this way, the slit interval Hh for designing a parallax barrier is determined by at which distance the distance L2 from the parallax barrier to the diagonal moire cancelling position is set.

With reference to FIG. 31, when the shape of slits as visible light transmitting sections constituting the parallax barrier is a staircase pattern, or a shape in which circular arcs, elliptic arcs, or polygons are repeated, or the shape of visible light transmitting sections constituting the parallax barrier is a plurality of independently formed holes, the value of an interval Hv of the visible light transmitting sections of the repeated shape or the visible light transmitting sections of a plurality of holes that abut in a vertical direction of the parallax barrier is calculated using another calculating formula.

In FIG. 31, Jr represents a vertical resolution of the display, and Pv represents a height of the subpixel.

In FIG. 7, a subject person of video image presentation 4 sees subpixels at the lower end of the display and subpixels at the upper end of the display through visible light transmitting sections of the parallax barrier from a predetermined diagonal moire cancelling position.

In this way, as the subject person of video image presentation always gazes the centers of the subpixels through the visible light transmitting sections of the parallax barrier, the subject person of video image presentation never see moire on the screen.

Firstly, the following describes the number Mv of one unit of the visible light transmitting sections of the repeated shape or the visible light transmitting sections of a plurality of holes in a vertical direction from the visible light transmitting section of the shape corresponding to the subpixels at the upper end of the display to the visible light transmitting section of the shape corresponding to the subpixels at the lower end of the display.

Here, "the number of one unit of the visible light transmitting sections of the repeated shape" means, when, for example, the shape of the slits as the visible light transmitting sections of a parallax barrier is elliptic arcs, the number of how many such elliptic arcs are formed along each slit corresponding to the array of pixels for three-dimensional display that display a video image of the same viewpoint. Also, "the number of the visible light transmitting sections of a plurality of holes" means the number of how many such visible light transmitting sections of a plurality of holes are formed in correspondence to the array of pixels for three-dimensional display that display a video image of the same viewpoint.

Therefore, Mv can be expressed by a formula Jr×β.

$$Mv = Jr \times \beta$$

For example, as shown in FIGS. 36A and 36D, if one visible light transmitting section is formed in correspondence to one subpixel 8, β becomes 1. Also, as shown in FIGS. 36B and 36E, if two visible light transmitting sections are formed in correspondence to one subpixel 8, β becomes 2. Further, as shown in FIGS. 36C and 36F, if one visible light transmitting section is formed in correspondence to three subpixels 8, β becomes ⅓.

That is, β is the number of one unit of the visible light transmitting sections of the repeated shape or the visible light transmitting sections of a plurality of holes in a vertical direction corresponding to one subpixel.

It should be noted that the plurality of visible light transmitting sections provided in relation to one subpixel are preferably integer number. Also, to provide one visible light transmitting section for a plurality of subpixels, it is preferable to provide visible light transmitting sections of integer number for one pixel for three-dimensional display.

Also, when seen from L3, the distance from the center of visible light transmitting section corresponding to the subpixels at the lower end thereof to the center of visible light transmitting section corresponding to the subpixels at the upper end thereof can be expressed by the following formula.

However, as illustrated in FIG. 42, if the value of β exceeds one, the following formula indicates a distance from the center of a visible light transmitting section located at the lowermost end thereof among the visible light transmitting sections corresponding to the subpixels at the lower end thereof to the center of a visible light transmitting section located at the uppermost end thereof among the visible light transmitting sections corresponding to the subpixels at the upper end thereof. Also, as illustrated in FIG. 43, if the value of β is below one, the formula indicates a distance from the center of a visible light transmitting section corresponding subpixels including the uppermost subpixel to the center of a visible light transmitting section corresponding to subpixels including the lowermost subpixel:

$$Hv(Mv-1)$$

Further, as moire is completely cancelled at L3, it is assumed that the centers of all subpixels from the upper end of the display to the lower end thereof can be gazed through the visible light transmitting sections of the parallax barrier, thus, a distance from the center of a subpixel at the upper end of the display to the center of a subpixel at the lower end thereof can be expressed by the following formula.

Figure 43:
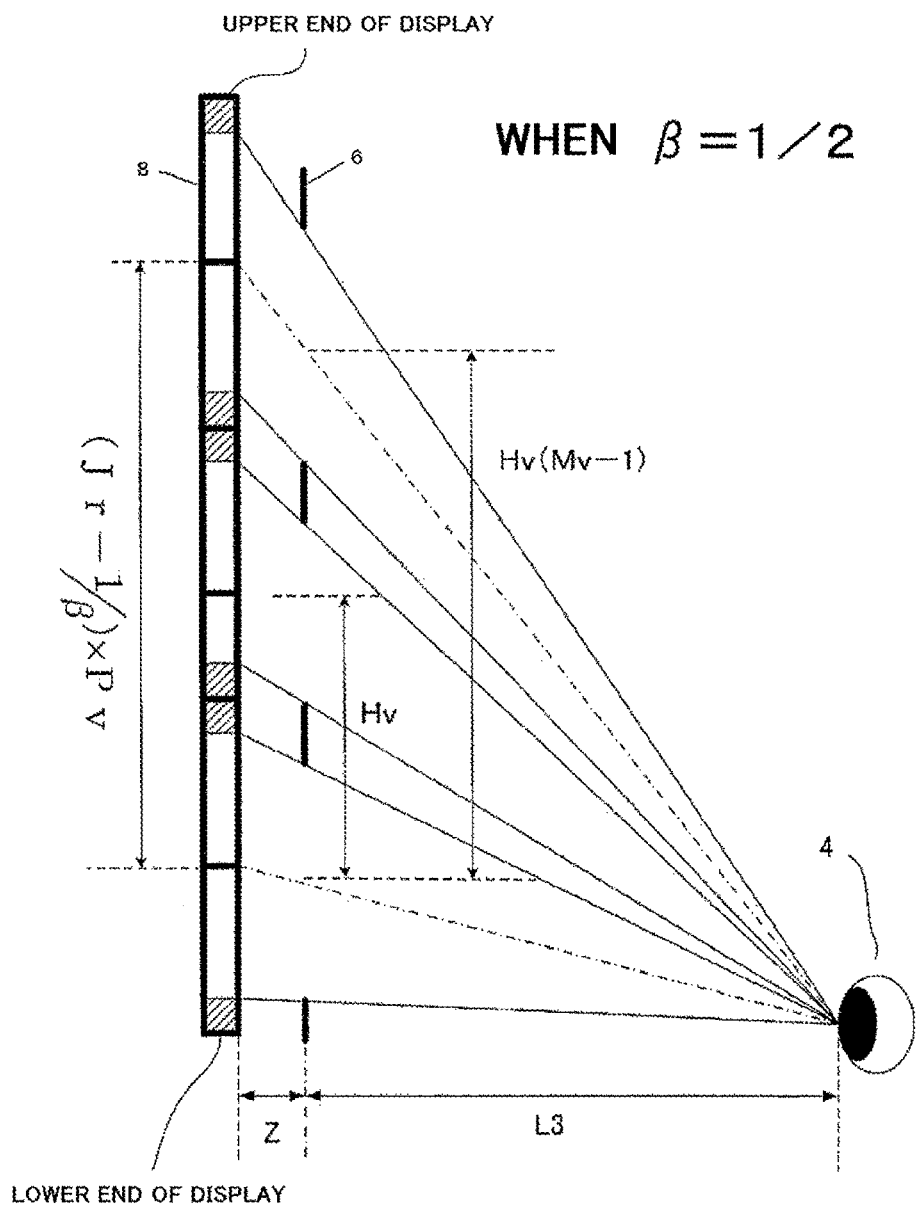
FIG. 43 is an explanatory view for calculating an interval Hv of vertically abutting visible light transmitting sections.

However, as illustrated in FIG. 42 or FIG. 43, if the value of β exceeds one or below one, the following formula indicates a distance from the center of an effective viewable area at the lowermost end of the display (a range of a display that can be seen through visible light transmitting sections) to the center of an effective viewable area at the uppermost end of the display.

$$(Jr-1/\beta) \times Pv$$

As described above, as seen from FIG. 7, there is a relationship between Hv (Mv−1):[(Jr−1/β)×Pv] and L3:(L3+Z) as expressed by the following formula:

$$\frac{Hv(Mv-1)}{L3} = \frac{(Jr-1/\beta) \times Pv}{Z+L3}$$

Therefore, the value of Hv can be calculated by the following formula:

$$Hv = \frac{(Jr-1/\beta) \times Pv \times L3}{(Z+L3) \times (Mv-1)}$$

Figure 40:
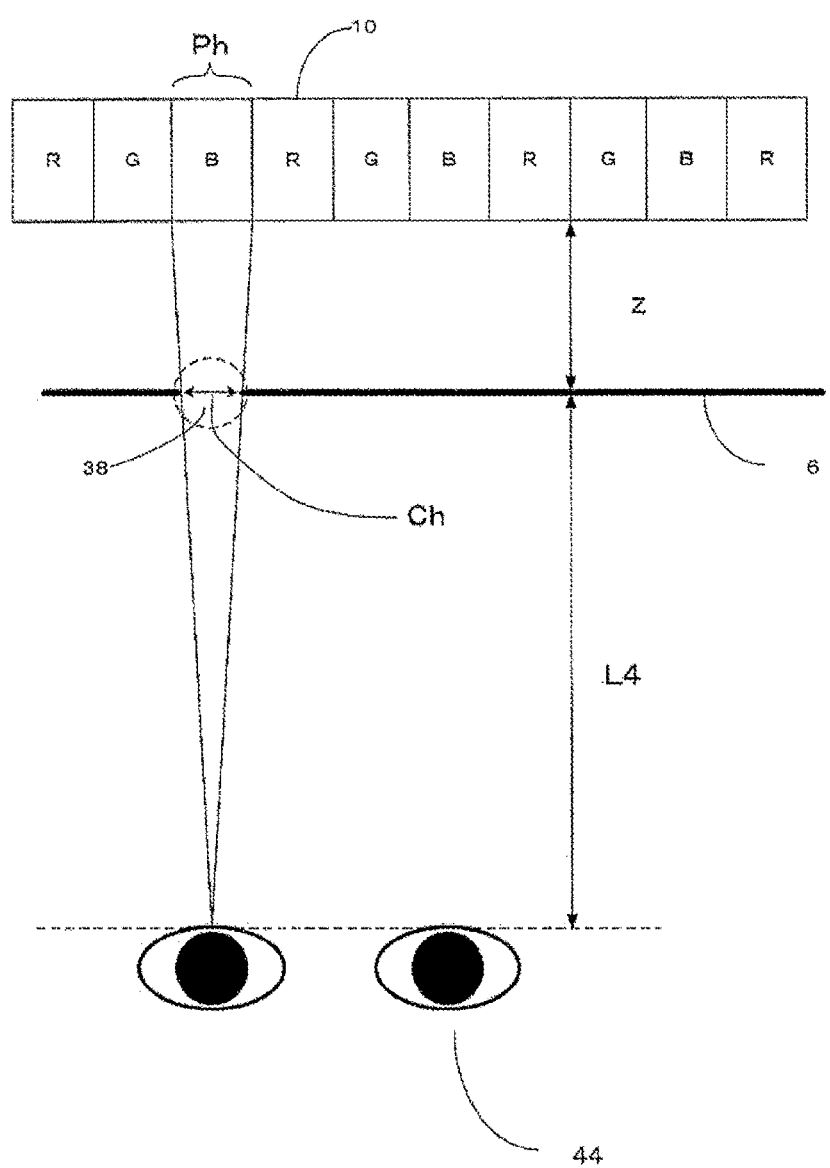
FIG. 40 is an explanatory view for calculating the width Ch of a calibration line.

Next, with reference to FIG. 40, the width Ch of a calibration line is calculated.

The calibration line is a part that transmits vertical visible light and is provided on a parallax barrier so that an operator 44 can confirm the correct angle and position of the parallax barrier when placing the parallax barrier on the display and performing calibration operation.

The width Ch of the calibration line is required to be an appropriate value to perform correct calibration.

That is, as seen from FIG. 40, when the width of the calibration line is defined as Ch, the width of subpixels forming the display is defined as Ph, and a distance from one eye of the operator to the parallax barrier when placing the parallax barrier on the display and performing calibration operation is defined as L4, there is a relationship between Ch:Ph and L4:(Z+L4) as expressed by the following formula:

$$\frac{Ch}{L4} = \frac{Ph}{Z + L4}$$

Therefore, the value of Ch can be calculated by the following formula:

$$Ch = \frac{L4 \times Ph}{L4 + Z}$$

Next, with reference to FIGS. 44A to 54, the following describes a case in which the parallax barrier also works as an electromagnetic wave barrier.

β is the number of visible light transmitting sections in a vertical direction corresponding to one subpixel, and γ is the number of visible light transmitting sections in a horizontal direction corresponding to one subpixel. In a case as shown in FIG. 51A, (β=1·γ=1); in a case as shown in FIG. 51B, (β=2·γ=1); in a case as shown in FIG. 51C, (β=3·γ=1); in a case as shown in FIG. 51D, (β=3·γ=2).

Here, as the parallax barrier of the autostereoscopic display according to the invention also works as an electromagnetic wave barrier, the values of β and γ so as to block the electromagnetic waves are required to be calculated. That is, the invention blocks the electromagnetic waves by dividing the visible light transmitting sections of the parallax barrier in horizontal and vertical directions.

Therefore, by defining the minimum integer more than the value calculated by dividing Sh and Sv by Er as the values of β and γ, the parallax barrier formed with material that blocks electromagnetic waves can block an electromagnetic wave barrier generated from the plasma display.

$$\beta = \Box \frac{Sh}{Er} \Box \quad (17)$$

$$\gamma = \Box \frac{Sv}{Er} \Box \quad (18)$$

Embodiment 1

Here, the first embodiment of the invention is described when a 40-inch full high definition autostereoscopic display of is used. In such a case, the horizontal resolution Ir is defined as 1920 and the vertical resolution Jr is defined as 1080.

The width Ph of the subpixel is set as 0.15375 mm, a distance L1 from the parallax barrier to the most appropriate three-dimensionally viewable position is set as 2500 mm, the number of viewpoints N is set as five viewpoints, a distance W between the pupils of the left and right eyes of a subject person of video image presentation is set as 65 mm, a horizontal resolution Ir is set as 1920, and a vertical resolution Jr is set as 1080. Also, distances L2 and L3 from the parallax barrier to diagonal and horizontal moire cancelling positions are respectively 2500 mm. It should be noted that, while L1, L2, and L3 are the same values in the first embodiment, L1, L2, and L3 do not necessarily be the same values.

Also, a distance αPh between the centers of pixels for three-dimensional display that display video images for neighboring viewpoints is defined as 1Ph, and the width Vh of an effective viewable area seen by one eye of a subject person of video image presentation through visible light transmitting sections of a parallax barrier is defined as 1.2Ph.

Therefore, the values of αPh and Vh become the following values:

$$\alpha Ph = 1 \times 0.15375$$
$$= 0.15375$$

$$Vh = 1.2 \times 0.15375$$
$$= 0.1845$$

Next, the value of the distance Z is calculated by the following formula:

$$Z = \frac{\alpha Ph \times L1}{W}$$

$$Z = \frac{0.15375 \times 2500}{65} \approx 5.9$$

Next, Sh is calculated based on the calculated values of Z and Vh.

$$Sh = \frac{W \times Vh}{(W + \alpha Ph) \times \gamma}$$

$$Sh = \frac{65 \times 0.1845}{65 + 0.15375} \approx 0.18406$$

It should be noted that how short Sh is in relation to Vh is obtained by the following formula:

$$\frac{Sh}{Vh} \times 100 = \frac{0.18406}{0.1845} \times 100 \approx 99.76\%$$

Next, when the shape of the edges of the slits as visible light transmitting sections constituting the parallax barrier is a staircase pattern, or a shape in which circular arcs, elliptic arcs, or polygons are repeated, or the shape of visible light transmitting sections constituting the parallax barrier is a plurality of independently formed holes, the value of the height Sv of the visible light transmitting section of the repeated shape or the visible light transmitting section of the plurality of holes is calculated.

The value of the height Vv of an effective viewable area of the parallax barrier is defined as ε×Pv. It should be noted that ε is a range of subpixels that can be seen through Sv, that is, a coefficient indicating a ratio of the height Vv of an effective viewable area at the height Pv of the subpixel. In other words, ε is an aperture ratio of a parallax barrier in a vertical direction. In this embodiment, ε is set as 0.9.

Also, under the premise that the autostereoscopic display uses R, G, and B three subpixels to constitute one pixel, and one pixel is a square, Pv is defined as 3Pv (=0.46125).

Also, the number β of one unit of visible light transmitting sections of the repeated shape or visible light transmitting sections of a plurality of holes in a vertical direction corresponding to one subpixel is set as one.

Therefore, the value of Vv becomes the following value:

$$Vv = 0.9 \times 0.46125 = 0.415125$$

Also, the value of Sv becomes the following value:

$$Sv = \frac{L1 \times Vv}{L1 + Z}$$

$$Sv = \frac{2500 \times 0.415125}{2500 + 5.9} \approx 0.41414$$

It should be noted that how short Sv is in relation to the value of Vv is indicated by the following formula:

$$\frac{Vv}{Sv} \times 100 = \frac{0.41414176}{0.9 \times 3 \times 0.15375} \times 100$$

$$\approx 99.76\%$$

Next, based on a value of a distance L2 from a predetermined diagonal moire cancelling position to the parallax barrier, an interval Hh of horizontally abutting plurality of slit regions constituting the parallax barrier can be calculated by the following formula:

$$Hh = \frac{N \times \alpha Ph \times L2}{Z + L2}$$

$$Hh = \frac{5 \times 0.15375 \times 2500}{5.9 + 2500}$$

$$\approx 0.76694$$

It should be noted that how short Hh is in relation to N×αPh can be expressed by the following formula:

$$\frac{Hh}{N \times \alpha Ph} \times 100 = \frac{0.766940022}{5 \times 0.15375} \times 100$$

$$\approx 99.76\%$$

Also, the value of the interval Hh of horizontally abutting plurality of slit regions constituting the parallax barrier can be calculated using either a value of a predetermined distance L2n from a position closer to the parallax barrier to the parallax barrier or a value of a predetermined distance L2f from a position away from the parallax barrier to the parallax barrier among two kinds of such positions from which one line of diagonal moire is seen, away from and close to the parallax barrier, to the parallax barrier.

As one example, the value of Hh is calculated by setting a predetermined value of L2n as 1000 mm and the value of L2f as 3000 mm.

Firstly, the value of the number Mh of visible light transmitting sections in a horizontal direction in a range from a visible light transmitting section of the parallax barrier corresponding to the pixel unit for three-dimensional display at the left end of the display to a visible light transmitting section of the parallax barrier corresponding to the pixel unit for three-dimensional display at the right end of the display when seen from a predetermined diagonal moire cancelling position can be calculated by the following formula:

$$Mh = \text{int}\left(\frac{3Ir - 1}{N}\right) + 1$$

$$Mh = \text{int}\left(\frac{3 \times 1920 - 1}{5}\right) + 1$$

$$= 1152$$

Therefore, based on the value of L2n (1000 mm), the value of Hh can be calculated by the following formula:

$$Hh = \frac{N \times Mh \times \alpha Ph \times L2n}{(Z + L2n) \times (Mh - 1)}$$

$$Hh = \frac{1 \times 5 \times 1152 \times 0.15375 \times 1000}{(5.9 + 1000) \times (1152 - 1)}$$

$$\approx 0.76490$$

Also, based on the value of L2f (3000 mm), the value of Hh can be calculated by the following formula:

$$Hh = \frac{N \times (Mh - 2) \times \alpha Ph \times L2f}{(Z + L2n) \times (Mh - 1)}$$

$$Hh = \frac{1 \times 5 \times (1152 - 2) \times 0.15375 \times 3000}{(5.9 + 3000) \times (1152 - 1)}$$

$$\approx 0.76657$$

It should be noted that the value of L2n can be determined based on the value of the diagonal moire cancelling position L2.

That is, when the value of L2 is set as 2500 mm, L2n becomes the following value:

$$\therefore L2n = \frac{(Z \times L2)(3Ir - N)}{3ZIr + NL2}$$

$$L2n = \frac{(5.9 \times 2500)(3 \times 1920 - 5)}{3 \times 5.9 \times 1920 + 5 \times 2500}$$

$$\approx 1826$$

Also, the value of L2f can be determined based on the value of the diagonal moire cancelling position L2.

That is, when the value of L2 is 2500 mm, L2f becomes the following value:

$$L2f = \frac{(Z \times L2)(3Ir + N)}{3ZIr - NL2}$$

$$L2f = \frac{(5.9 \times 2500)(3 \times 1920 + 5)}{3 \times 5.9 \times 1920 - 5 \times 2500}$$

$$\approx 3958$$

Next, when the shape of the edges of the slits as visible light transmitting sections constituting the parallax barrier is a staircase pattern or a shape in which circular arcs, elliptic arcs, or polygons are repeated, or the shape of the visible light transmitting sections constituting the parallax barrier is a plurality of independently formed holes, the value of the interval Hv of the visible light transmitting sections of the repeated shape or the visible light transmitting sections of a plurality of holes can be calculated as follows.

It should be noted that, in this embodiment, one visible light transmitting section of the parallax barrier is provided for one subpixel (refer to FIGS. 36A and 36D), and the value of β is one.

Thus, the value of Hv can be calculated by the following formula:

$$Hv = \frac{Pv \times L3}{(Z+L3) \times \beta}$$

$$Hv = \frac{0.46125 \times 2500}{(5.9+2500) \times 1}$$

$$\approx 0.46016$$

It should be noted that how short Hv is in relation to the value of Pv is as in the following formula:

$$\frac{Hv}{Pv} \times 100 = \frac{0.46016}{0.46125} \times 100$$

$$\approx 99.98\%$$

Also, the value of the interval Hv of the visible light transmitting sections of the repeated shape or the visible light transmitting sections of a plurality of holes that abut one another in a vertical direction can be calculated based on either a value of a predetermined distance L3n from a position closer to the parallax barrier to the parallax barrier or a value of a predetermined distance L3f from a position away from the parallax barrier to the parallax barrier among two kinds of such positions from which one line of horizontal moire is seen, away from and close to the parallax barrier, to the parallax barrier.

As an example, the value of Hv is calculated by setting a predetermined value of L3n as 1000 mm and the value of L3f as 3000 mm.

As the value of β is defined as one in this embodiment, when seen from a predetermined horizontal moire cancelling position, the value of the number Mv of one unit of the visible light transmitting sections of the repeated shape or the visible light transmitting sections of a plurality of holes that abut one another in a vertical direction in a range from the visible light transmitting section of the shape corresponding to the subpixels at the upper end of the display to the visible light transmitting section of the shape corresponding to the subpixels at the lower end of the display becomes the following value.

$$Mv = Jr \times \beta$$

$$Mv = 1080 \times 1 = 1080$$

The value of Hv can be calculated by the following formula based on the value of L3n (1000 mm).

$$Hv = \frac{\left(Jr - \frac{1}{\beta} + 1\right) \times Pv \times L3n}{(Z+L3n) \times (Mv-1)}$$

-continued $$HV = \frac{\left(1080 - \frac{1}{1} + 1\right) \times 0.46125 \times 1000}{(5.9+1000) \times (1080-1)}$$

$$\approx 0.45896$$

Also, the value of Hv can be calculated by the following formula based on the value of L3f (3000 mm).

$$Hv = \frac{\left(Jr - \frac{1}{\beta} - 1\right) \times Pv \times L3f}{(Z+L3f) \times (Mv-1)}$$

$$Hv = \frac{\left(1080 - \frac{1}{1} - 1\right) \times 0.46125 \times 3000}{(5.9+3000) \times (1080-1)}$$

$$\approx 0.45991$$

It should be noted that the value of L3n can be determined based on the value of the horizontal moire cancelling position L3.

That is, when the value of L3 is set as 2500 mm, L3 becomes the following value:

$$\therefore L3n = \frac{Z(Jr-1)L3}{ZJr+L3}$$

$$L3n = \frac{5.9 \times (1080-1) \times 2500}{5.9 \times 1080 + 2500}$$

$$\approx 1793$$

It should be noted that the value of L3f can be determined based on the value of the horizontal moire cancelling position L3.

That is, when the value of L3 is set as 2500 mm, L3f becomes the following value:

$$L3f = \frac{Z(Jr+1)L3}{ZJr-L3}$$

$$L3f = \frac{5.9 \times (1080+1) \times 2500}{5.9 \times 1080 - 2500}$$

$$\approx 4118$$

Next, an appropriate three-dimensionally viewable area is calculated.

The shortest distance L1n of an appropriate three-dimensionally viewable area becomes the following value:

$$L1n = \frac{Z \times W}{Vh}$$

$$L1n = \frac{5.9 \times 65}{0.1845}$$

$$\approx 2078$$

The longest distance L1f of an appropriate three-dimensionally viewable area becomes the following value:

$$L1f = \frac{2 \times Z \times W}{Vh}$$

$$L1f = \frac{2 \times 5.9 \times 65}{0.15375} \approx 4988$$

Therefore, an appropriate three-dimensionally viewable area becomes a range from 2078 mm to 4988 mm.

It should be noted that, when calculation is performed by setting Vh as 1.2 Ph, $L1n:L1$ becomes a relationship approximately 0.8:1.

Here, a second embodiment of the invention in a case in which a 40-inch full high definition autostereoscopic display is used will be described.

In the second embodiment, a case in which L1n (the shortest distance to the most appropriate three-dimensionally viewable area), L2n (the shortest distance to a diagonal moire cancelling area), and L3n (the shortest distance to a horizontal moire cancelling area) are set as the same distances will be described.

It should be noted that, as described above, as L1n, L2n, and L3n are based on different concepts, it is not limited to the case in which all these values are set as the same distances as in this embodiment.

In this case, similarly to the first embodiment, the horizontal resolution Ir is set as 1920, the vertical resolution Jr is set as 1080, the width Ph of the subpixel is set as 0.15375 mm, the height of the subpixel is set as 0.46125 mm, the number of viewpoints N is set as five viewpoints, the distance W between the pupils of the left and right eyes of a subject person of video image presentation is set as 65 mm, the distance from the parallax barrier to the most appropriate three-dimensionally viewable position is set as 2500 mm, the distance αPh between the centers of pixels for three-dimensional display that display video images for neighboring viewpoints is set as 0.15375 mm, the width Vh of an effective viewable area seen by one eye of the subject person of video image presentation through visible light transmitting sections of the parallax barrier is set as 0.1845 mm, and the height Vv of the effective viewable area seen by the subject person of video image presentation through the visible light transmitting sections of the parallax barrier is set as 0.415125 mm.

Also, the value of the number Mh of visible light transmitting sections in a horizontal direction from the visible light transmitting section of the parallax barrier corresponding to a pixel unit for three-dimensional display at the left end of the display to the visible light transmitting section of the parallax barrier corresponding to a pixel unit for three-dimensional display at the right end of the display when seen from a predetermined diagonal moire cancelling position is set as 1152, the number γ of visible light transmitting sections corresponding to one subpixel in a horizontal direction is set as one, and the number β of one unit of visible light transmitting sections of the repeated shape or visible light transmitting sections of a plurality of holes in a vertical direction is set as one.

Firstly, with regard to L1n, L1n can be calculated by the following formula using Z, W, and Vh.

$$L1n = \frac{Z \times W}{Vh}$$

Therefore, L1n becomes the following value:

$$L1n = \frac{5.9 \times 65}{0.1845} \approx 2078$$

It should be noted that L1f (the longest distance to the appropriate three-dimensionally viewable area) becomes the following value:

$$L1f = \frac{2 \times Z \times W}{Vh}$$
$$L1f = \frac{2 \times 5.9 \times 65}{0.15375} \approx 4988$$

That is, the appropriate three-dimensionally viewable area is a range from 2078 mm to 4988 mm.

Thus, L2n and L3n are also set as 2078 mm which is the same distance as L1n.

Next, a distance Z from the image display surface of the display to the parallax barrier is calculated.

The value of Z can be calculated based on the value of L1n:

$$Z = \frac{Vh \times L1n}{W}$$

Therefore, Z becomes the following value:

$$Z = \frac{0.1845 \times 2078}{65} \approx 5.9$$

Next, the interval Hh of the horizontally abutting visible light transmitting sections is calculated.

The value of Hh can be calculated based on the value of L2n:

$$Hh = \frac{N \times Mh \times \alpha Ph \times L2n}{(Z + L2n) \times (Mh - 1)}$$

Therefore, Hh becomes the following value:

$$Hh = \frac{5 \times 1152 \times 0.15375 \times 2078}{(5.9 + 2078) \times (1152 - 1)} \approx 0.76723$$

Next, the interval Hv of the vertically abutting visible light transmitting sections is calculated.

The value of Hv can be calculated based on the value of L3n:

$$Hv = \frac{(Jr - 1/\beta + 1) \times Pv \times L3n}{(Z + L3n) \times (Mv - 1)}$$

Therefore, Hv becomes the following value:

$$Hv = \frac{(1080 - 1/1 + 1) \times 0.46125 \times 2087}{(5.9 + 2087) \times (1080 - 1)} \approx 0.46037$$

$$Sh = \frac{W \times Vh}{(W + \alpha Ph) \times \gamma}$$

Therefore, Sh becomes the following value:

$$Sh = \frac{65 \times 0.1845}{65 + 0.15375} = 0.18406$$

Next, the height Sv of the visible light transmitting sections of the parallax barrier is calculated.

The value of Sv can be calculated based on the following formula:

$$Sv = \frac{L1 \times Vv}{L1 + Z}$$

Therefore, Sv becomes the following value:

$$Sv = \frac{2500 \times 0.415125}{2500 + 5.9} \approx 0.41414$$

<A Method for Producing an Autostereoscopic Display>

Figure 23:
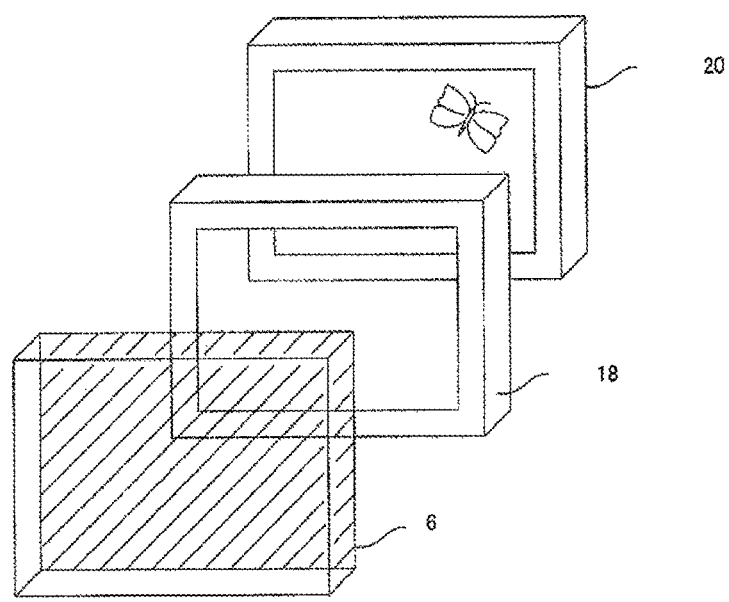
FIG. 23 is an explanatory view of a structure relating to an autostereoscopic display of a parallax barrier method.

FIG. 23 shows a structure relating to a production of an autostereoscopic display of a parallax barrier method. As shown in FIG. 23, the autostereoscopic display is produced by providing spacers in front of a normal display (an image light emitting unit) that displays images, and, further therebefore, providing a reinforced glass on which back a parallax barrier is formed.

Here, a method for making a parallax barrier to also have a reflection preventing function when forming a parallax barrier on a reinforced glass will be described. Reflection is a phenomenon that a user cannot see part of a video image that is supposed to be displayed by the display as the reinforced glass as a protection layer of the display specularly reflects external light. In order to prevent reflection of the display, while conventional techniques diffusely reflect external light with anti-glare processing (mat processing) on the surface of the protection layer or use a polarization plate, the following describes that the parallax barrier can also be used to prevent reflection.

Normally, the parallax barrier is generally formed by being printed using black. Also, while, among the display side surface and the user side surface of the reinforced glass, the parallax barrier is generally printed on the display side surface to protect the coating, by printing the parallax barrier on the user side surface, as the parallax barrier is black, the parallax barrier can absorb external light to prevent reflection on the display. Also, using flat black ink, external light can be diffusely reflected to prevent reflection more effectively.

Moreover, using spacers to set an appropriate air gap between the image display surface of the display and the parallax barrier, an adequate three-dimensional effect can be obtained at a preset appropriate three-dimensionally viewable position and moire cancelling position.

Further, after adequately adjusting the arrangement of visible light transmitting sections of the parallax barrier and pixels for one viewpoint on the display, an autostereoscopic display can be produced by fixing the display, the spacers, and the reinforced glass.

Figure 37A:
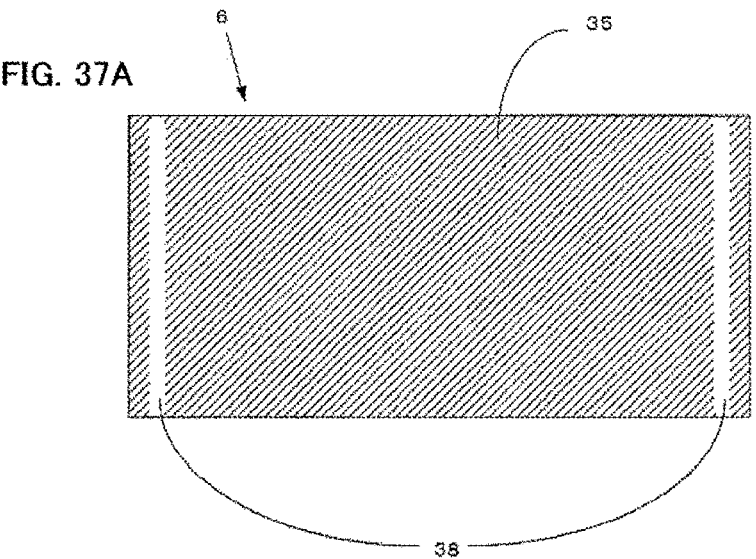
FIGS. 37A and 37B are explanatory views of a structure of a parallax barrier.

The parallax barrier 6, as shown in FIG. 37A, comprises a pattern area 35 and calibration lines 38. The parallax barrier is set on the display by being attached on the glass. The following shows one example, provided, however, the values are not limited to the ones in this example.

The pattern area is an area in which a pattern of a parallax barrier method is arranged, and arranged over the whole surface of the parallax barrier.

The size of the parallax barrier (e.g., height 520 mm and width 910 mm) is obtained by vertically and horizontally subtracting some margin (e.g., 5 mm) from the size of the glass 42 (e.g., height 530 mm and width 920 mm) to which the parallax barrier is attached. The margin of the glass 42 to which the parallax barrier is not attached (e.g., 5 mm) is used for attaching spacers provided on the monitor frame.

The calibration lines 38 are vertical visible light transmitting sections for performing calibration when setting the glass 42 attached with the parallax barrier to the monitor, and prepared on both ends of the parallax barrier. The size thereof is the same as the pattern area in height, the width thereof is obtained by calculation and slightly smaller than the width of a pixel for three-dimensional display.

The calibration lines are arranged at positions inside the left and right sides of the parallax barrier. Here, to prevent the visual quality of the three-dimensional video image, the calibration lines are required to be arranged at positions that cannot be seen by a subject person of video image presentation.

Figure 41A:
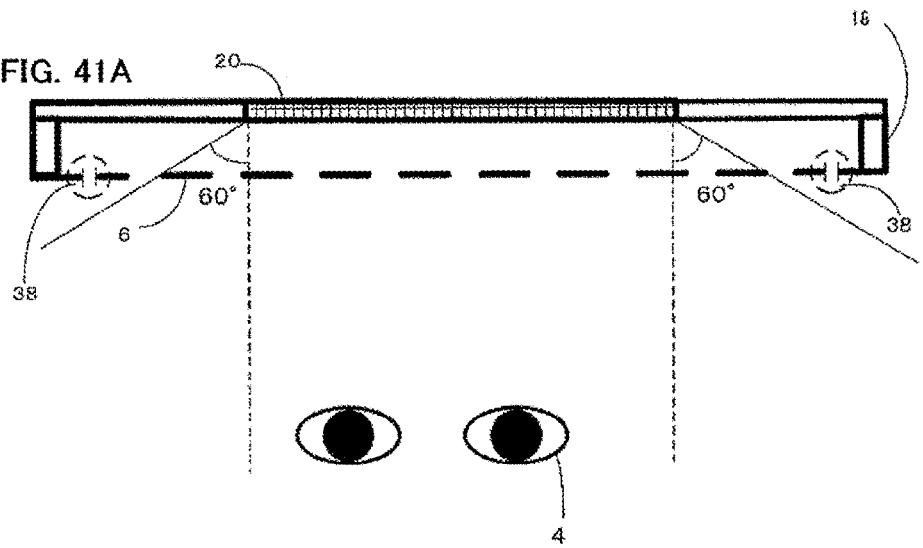
FIGS. 41A and 41B are diagrams for illustrating a position at which a calibration line is provided.
Figure 41B:
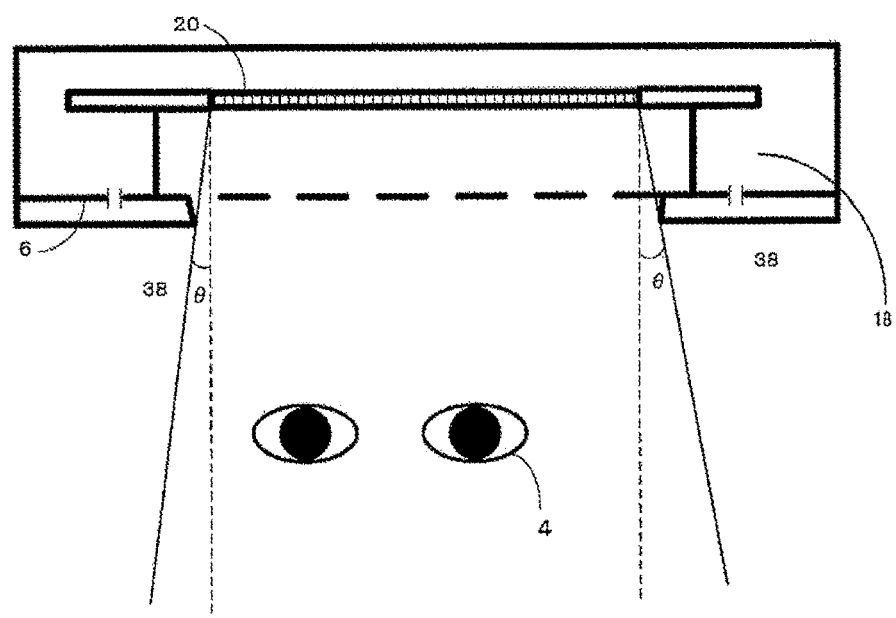

For example, as shown in FIG. 41A, the calibration lines 38 are required not to be seen by a subject person of video image presentation positioned inside at least the left and right 60 degree directions. This is because, if the subject person of video image presentation is positioned outside the left and right 60 degree directions, the person cannot see three-dimensional video images due to the structure of the autostereoscopic display, and, thus, the visual quality is not degraded even if the calibration lines are in sight when seeing the autostereoscopic display from such a position. It should be noted that, as shown in FIG. 41B, even if the angles of left and right 60 degrees are not maintained, when the calibration lines are not seen due to the structure of the autostereoscopic display, the angle θ can be freely set to some extent.

In the calibration 38, the visible light transmitting sections of the parallax barrier are appropriately inclined in relation to the display when the color of the pixels seen from a position 500 mm away from the display through the visible light transmitting sections is one color from the top to the bottom. In this condition, calibration is completed by moving the glass 42 to an appropriate position while maintaining the inclination of the visible light transmitting sections of the parallax barrier.

The appropriate position of the glass 42 is a position where the center of the display 20 and the center of the glass 42 are at nearly the same position and when an image of any one viewpoint of a three-dimensional image for multiple viewpoints that displays an image for a plurality of viewpoints is colored while, images for other viewpoints are colored black, and the images are blended and displayed on the display, the image seen by one eye through the parallax barrier from an appropriate three-dimensionally viewable position right in front of the display is as evenly white over the whole surface.

Figure 37B:
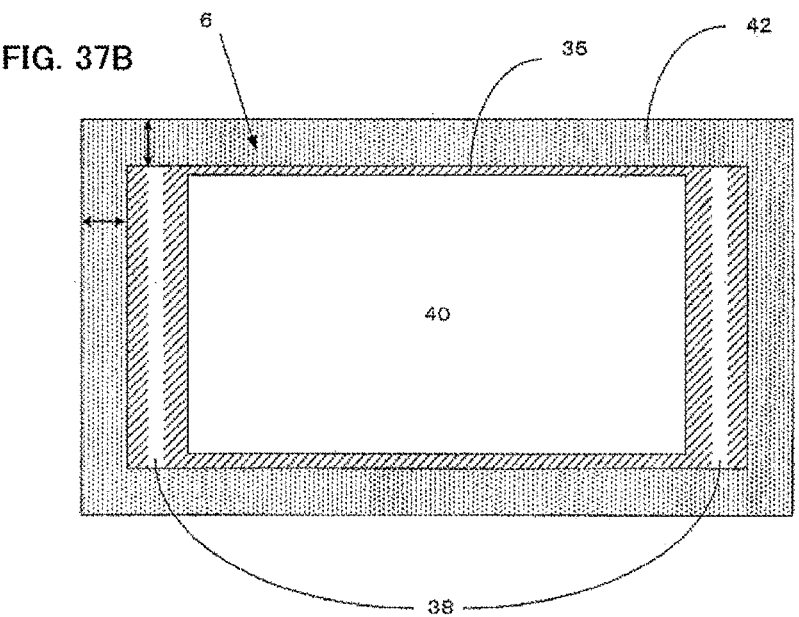

In the structure of the parallax barrier 6, the size of the glass 42 is required to be somewhat small in four sides (e.g., 5 millimeter square) as shown in FIG. 37B, and the calibration lines 38 do not overlap the effective pixel area of the monitor (the effective pixel area of the monitor is all covered in patterns after the bezel is attached to the monitor and the calibration lines 38 are not seen from a user positioned at least inside the left and right 60 degree directions).

Here, the value of the width Ch of the calibration lines is calculated.

Here, the width Ph of the subpixels is defined as 0.15375 mm, the distance Z from the image display surface of the display to the parallax barrier is defined as 5.9 mm, the operator is assumed to install the parallax barrier to the display and perform calibration operation using both hands, and the distance L4 from the one eye of the operator to the parallax barrier is defined as 500 mm.

Therefore, the width Ch of the calibration line becomes the following value:

$$Ch = \frac{L4 \times Ph}{Z + L4}$$
$$Ch = \frac{500 \times 0.15375}{5.9 + 500} = 0.15195$$

<In a Case of Plasma Display>

Also, for a display that requires an electromagnetic wave shield, such as plasma display panels, the parallax barrier sheet can also function as an electromagnetic wave shield.

As the parallax barrier sheet can also function as an electromagnetic wave shield, there is no need to separately prepare or form an electromagnetic wave shield in a separate step.

Particularly, when forming a parallax barrier sheet and an electromagnetic wave shield by printing, as the parallax barrier and electromagnetic wave shield can be formed in one step of the printing process, it is effective to have both functions in one component.

It should be noted that, when forming a parallax barrier sheet and an electromagnetic wave shield by printing, the printing may be directly performed on a transparent medium such as a glass plate or an acrylic plate, or printing may be done on a transparent thin film sheet and the transparent thin film sheet may be attached on a transparent medium.

The following three pattern methods can be used for printing and ink.

Figure 46A:
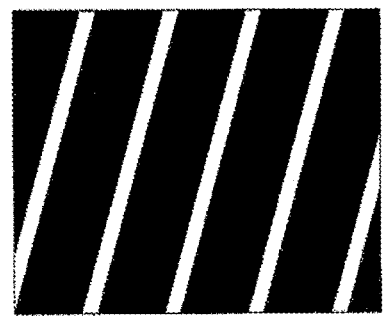
FIGS. 46A to 46C are diagrams showing an embodiment of a method for forming a parallax barrier.
Figure 46B:
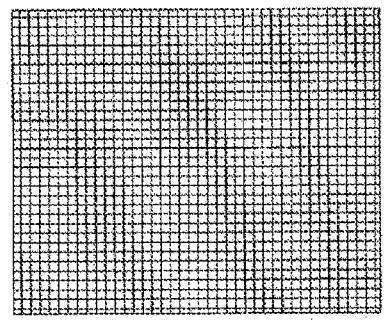
Figure 46C:
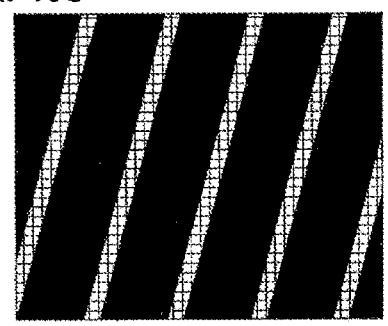

(A) There is a method for printing an electromagnetic wave shield in which an ink having a characteristic of not transmitting visible light (for example, a carbon black) is used to print the barrier area of a parallax barrier as shown in FIG. 46A to separate from the area that transmits visible light, and an ink having a characteristic of not transmitting electromagnetic waves (for example, an ink including a metal for shielding) is used to print an electromagnetic wave shield as shown in FIG. 46B. When completed, the parallax barrier is seen as shown in FIG. 46C.

In such a case, the visible light transmitting sections may also be printed with an ink having a characteristic of not transmitting electromagnetic waves, provided, however, consideration is required so that the effect to transmit visible light is not affected or the influence to the effect is minimized.

(B) There is a method of printing the visible light transmitting sections as vertical and horizontal thin lines similarly to a general electromagnetic wave shield with an ink having a characteristic of not transmitting electromagnetic waves, and printing the area that does not transmit visible light as a plane with the same ink so that the area does not transmit visible light. In this method, the printing can be performed only by using one mechanical and one kind of ink. When completed, the parallax barrier is seen as shown in FIG. 46C.

(C) There is a method of printing the visible light transmitting sections as vertical and horizontal thin lines similarly to a general electromagnetic wave shield with an ink having a characteristic of not transmitting electromagnetic waves, and printing the area that does not transmit visible light using a carbon black or the like having a characteristic of blocking electromagnetic waves instead of an expensive ink having a characteristic of not transmitting electromagnetic waves. While a large volume of ink is required to print as a plane, the cost can be decreased using a low cost carbon black. When completed, the parallax barrier is seen as shown in FIG. 46C.

(D) Further, there may be a method of utilizing the fact that each area of the visible light transmitting sections on the parallax barrier is small, printing of an electromagnetic wave shield using an ink having a characteristic of not transmitting electromagnetic waves is eliminated on the visible light transmitting sections, like punching a metal mesh. In such a case, the parallax barrier and electromagnetic wave shield can be formed in one step of the printing process using one kind of ink having both characteristics of not transmitting visible light and not transmitting electromagnetic waves.

This method is particularly effective for a hole type parallax barrier as this is like punching a metal mesh.

It will be appreciated that, without limiting to formation of the parallax barrier sheet of the invention, the structure of functioning both as a parallax barrier and an electromagnetic wave shield is also effective when forming a general parallax barrier from a perspective that the number of components and processing processes can be decreased.

<Embodiment of an Electromagnetic Wave Shield on a Hole Type Parallax Barrier>

In this invention, an existing standard of electromagnetic wave shields is used for the standard of the mesh of the electromagnetic wave shield formed on the parallax barrier.

For example, the standard of an electromagnetic wave shield film made by Dai Nippon Printing Co., Ltd. defines the pitch of the mesh approximately 0.2 mm and line width approximately 0.01 mm.

Also, as a conventional technique, there can be used a technique relating to a mesh-like electromagnetic wave shield according to Japanese Patent Application No. 2006-234683 of Dai Nippon Printing Co., Ltd. disclosed in Japanese Unexamined Patent Application Publication No. 2008-60280.

According to this Publication, the pitch of the mesh is preferably 0.12 mm or larger in consideration of permeability of the light emitted from the display. The line width of the mesh is preferably 0.005 mm or more.

Further, there may be used a technique relating to a mesh-like electromagnetic wave shield according to Japanese Patent Application No. 2006-140559 of FUJIFILM Corporation disclosed in Japanese Unexamined Patent Application Publication No. 2007-311646.

According to this Publication, the pitch of the mesh is most preferable to be 0.25 mm or more and 0.35 mm or less for a use purpose of a light permeable electromagnetic wave shield film.

In consideration of the above Publications, the pitch of the mesh of the electromagnetic wave shield in this invention is defined as approximately 0.2 mm to 0.25 mm as a design basis and the shape of the mesh is a rectangle that is generally close to a square.

However, it is appreciated that the pitch and shape of the mesh is only an example for convenience of explanation of this invention, and these values may be changed and implemented in a variety of ways according to required embodiments.

Here, in this invention, a mesh-like electromagnetic wave shield is not necessarily actually printed on a transparent member, and, if slits or holes partitioned with the pitch equivalent to the pitch of the mesh are formed on a parallax barrier, the parallax barrier can also function as an electromagnetic wave shield. It will be appreciated that, while the mask portion of the parallax barrier is formed with an ink having a characteristic of not transmitting electromagnetic waves, a mesh-like electromagnetic wave shield may be superimposed and printed on the mask portion.

<Application to a Variety of Parallax Barrier Sheets>

Figure 47A:
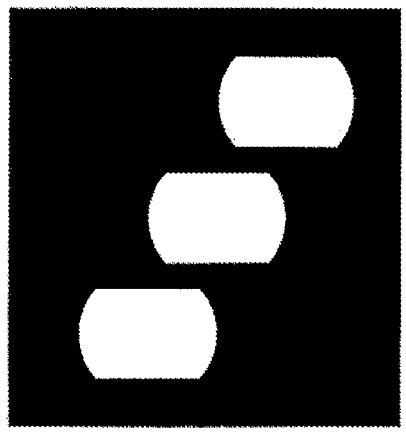
FIGS. 47A to 47C are diagrams showing an embodiment of a method for forming a parallax barrier.
Figure 47B:
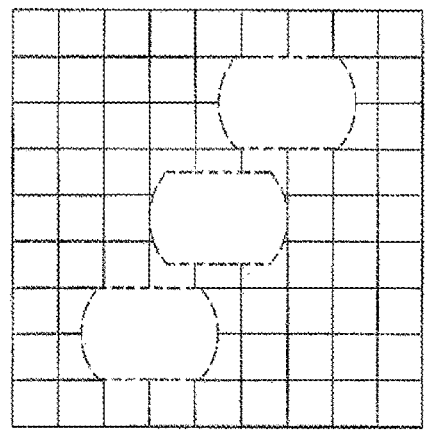
Figure 47C:
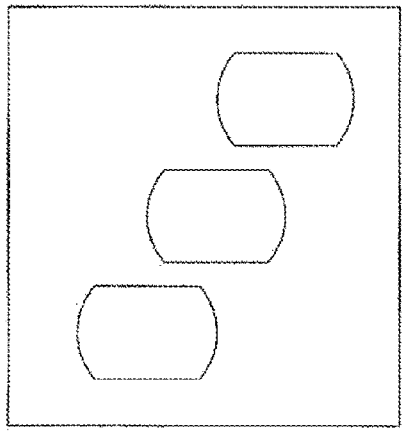

FIG. 47A is a hole type parallax barrier of a small monitor, and FIG. 47B is a mesh of an electromagnetic wave shield. FIG. 47A is an example of a block which is printed using an ink that does not transmit visible light, and FIG. 47B is an example of a block which is printed using an ink having a characteristic of blocking electromagnetic waves over FIG. 47A. It should be noted that the dash lines are virtual lines indicating the pitch and are not formed on the block. FIG. 47C is an example of a block which is printed with an ink having a characteristic of blocking electromagnetic waves.

Figure 48A:
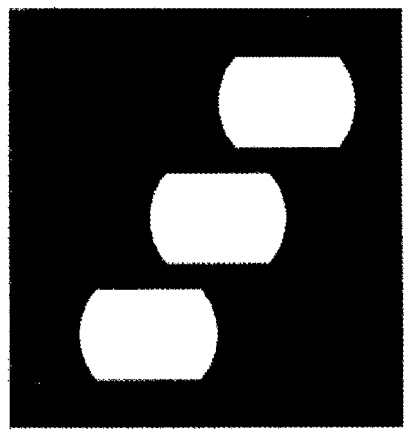
FIGS. 48A to 48C are diagrams showing an embodiment of a method for forming a parallax barrier.
Figure 48B:
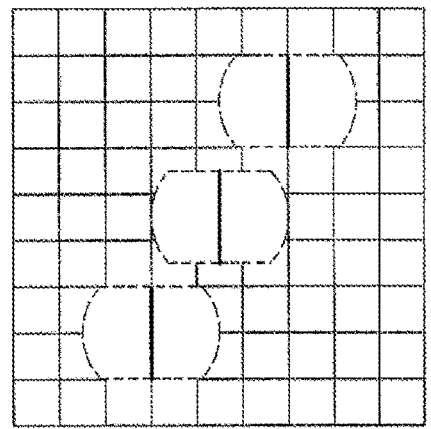

FIG. 48A is a hole type parallax barrier of a middle sized monitor, and FIG. 48B is a mesh of an electromagnetic wave shield. FIG. 48A is an example of a block which is printed using an ink that does not transmit visible light, and FIG. 48B is an example of a block which is printed using an ink having a characteristic of blocking electromagnetic waves over FIG. 47A. It should be noted that the dash lines are virtual lines indicating the pitch and are not formed on the block. FIG. 47C is an example of a block which is printed with an ink having a characteristic of blocking electromagnetic waves.

Figure 48C:
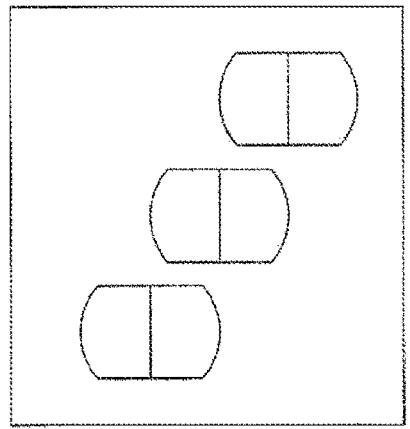

It should be noted that the centerlines of the holes in FIGS. 48B and 48C are for dividing the holes because the pitch of the holes exceeds a predetermined pitch for blocking electromagnetic waves.

Figure 49A:
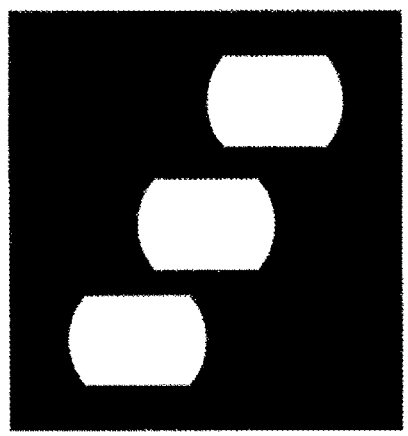
FIGS. 49A to 49C are diagrams showing an embodiment of a method for forming a parallax barrier.
Figure 49B:
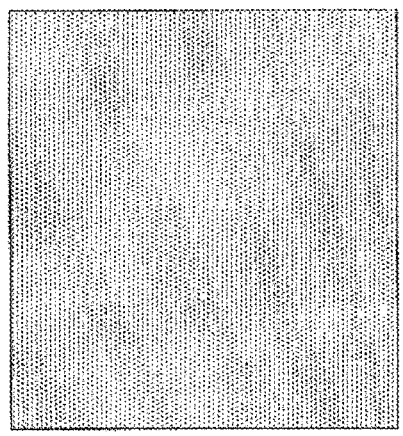
Figure 49C:
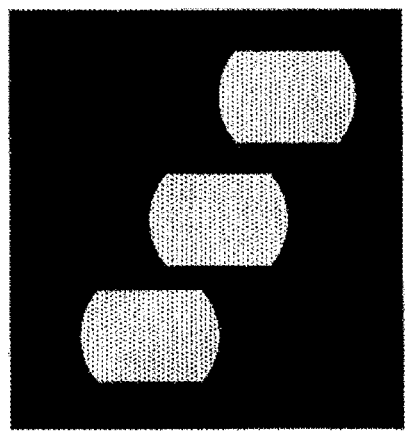

FIG. 49A is a hole type parallax barrier, and FIG. 49B is a glass or transparent sheet on which a thin metal film that transmits visible light is provided. This is an example in which FIG. 49A is printed using an ink that does not transmit visible light, and FIG. 49B is superimposed and attached on top or bottom of FIG. 49A to form FIG. 49C that works both as a parallax barrier and an electromagnetic wave shield.

Figure 50:
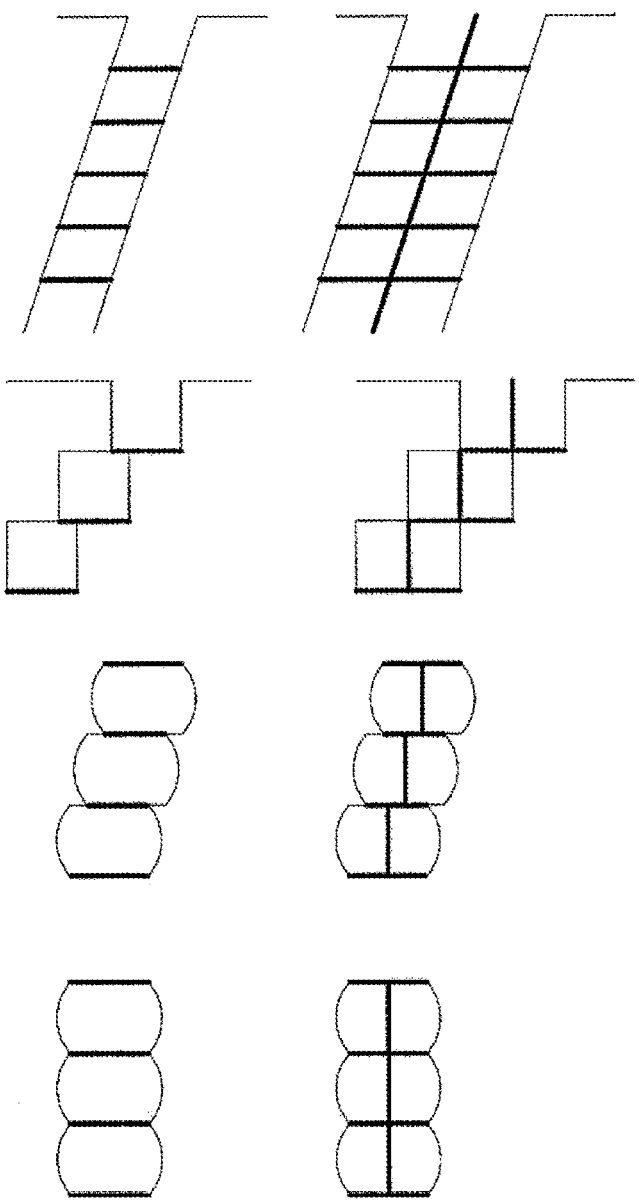
FIG. 50 is a reference diagram showing examples of the shapes of visible light transmitting sections of a parallax barrier.
Figure 51:
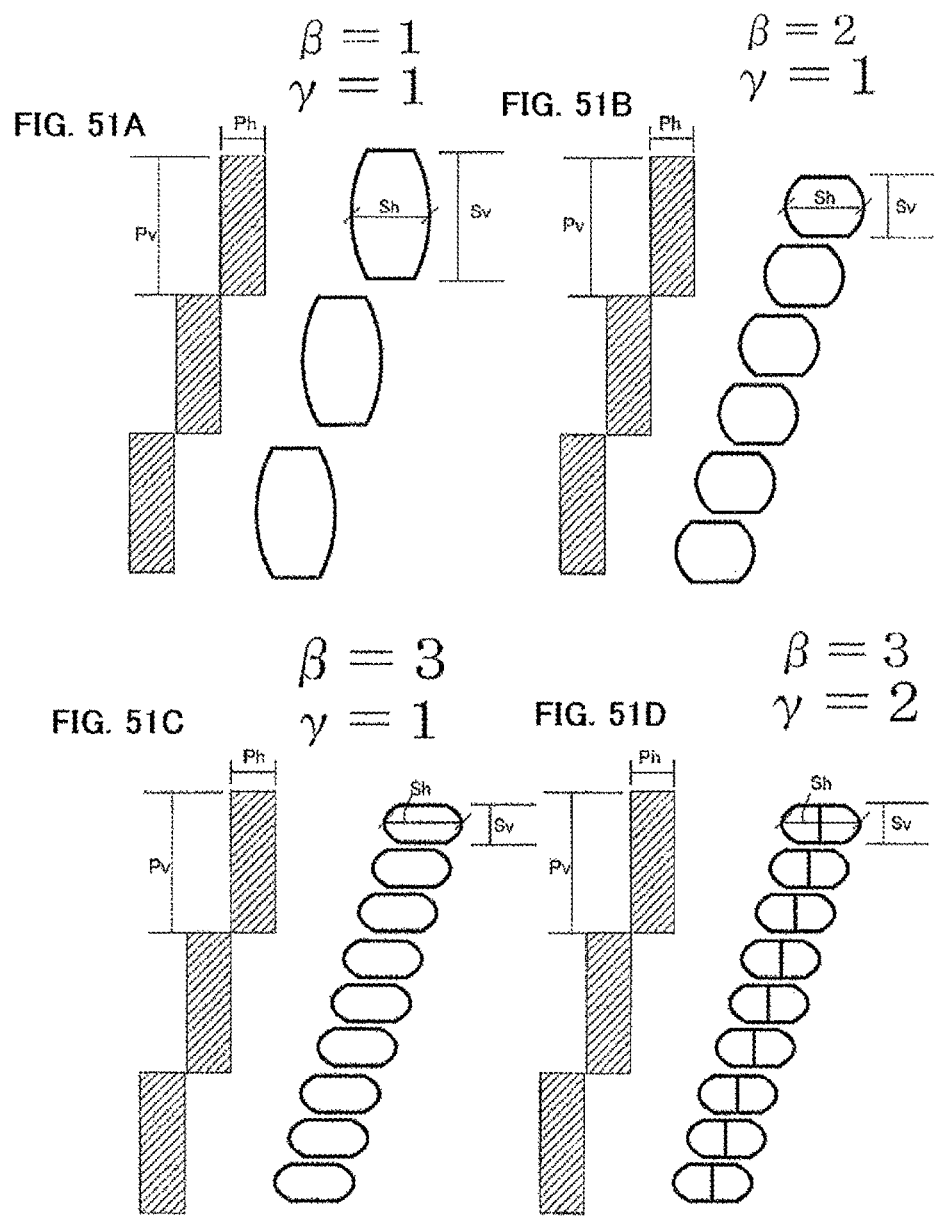
FIGS. 51A to 51D are reference diagrams showing a correlative relationship between visible light transmitting sections of a parallax barrier and subpixels of a display.

FIG. 50 is an example of partitioning slits in a horizontal direction and/or a vertical direction so that the slits of the parallax barrier become a predetermined pitch required for blocking electromagnetic waves.

Here, the following describes an embodiment of a case in which a hole type parallax barrier completely functions as an electromagnetic wave shield. However, the parallax barrier is not necessarily a hole type parallax barrier of the invention, and may be applied to a general parallax barrier.

Figure 52:
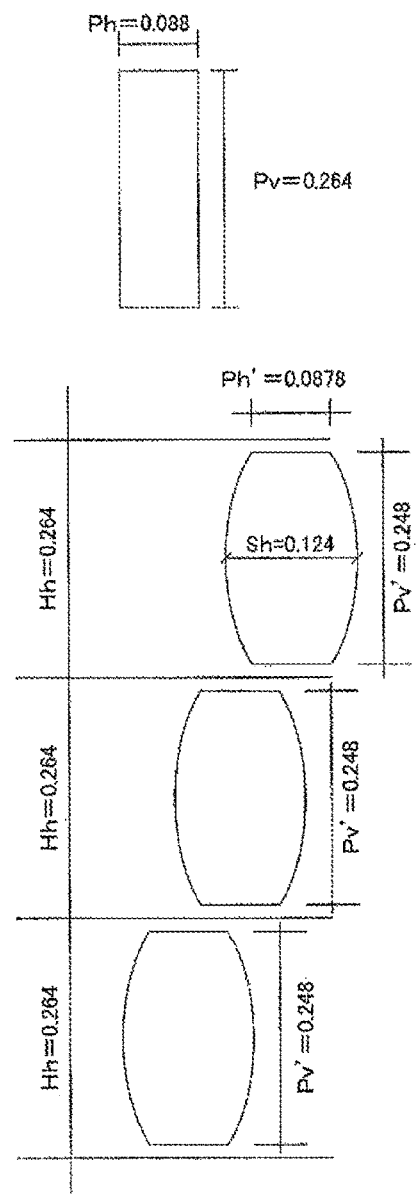
FIG. 52 is a diagram showing an embodiment in a case in which a parallax barrier also works as an electromagnetic wave barrier.

In a case of a 17-inch plasma display, as shown in FIG. 52, the pitch of visible light transmitting sections of the parallax barrier is Sh=0.124 mm and height Sv=0.248 mm. Both values are within the above described design standard and the parallax barrier completely functions as an electromagnetic wave shield.

Figure 53:
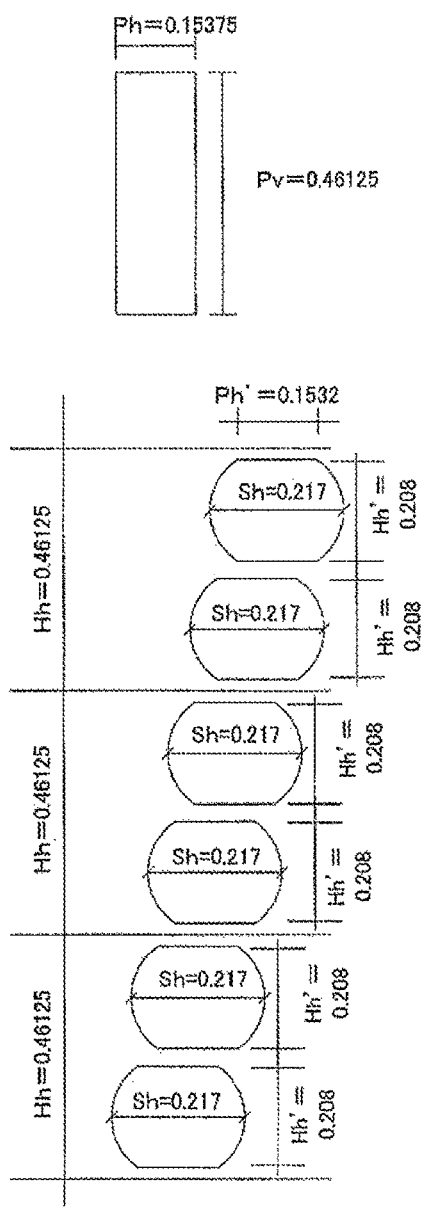
FIG. 53 is a diagram showing an embodiment in a case in which a parallax barrier also works as an electromagnetic wave barrier.

In a case of a 40-inch plasma display, as shown in FIG. 53, two holes are formed as the height of the actual hole of the parallax barrier exceeds the above design standard. In this way, the pitch of visible light transmitting sections of the parallax barrier is Sh=0.217 mm and the height is Sv=0.208 mm, thus, both are within the above design standard, and the parallax barrier completely functions as an electromagnetic wave shield.

Figure 54:
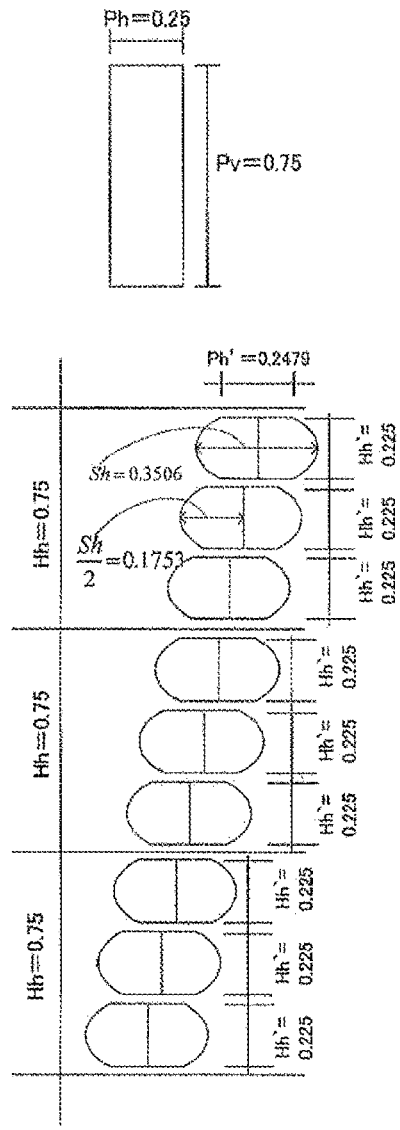
FIG. 54 is a diagram showing an embodiment in a case in which a parallax barrier also works as an electromagnetic wave barrier.

In a case of a 65-inch plasma display, as shown in FIG. 54, two holes are formed and each hole is further horizontally divided as the height and pitch of the actual hole of the parallax barrier exceed the above design standard. In this way, the pitch of visible light transmitting sections of the parallax barrier is Sh/2=0.175 mm and the height is Hh=0.225 mm, thus, both are within the above design standard, and the parallax barrier completely functions as an electromagnetic wave shield.

<Plasma 3D Monitor>

Figure 45A:
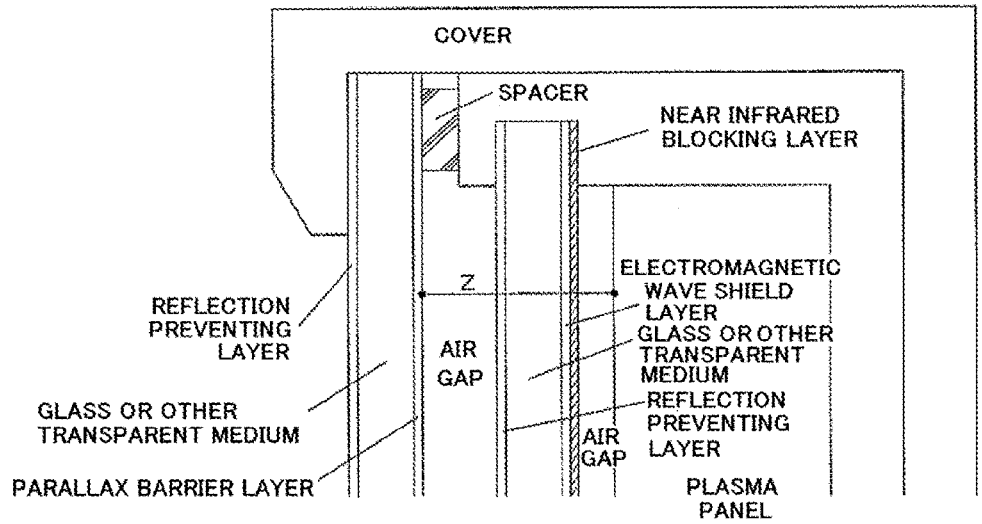
FIGS. 45A and 45B are diagrams showing structures of an autostereoscopic display when a parallax barrier also works as an electromagnetic wave barrier.
Figure 45B:
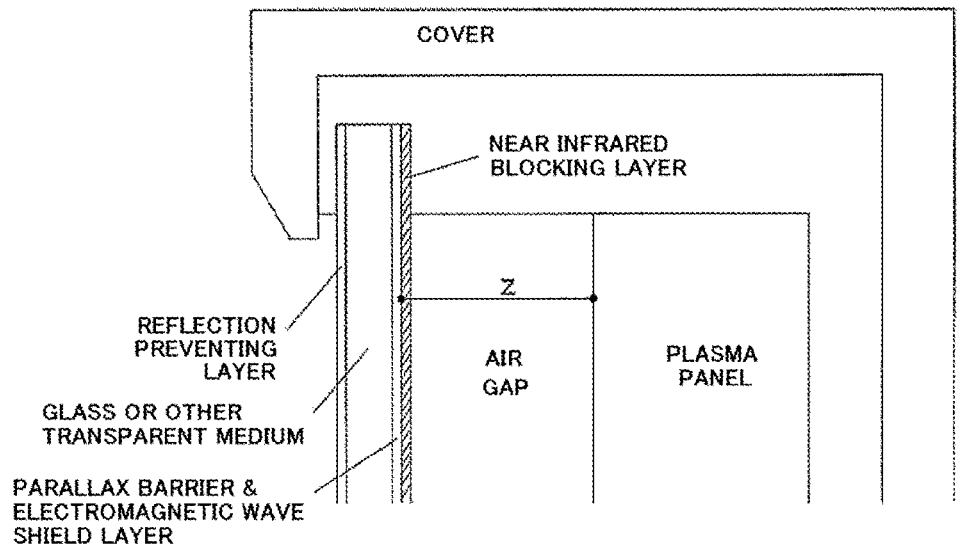

FIGS. 45A and 45B are diagrams illustrating a structure of a plasma 3D monitor as one embodiment of the invention.

FIG. 45A is a diagram illustrating a structure of a plasma 3D monitor in which a transparent member with a predetermined strength printed with a parallax barrier is additionally attached to an existing plasma display.

In the plasma 3D monitor of FIG. 45A, the transparent member is fixed by a cover that covers the whole plasma 3D monitor.

Also, spacers are provided on the frame on the flank of the plasma display panel to maintain an appropriate air gap Z for three-dimensional display between the panel side surface of the plasma panel and the parallax barrier.

However, spacers are not required if the frame on the flank of the plasma display panel has an ample thickness for maintaining an appropriate air gap Z.

An electromagnetic wave shield layer and a near infrared blocking layer on the monitor surface side of the glass that is attached to the monitor may be formed in a reverse order. Also, a compound layer of a reflection preventing layer and an electromagnetic wave shield layer or a near infrared blocking layer may be formed thereon.

FIG. 45B is a diagram illustrating a structure of a plasma 3D monitor that incorporates a transparent member with a predetermined strength that is printed with a parallax barrier at a step of production.

In the plasma 3D monitor of FIG. 45B, a transparent member is fixed to maintain an appropriate air gap Z for three-dimensional display between the panel side surface of the plasma panel and the parallax barrier.

Also, in addition to the parallax barrier, an electromagnetic wave shield is printed on the transparent member by the above-described method. For the electromagnetic wave shield, the parallax barrier may also function as an electromagnetic wave shield by the above described method or an electromagnetic wave shield may be superimposed and printed separately from the parallax barrier.

The reflection preventing layer may be formed by being combined with a near infrared blocking layer.

<Overview of Designing of a Hole Type Parallax Barrier>

Figure 57:
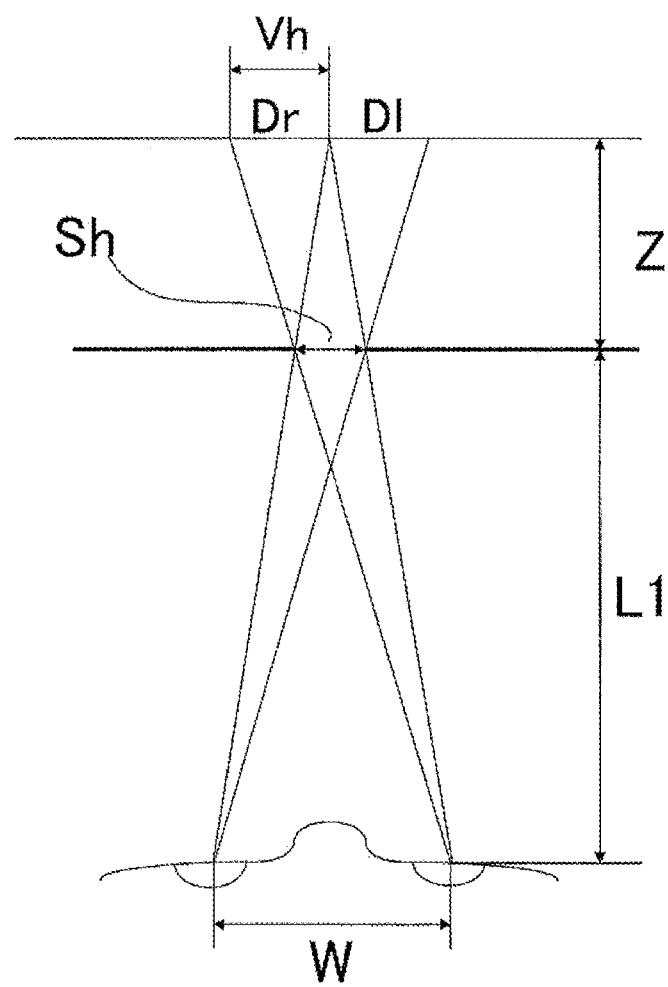
FIG. 57 is an explanatory view for calculating the width Sh of a visible light transmitting section.

As shown in FIG. 57, suppose a subject person of video image presentation is positioned at a predetermined most appropriate three-dimensionally viewable position. When the width of the effective viewable area of one eye is defined as Vh, the pitch of visible light transmitting section of the parallax barrier is defined as Sh, and the distance from the pixel allay surface to the parallax barrier is defined as Z, and the distance from the parallax barrier to the most appropriate three-dimensionally viewable position is defined as L1, as Sh/Vh=L1/(L1+Z) can be obtained, this becomes Sh=L1×Vh/(L1+Z).

Next, the effective viewable area of one eye is determined on the pixel array surface. The effective viewable area can be calculated by an average width of pixels for three-dimensional display and the height of subpixels constituting one pixel.

Next, a rectangular area on the parallax barrier corresponding to the effective viewable area determined on the pixel arranging surface is determined. This rectangular area corresponds to a section, on the parallax barrier surface, of a square pole formed by connecting one eye of the subject person of video image presentation and the effective viewable area, thus, the rectangular area is a like figure with the effective viewable area.

Next, a visible light transmitting section inscribed in the top and bottom and/or left and right sides of the rectangular area is determined.

Next, a plurality of the determined visible light transmitting sections are arranged on the pixel array surface in line with the arrangement of subpixels blended for autostereoscopic display.

It should be noted that the visible light transmitting sections may be transformed to a parallelogram obtained by diagonally inclining the left and right sides of the rectangular area while maintaining the height of the rectangular area. As the rectangular area can be easily transformed to a parallelogram, transformation can be done regardless of the shape of a visible light transmitting section in the rectangular area. In addition, by diagonally transforming the visible light transmitting section, the hole type parallax barrier can be designed more adequately for blending arrangement of a larger number of subpixels.

That is, designing of visible light transmitting sections is performed using a local coordinate system and, when arranging each visible light transmitting section on a parallax barrier, the center point of a visible light transmitting section is arranged using an absolute coordinate system of the whole parallax barrier.

It should be noted that, when determining visible light transmitting sections on a parallax barrier based on the effective viewable area on a pixel array surface, the size of the $\epsilon$ visible light transmitting sections in a vertical direction may be the same as the effective viewable area, instead of the like figure with the effective viewable area. In this configuration, continuity of images in a vertical direction can be attained in a three-dimensional image seen by the subject person of video image presentation.

<A Method of Calculating $\alpha$>

The following will describe a calculation method of an average subpixel number $\alpha$ in a horizontal direction for one pixel for three-dimensional display used in description of a designing method of the visible light transmitting sections. The average subpixel number $\alpha$ is an average number of subpixels in a horizontal direction constituting one pixel for three-dimensional display for one viewpoint among arrangement of blended subpixels for a three-dimensional image on the pixel array surface of the display (an average number of subpixels in a horizontal direction constituting one pixel for three-dimensional display of an autostereoscopic video image generated from video images of a plurality of viewpoints).

It should be noted that, if the arrangement of subpixels constituting a pixel for each viewpoint differs for each viewpoint, the minimum number of pixels combining different arrangements is used to calculate.

Figure 58A:
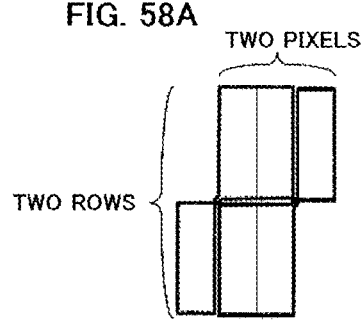
FIGS. 58A to 58E are diagrams showing arrangements of subpixels (pixels for three-dimensional display) in a variety of blending methods.

For example, in the example shown in FIG. 58A, two subpixels are in one row among three subpixels constituting one pixel and the rest one subpixel is arranged in a vertically abutting row. Therefore, as the number of subpixels for two pixels is six, the number of rows is two, and the number of pixels is two, the average subpixel number $\alpha$ becomes (the number of subpixels for two pixels)/(the number of rows×the number of pixels)=6/(2×2)=3/2.

Figure 58B:
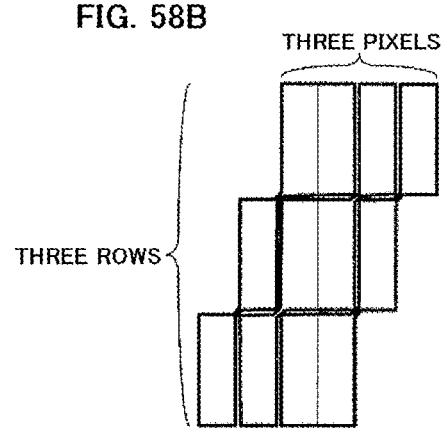

Also, in an example shown in FIG. 58B, as the number of subpixels for three pixels is twelve, the number of rows is three, and the number of pixels is three, the average pixel width D becomes 12/(3×3)=4/3.

Figure 58C:
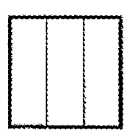

Also, in an example shown in FIG. 58C, the average subpixel number $\alpha$ is clearly three.

Figure 58D:
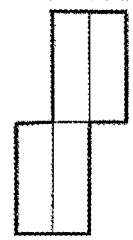

Also, in an example shown in FIG. 58D, the average subpixel number $\alpha$ is clearly two.

Figure 58E:
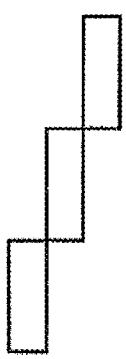

Also, in an example shown in FIG. 58E, the average subpixel number $\alpha$ is clearly one.

<A Method of Designing Visible Light Transmitting Sections>

The following describes the details of a method for designing each visible light transmitting section on a hole type parallax barrier.

(1) First, based on the average number of subpixels in a horizontal direction constituting one pixel and the size thereof, the average width D of pixels for three-dimensional display is calculated. In consideration of the subpixel of width Ph and height Pv, and the average subpixel number in a horizontal direction constituting one pixel is defined as $\alpha$, the average number D of pixels for three-dimensional display can be calculated by D=$\alpha$Ph.

(2) Next, the width of the effective viewable area of one eye is defined as Vh.

Here, to see three-dimensionally, at least part of subpixels for displaying a video image to be seen is required to be seen by one eye of a subject person of video image presentation.

Also, the whole width of one pixel is required to be seen by one eye. This is because the subject person of video image presentation cannot see a three-dimensional video image without seeing the whole width of at least one pixel by one eye.

(3) Next, the width Vh of the effective viewable area of one eye is preferably Vh=1.5D.

It should be noted that the multiplier of the average pixel width D deffer depending on the shape of visible light transmitting sections, the blending method of subpixels, and the method of concatinating vertically abutting pixels (the relationship of arrangements between neighboring pixels).

Specifically, the average subpixel number $\alpha$ in a horizontal direction in one pixel for three-dimensional display is small, the multiplier of the average width D of the pixels for three-dimensional display becomes small. Larger the inclination of the arrangement of a plurality of visible light transmitting sections compared with the inclination of the arrangement of a plurality of subpixels in one pixel for three-dimensional display is by the concatination method of pixels, larger the multiplier of the average width D of pixels for three-dimensional display becomes.

It should be noted that, in a shape in which both ends are tapered, as the area where the pixels at left and right are away from a focal point of pixels equivalent to one viewpoint for one eye as a center, the area of pixels that can be seen becomes small and mixing of views occurs so that the influence of jump points becomes small, thereby adequately decreasing jump points.

(4) Next, the rectangular area (SA) is an effective viewable area of width Vh, and formed to house a single eye's effective viewable area (SEVA) of height Pv or less. Part of the single eye's effective viewable area SEVA becomes an area seen by one eye through one visible light transmitting section instead of a slit.

(5) Next, the shape of the visible light transmitting section housed in the rectangular area SA is preferably bilaterally and/or vertically symmetric. This is because, as the pixels positioned both left and right sides are evenly viewed, steady mixing of views occurs and eyestrain inherent to three-dimensional viewing can be alleviated.

Also, by making the vertically arranged plurality of visible light transmitting sections the same shapes, continuity of images can be maintained.

It should be noted that, to shapely express a three-dimensional effect, it is preferable that the change rate in which the area of a single eye's effective viewable area SEVA reduces with the single eye's effective viewable area SEVA moves away from the center of the focal point of one eye either leftward or rightward while the viewpoint of a subject person of video image presentation transits.

To reduce jump points and maintain luminance of the display, the area of the visible light transmitting section is preferably large. Therefore, to sharply express a three-dimensional effect, reduce jump points, and retain luminance of the display, the shape of the visible light transmitting sections is required to have the above two conditions.

<Specific Shape of Each Visible Light Transmitting Section>

The above description determined conditions that each visible light transmitting section should satisfy in a plurality of visible light transmitting sections formed on a parallax barrier instead of slits.

Next, a specific example of the shape of each visible light transmitting section that satisfies these conditions. It should be noted that as far as the three-dimensional effect is not impaired, the shapes of all visible light transmitting sections may be the same, or the shapes of respective visible light transmitting sections may be different from one another.

To attain a sharper three-dimensional image, reduce jump points by view-mixing that prevents eyestrain, and retain luminance of the display, it is preferable to increase the change rate in which the area of a single eye's effective viewable area SEVA reduces even if the single eye's effective viewable area SEVA moves away to left or right from the center of the focal point of the single eye, enlarge the area of the visible light transmitting sections as much as possible, and make the shape of the edge of the visible light transmitting sections bilaterally or vertically symmetric.

As for the shape of each visible light transmitting section, elliptic arcs, triangles, rhombuses, or polygons of even number of corners such as rectangles, hexagons, and octagons, or a shape of prickly balls may be used.

Also, the shape may be a polygon where the corners are drawn as arcs of a predetermined pi.

It will be appreciated that when arranging shapes such as arcs, rhombuses, polygons with even number of corners, and prickly balls, the shape is preferably arranged bilaterally and/or vertically symmetric.

FIGS. 59A to 59J show specific shapes of visible light transmitting sections. FIG. 59A is a rectangle. FIG. 59B is a rectangle (rhombus). FIGS. 59C and 59D are hexagons. FIG. 59E is an octagon. FIGS. 59F to 59J are examples of polygons drawn by transforming figures of FIGS. 59A to 59E and using arcs of predetermined pi for four corners of the rectangular areas SA.

It should be noted, when transforming the rectangular area to a parallelogram, the visible light transmitting sections do not be vertically or bilaterally symmetric. However, even in such a case, it is preferable to set visible light transmitting sections vertically and/or bilaterally symmetric when setting visible light transmitting sections in a rectangular area before transformation.

<Details of Transformation of a Rectangular Area>

When transforming a rectangular area to a parallelogram, left and right sides of the rectangular area are inclined to transform to a parallelogram while maintaining the height of the rectangular area.

Here, the inclination angle is defined as angle $\theta$, the inclination of the arrangement of pixels for each viewpoint, that is, the inclination of the arrangement of visible light transmitting sections on the parallax barrier, is defined as angle $\theta 1$, and the inclination of the arrangement of each subpixel within one pixel is defined as $\theta 2$ (when a plurality of subpixels constituting one pixel are arranged over two rows or more). The range of which angle $\theta$ can take is preferably perpendicular, that is, angle $0$, to a larger one of either angle $\theta 1$ or angle $\theta 2$.

Also, to attain an autostereoscopic effect, it is particularly preferable that the angle $\theta$ is a value between angle $\theta 1$ and angle $\theta 2$.

As shown in FIG. 60A, if the coordinates of a point at which a rectangular area before transformation is positioned is defined as (x, y), the coordinate after transformation becomes $(x+y \tan \theta, y)$.

It should be noted that, as shown in FIG. 60B, the actual transformation is performed by shifting the upper side and lower side in opposite directions by the same amount so as not to change the position of the center point of the rectangular area.

It should be noted that, as shown in FIG. 60C, transformation of the rectangular area may be done by rotating the rectangular area with the center point as the center and adjusting length of long sides and short sides, instead of transformation to a parallelogram.

It is preferable that in this transformation, with the rectangular area rotated by angle $\theta$, in relation to transformation of the size of the rectangular area, the rectangular area is preferably enlarged or reduced while maintaining the length of the viewable area ½V as a horizontal width by defining the width as ½V cos $\theta$ and height as h/cos $\theta$ so that the vertically arranged rectangular areas are concatenated.

<Arranging a Plurality of Visible Light Transmitting Sections>

A plurality of visible light transmitting sections may be arranged on a straight line in a vertical direction, or arranged on a straight line in a diagonal direction, or arranged in a zigzag shape as described above.

However, the method of blending subpixels for each viewpoint is required to be adjusted according to the arrangement state of a plurality of visible light transmitting sections. It should be noted that the specific blending method will be described later.

<Specific Example of a Hole Type Parallax Barrier>

As specific examples of hole type parallax barriers, three cases of blending arrangements will be introduced. Further, two patterns of rectangular areas (square and parallelogram) are introduced for each case of blending method. In the following example, the shape of visible light transmitting sections is elliptic arcs.

It should be noted that the characteristic of a rectangular area of parallelogram is that, as three-dimensional images can be clearly shown, viewmixing can be realized even when visible light transmitting sections are narrow, and the three-dimensional effect can be maintained until a jump point even when the viewpoint moves in a horizontal direction and the jump point can be somewhat alleviated.

However, the visible light transmitting sections become bilaterally unsymmetric, which is considered to cause eyestrain sometimes.

In case 1, subpixels are concatenated in a vertical direction so that the inclination of the arrangement of visible light transmitting sections corresponding to the blended arrangement configured by three subpixels over three rows becomes the same inclination of the arrangement of subpixels constituting a pixel.

For this reason, while popping out degree of a three-dimensional image is large and the image looks clear, the three-dimensional image becomes hard to see if the viewpoint slightly moves in a horizontal direction.

Figure 61:
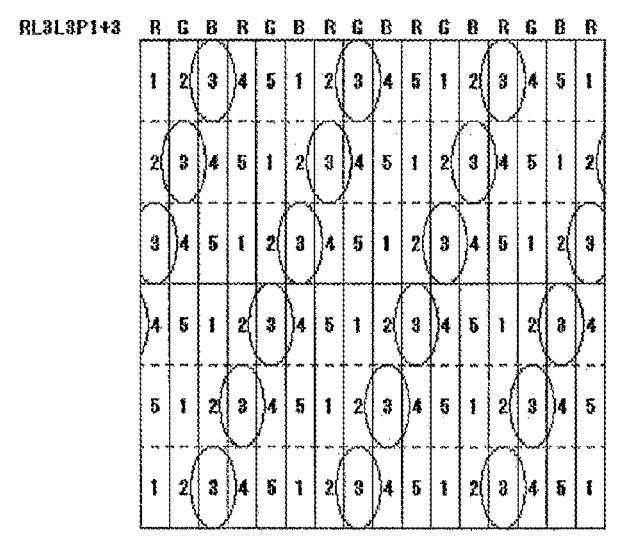

FIG. 61 shows a combination of a blending method of case 1 and visible light transmitting sections designed by a rectangular area of a rectangle shape.

Figure 62:
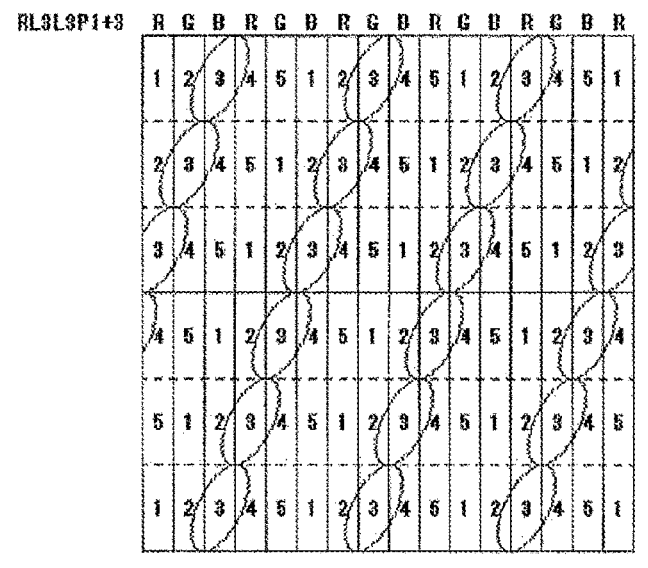

Also, FIG. 62 shows a combination of a blending method of case 1 and visible light transmitting sections designed by a rectangular area of a parallelogram.

In case 2, the subpixels are shifted by one subpixel and concatenated in a vertical direction so that the inclination of the arrangement of visible light transmitting sections corresponding to the blended arrangement configured by three subpixels over three rows differs from the inclination of the arrangement of subpixels constituting a pixel.

For this reason, while popping out degree of a three-dimensional image is large, the image somewhat lucks clarity. However, the three-dimensional effect can be maintained up to a jump point even if the viewpoint moves in a horizontal direction.

Figure 63:
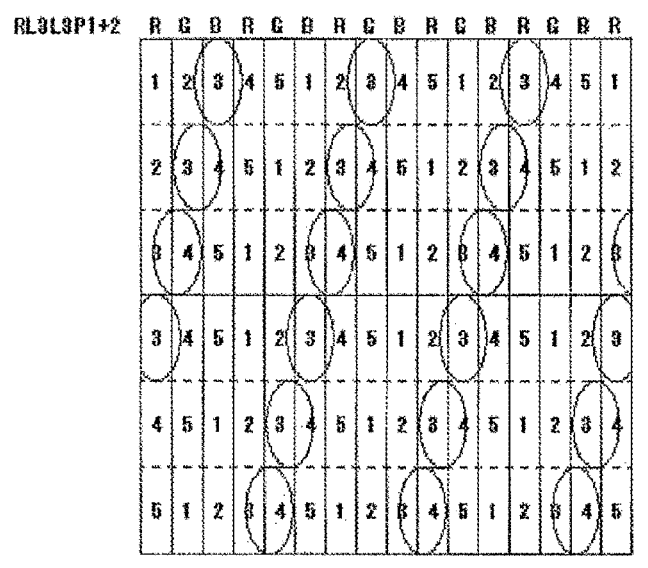

FIG. 63 shows a combination of a blending method of case 2 and visible light transmitting sections designed by a rectangular area of a rectangle shape.

Figure 64:
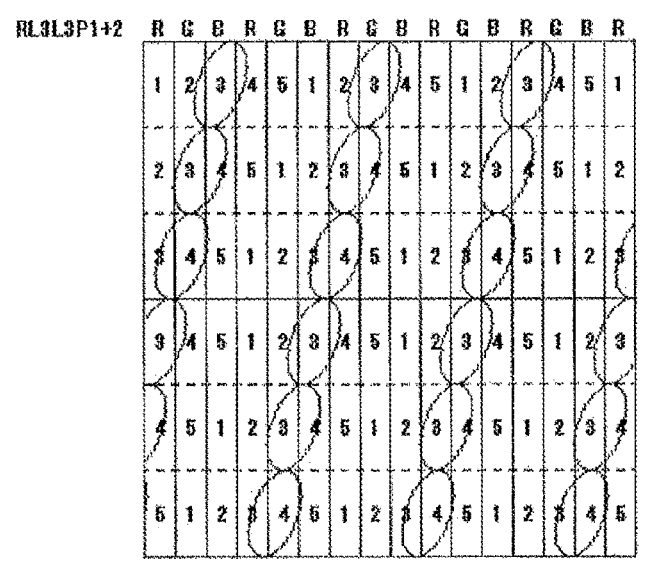

Also, FIG. 64 shows a combination of a blending method of case 2 and visible light transmitting sections designed by a rectangular area of a parallelogram.

In case 3, the visible light transmitting sections corresponding to the blended arrangement configured by three subpixels over three rows and subpixels constituting a pixel are arranged to generate adequate viewmixing.

For this reason, while popping out degree of a three-dimensional image and clarity of the image are somewhat weakened, the three-dimensional effect can be maintained up to a jump point even if viewpoint moves in a horizontal direction, and the jump point can be substantially cancelled.

Figure 65:
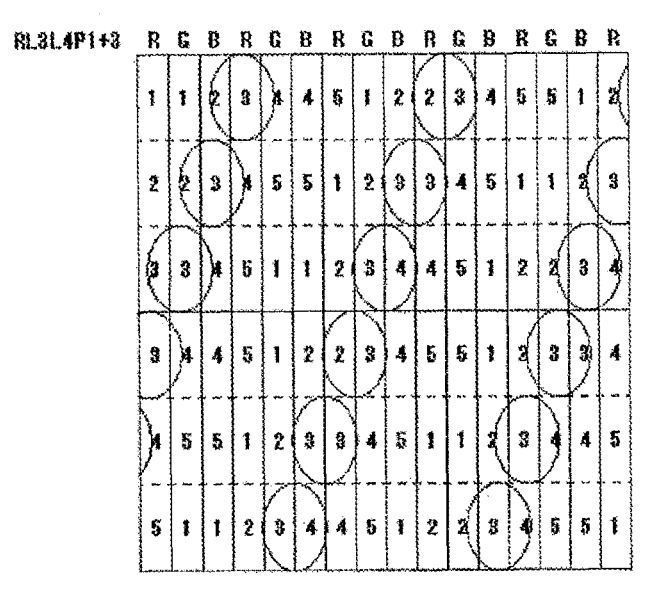

FIG. 65 shows a combination of a blending method of case 3 and visible light transmitting sections designed by a rectangular area of a rectangle shape. The pixel comprising four subpixels over three rows is formed by giving special emphasis on viewmixing.

Figure 66:
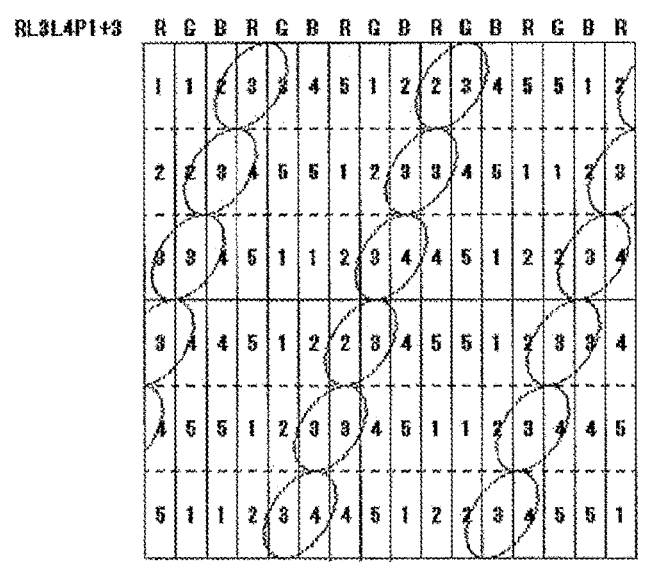

Also, FIG. 66 shows a combination of a blending method of case 3 and visible light transmitting sections designed by a rectangular area of a parallelogram.

<Calculating Visible Light Transmitting Sections>

When calculating visible light transmitting sections on a parallax barrier based on an effective viewable area on a pixel array surface, a visible light transmitting section which is a like figure with the effective viewable area is calculated using either eye of a subject person of video image presentation at an appropriate three-dimensionally viewable position as a base point.

Figure 67A:
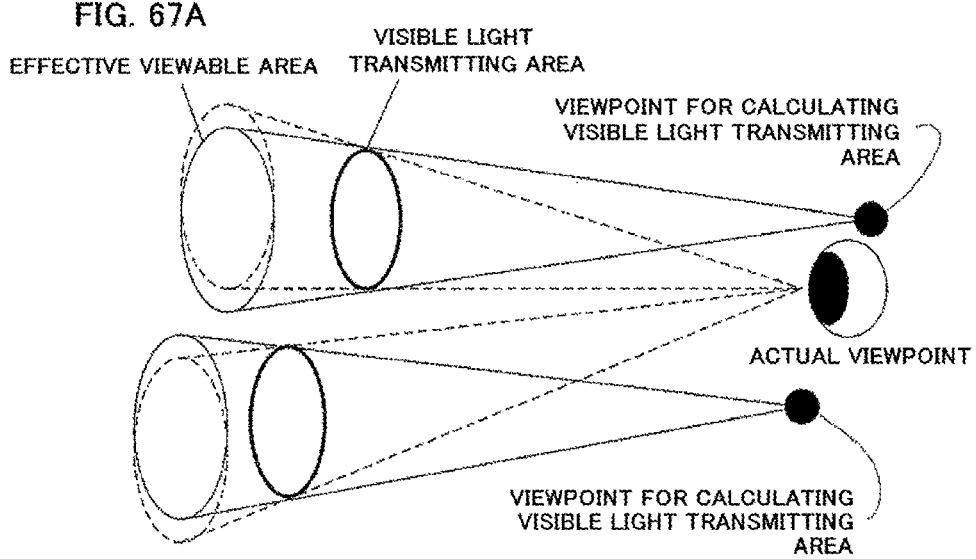
FIG. 67A is a diagram showing a vertical displacement between a designed viewpoint and an actual viewpoint.

Here, the visible light transmitting section may be a like figure with the effective viewable area in a horizontal direction without problem, while the visible light transmitting section becomes a state as shown in FIG. 67A if it is a like figure with the effective viewable area in a vertical direction.

In FIG. 67A, the large elliptic arc represented by a solid line on the left side of FIG. 67A represents two effective viewable areas on a pixel array surface upon designing. The small elliptic arc represented by a solid line on the right side thereof represents two visible light transmitting sections formed on a parallax barrier.

The upper viewpoint and lower viewpoint among three viewpoints in FIG. 67A are viewpoints used for designing each visible light transmitting section. The viewpoint in the middle is a viewpoint for actually seeing an image.

In this way, as the designed viewpoint and the actual viewpoint are different, the position of an actually seen effective viewable area is shifted from a designed visible light transmitting section to a position indicated by the dash line.

Figure 67B:
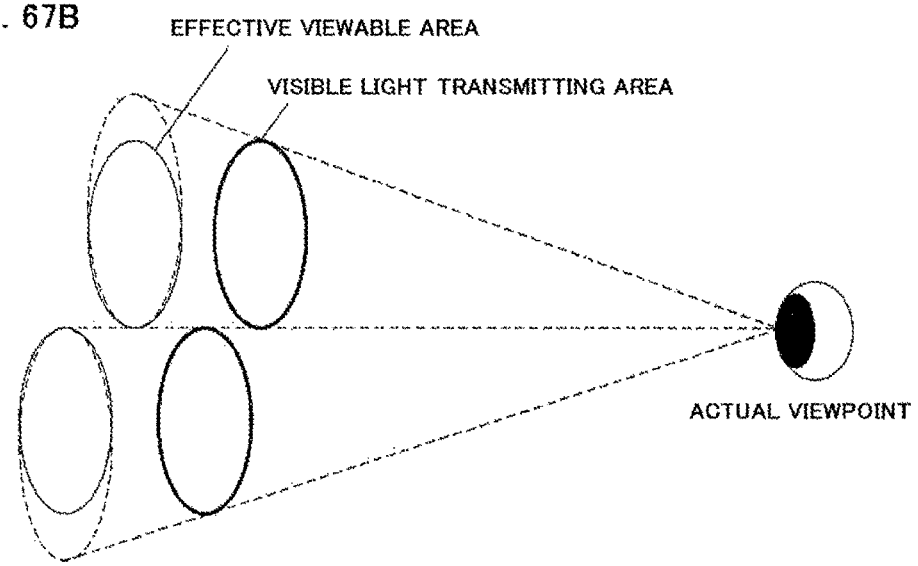
FIG. 67B is a diagram showing a position of an effective viewable area deformed into a like figure only in a horizontal direction.
Figure 69A:
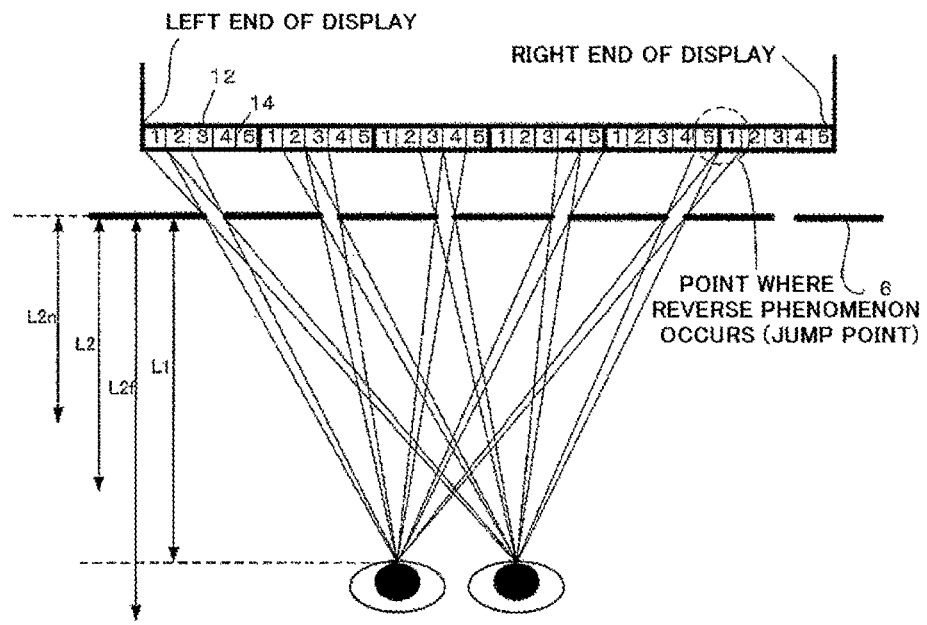
FIG. 69A is a diagram illustrating a case in which a most-appropriate three-dimensionally viewable position and a diagonal moire cancelling position are the same position.
Figure 69B:
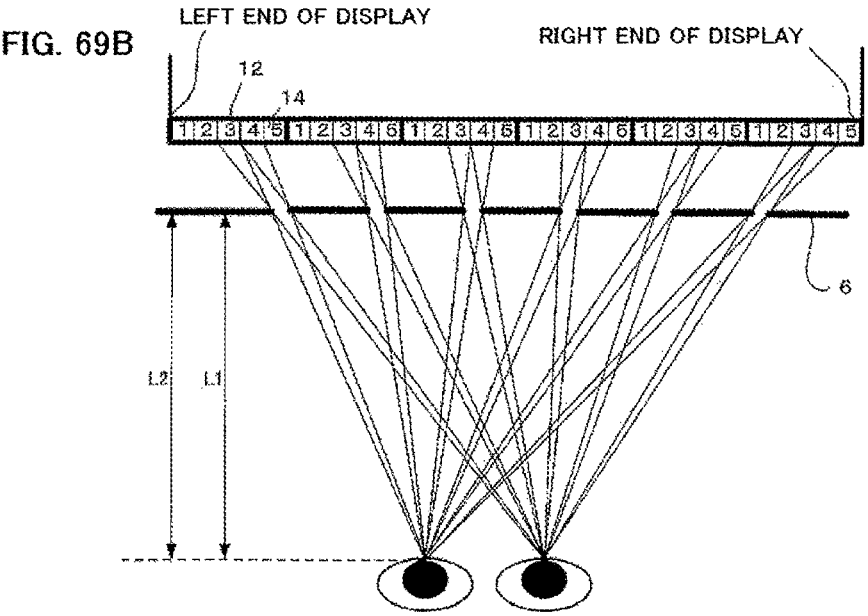
FIG. 69B is a diagram illustrating a case in which a most-appropriate three-dimensionally viewable position and a diagonal moire cancelling position are the same position.

Thus, as shown in FIG. 67B, a visible light transmitting section can be designed and arranged while adequately maintaining an interval in a vertical direction using a method that converts the visible light transmitting section to a like figure in a horizontal direction (x coordinate) yet does not convert to a like figure in a vertical direction (y coordinate). In this way, a visible light transmitting section can be designed and arranged while adequately maintaining an interval in a vertical direction.

It should be noted that if the rectangular area that houses the effective viewable area is transformed to a parallelogram, or transformed by rotating, enlarging, or contracting, it is preferable that the height of the effective viewable area in a vertical direction is maintained by being elongated in a longitudinal direction (long side direction).

<The Parallax Barrier that Also Functions as a Reflection Preventing Layer>

The parallax barrier has a processed surface on which a visible light impermeable section 46 provided on the side of a subject person of video image presentation are processed with a fine concavoconvex (e.g., grain finish, anti-glare processing) (refer to FIG. 68). That is, the visible light impermeable section 46 of the parallax barrier also functions as a light diffusing film, which can defuse light individually emitted from each light emitting element when it enters by the processed surface. In addition, as the concavoconvex is fine, the visible light impermeable section 46 of the parallax barrier does not diffuse light too far. Also, the visible light impermeable section of the parallax barrier may be formed with material generally known as a polarization film or polarization plate of a type that transmits linear polarized light that oscillates in one direction perpendicular to the surface and absorbs linear polarized light that oscillates in other direction.

It should be noted that the visible light impermeable section may be formed by printing on a glass surface or by a method generally used as a method of producing a parallax barrier such as a photolithography.

<Other Methods for Cancelling Horizontal Moire>

Next, the following describes other methods for cancelling horizontal moire.

In the above method, a parallax barrier that cancells horizontal moire is designed by setting in advance a horizontal moire cancelling position and a position from which one line of horizontal moire is seen (refer to FIGS. 7 to 9) and assigning calculating formula in such positions to cancell horizontal moire.

However, in a horizontal direction, as the interval of visible light transmitting sections in a vertical direction where one line of horizontal moire is generated is narrower than the interval of visible light transmitting section in a horizontal direction where one line of horizontal moire is generated, it is possible to cancel moire only in a narrow range between a position where moire is not seen and close to the parallax barrier to a position where moire is not seen and away from the parallax barrier, compared with diagonal moire.

Then, as shown in FIGS. 70A to 70D, the vertical arrangement positions of staircase patterned and skewered dumpling like slits and holes are different in a horizontal direction, that is, the slits and holes have irregularity. In this way, as holes and the like do not regularly line up at the upper end in a horizontal direction, generation of moire can be prevented. As the arranging position of visible light transmitting sections in a vertical direction of the parallax barrier is made irregular, moire generated for each slit becomes irregular and there is no continuity in horizontal moire, whereby significant horizontal moire is not generated.

Arranging positions of holes and the like (arrangement start position) are determined by generating random numbers. Alternatively, the positions may be determined by other methods such as changing a wavelength.

It should be noted that the irregularity is about changing start positions, and irregularity between neighboring lines are considered. Thus, the irregularity includes regularity in a wider scale.

DESCRIPTION OF REFERENCE NUMERALS AND SIGNS

2 PIXEL FOR THREE-DIMENSIONAL DISPLAY
4 SUBJECT PERSON OF VIDEO IMAGE PRESENTATION
6 PARALLAX BARRIER
8 SUBPIXEL
10 VISIBLE LIGHT TRANSMITTING SECTION
12 PIXEL UNIT FOR THREE-DIMENSIONAL DISPLAY
14 VIRTUAL PIXEL
16 VIRTUAL SUBPIXEL
18 SPACER
20 DISPLAY
22 IMAGE DISPLAY SURFACE
24 EFFECTIVE VIEWABLE AREA
26 RECTANGULAR AREA
28 MOST APPROPRIATE THREE-DIMENSIONALLY VIEWABLE POSITION
30 MOIRE CANCELLING POSITION
32 APPROPRIATE THREE-DIMENSIONALLY VIEWABLE AREA
34 DIAGONAL MOIRE CANCELLING AREA
35 PATTERN AREA
36 HORIZONTAL MOIRE CANCELLING AREA
38 CALIBRATION LINE
40 EFFECTIVE PIXEL AREA OF MONITOR
42 GLASS
44 OPERATOR
46 VISIBLE LIGHT IMPERMEABLE SECTION

What is claimed is:

1. A parallax barrier for an autostereoscopic display wherein
the parallax barrier for an autostereoscopic display is provided with a distance Z from an image display surface of a display on which a plurality of pixels each having horizontally arranged three subpixels displaying R, G, and B are arranged in horizontal and vertical directions,
values relating to sizes and arrangements of a plurality of visible light transmitting sections and a value of the distance Z are calculated and designed based on a predetermined designing condition, and
in autostereoscopic viewing under a condition in which:
an average number of subpixels in a horizontal direction constituting pixels for three-dimensional display for one viewpoint of an autostereoscopic video image created from video images of a plurality of viewpoints is defined as $\alpha$;
a width of subpixels constituting the display is defined as Ph;
a distance between centers of pixels for three-dimensional display that display video images of neighboring viewpoints is defined as $\alpha$Ph;
a distance between pupils of left and right eyes of a subject person of video image presentation is defined as W; and
a number of viewpoints of the video images for creating the autostereoscopic video image is defined as N, and
in a design condition in which:
a most appropriate three-dimensionally viewable position is preset and a distance from such a position to the parallax barrier is defined as L1; and
a diagonal moire cancelling position is preset and a distance from such a position to the parallax barrier is defined as L2,
the parallax barrier is designed by
determining a value of the distance Z from the image display surface of the display to the parallax barrier by a following function (1); and
determining a value of an interval Hh between a plurality of horizontally abutting visible light transmitting sections constituting the parallax barrier by a following function (2):

$$Z = \frac{\alpha Ph \times L1}{W} \quad (1)$$

$$Hh = \frac{N \times \alpha Ph \times L2}{Z + L2}. \quad (2)$$

2. A parallax barrier for an autostereoscopic display wherein
the parallax barrier for an autostereoscopic display is provided with a distance Z from an image display surface of a display on which a plurality of pixels each having horizontally arranged three subpixels displaying R, G, and B are arranged in horizontal and vertical directions,
values relating to sizes and arrangements of a plurality of visible light transmitting sections and a value of the distance Z are calculated and designed based on a predetermined designing condition, and
in autostereoscopic viewing under a condition in which:
an average number of subpixels in a horizontal direction constituting pixels for three-dimensional display for one viewpoint of an autostereoscopic video image created from video images of a plurality of viewpoints is defined as $\alpha$;
a width of subpixels constituting the display is defined as Ph;
a distance between centers of pixels for three-dimensional display that display video images of neighboring viewpoints is defined as $\alpha$Ph;
a distance between pupils of left and right eyes of a subject person of video image presentation is defined as W;
a horizontal resolution of the display is defined as Ir; and
a number of viewpoints of the video images for creating the autostereoscopic video image is defined as N, and
in a design condition in which:
a most appropriate three-dimensionally viewable position is preset and a distance from such a position to the parallax barrier is defined as L1; and an appropriate three-dimensionally viewable position is preset as a position closest to the parallax barrier among positions from which one line of diagonal moire is seen, and a distance from such an appropriate three-dimensionally viewable position to the parallax barrier is defined as L2n, the parallax barrier is designed by:

determining a value of the distance Z from the image display surface of the display to the parallax barrier by a following function (1);

determining a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position by a following formula (3); and, determining a value of an interval Hh between a plurality of horizontally abutting visible light transmitting sections constituting the parallax barrier by a following function (4):

$$Z = \frac{\alpha Ph \times L1}{W} \quad (1)$$

$$Mh = int\left(\frac{3Ir-1}{N}\right) + 1 \quad (3)$$

$$Hh = \frac{N \times Mh \times \alpha Ph \times L2n}{(Z+L2n) \times (Mh-1)}. \quad (4)$$

3. A parallax barrier for an autostereoscopic display wherein: the parallax barrier for an autostereoscopic display is provided with a distance Z from an image display surface of a display on which a plurality of pixels each having horizontally arranged three subpixels displaying R, G, and B are arranged in horizontal and vertical directions; values relating to sizes and arrangements of a plurality of visible light transmitting sections and a value of the distance Z are calculated and designed based on a predetermined designing condition; and in autostereoscopic viewing under a condition in which:

an average number of subpixels in a horizontal direction constituting pixels for three-dimensional display for one viewpoint of an autostereoscopic video image created from video images of a plurality of viewpoints is defined as α; a width of subpixels constituting the display is defined as Ph; a distance between centers of pixels for three-dimensional display that display video images of neighboring viewpoints is defined as αPh; a distance between pupils of left and right eyes of a subject person of video image presentation is defined as W; a horizontal resolution of the display is defined as Ir; and a number of viewpoints of the video images for creating the autostereoscopic video image is defined as N, and in a design condition in which: a most appropriate three-dimensionally viewable position is preset and a distance from such a position to the parallax barrier is defined as L1; and an appropriate three-dimensionally viewable position is preset as a position farthest to the parallax barrier among positions from which one line of diagonal moire is seen, and a distance from such an appropriate three-dimensionally viewable position to the parallax barrier is defined as L2f, the parallax barrier is designed by: determining a value of the distance Z from the image display surface of the display to the parallax barrier by a following function (1); determining a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position by a following formula (3); and determining a value of an interval Hh between a plurality of horizontally abutting visible light transmitting sections constituting the parallax barrier by a following function (5):

$$Z = \frac{\alpha Ph \times L1}{W} \quad (1)$$

$$Mh = int\left(\frac{3Ir-1}{N}\right) + 1 \quad (3)$$

$$Hh = \frac{N \times (Mh-2) \times \alpha Ph \times L2f}{(Z+L2f) \times (Mh-1)}. \quad (5)$$

4. The parallax barrier for an autostereoscopic display according to any one of claims 1 to 3, wherein, in autostereoscopic viewing under a condition in which:

a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is a plurality of independently formed holes;

a number of one unit of the visible light transmitting sections of the repeated shapes or the visible light transmitting sections of the plurality of holes in a vertical direction corresponding to one subpixel is defined as β; and a height of subpixels forming the display is defined as Pv, and in a design condition in which:

the distance Z is calculated by the formula (I); and a horizontal moire cancelling position is preset and a distance from such a position to the parallax barrier is defined as L3, the parallax barrier is designed by:

determining a value of an interval Hv between vertically abutting visible light transmitting sections of the staircase patterned or the skewered dumpling like shaped, or the plurality of holes by a following formula (6):

$$Hv = \frac{Pv \times L3}{(Z+L3) \times \beta}. \quad (6)$$

5. The parallax barrier for an autostereoscopic display according to claim 4, wherein generation of horizontal moire is prevented by irregularly arranging only vertical arrangement positions (arrangement starting positions) of the plurality of visible light transmitting sections of the staircase pattern, the skewered dumpling like shape, or the plurality of holes for each of the slits that abut in a horizontal direction.

6. The parallax barrier for an autostereoscopic display according to claim 5, wherein the irregularity is characterized by determining the arrangement positions (arrangement starting positions) using random digits.

7. The parallax barrier for an autostereoscopic display according to any one of claims 1 to 3, wherein, in autostereoscopic viewing under a condition in which:
- a shape of an edge of slits as the visible light transmitting sections constituting the parallax barrier is a staircase pattern, or a skewered dumpling like shape in which any of circular arcs, elliptic arcs,
- and polygons are repeatedly concatenated, or a shape of the visible light transmitting sections constituting the parallax barrier is a plurality of independently formed holes;
- a number of one unit of the visible light transmitting sections of the repeated shapes or the visible light transmitting sections of the plurality of holes in a vertical direction corresponding to one subpixel is defined as β;
- a vertical resolution of the display is defined as Jr; and
- a height of subpixels forming the display is defined as Pv, and in a design condition in which:
- the distance Z is calculated by the formula (I); and
- a position closest to the parallax barrier among positions from which one line of horizontal moire is seen is preset, and a distance from such a position to the parallax barrier is defined as L3n, the parallax barrier is designed by:
- determining a value of a number Mv of one unit of the visible light transmitting sections of the repeated shape or visible light transmitting sections of the plurality of holes in a vertical direction from a visible light transmitting section of the shape corresponding to a subpixel at an upper end of the display to a visible light transmitting section of the shape corresponding to a subpixel at a lower end of the display seen from a horizontal moire cancelling position by a following formula (7); and
- determining a value of an interval Hv of vertically abutting visible light transmitting sections of the staircase patterned, the skewered dumpling like shaped, or the plurality of holes by a following formula (8):

$$Mv = Jr \times \beta \qquad (7)$$

$$Hv = \frac{\left(Jr - \frac{1}{\beta} + 1\right) \times Pv \times L3n}{(Z + L3n) \times (Mv - 1)}. \qquad (8)$$

8. The parallax barrier for an autostereoscopic display according to any one of claims 1 to 3, wherein, in autostereoscopic viewing under a condition in which:
- a shape of an edge of slits as the visible light transmitting sections constituting the parallax barrier is a staircase pattern, or a skewered dumpling like shape in which any of circular arcs, elliptic arcs,
- and polygons are repeatedly concatenated, or a shape of the visible light transmitting sections constituting the parallax barrier is a plurality of independently formed holes;
- a number of one unit of the visible light transmitting sections of the repeated shape or the visible light transmitting sections of the plurality of holes in a vertical direction corresponding to one subpixel is defined as β;
- a vertical resolution of the display is defined as Jr; and
- a height of subpixels forming the display is defined as Pv, and in a design condition in which:
- the distance Z is calculated by the formula (I); and
- a position farthest to the parallax barrier among positions from which one line of diagonal moire is seen is preset, and a distance from such a position to the parallax barrier is defined as L3f, the parallax barrier is designed by:
- determining a value of a number Mv of one unit of the visible light transmitting sections of the repeated shape or visible light transmitting sections of the plurality of holes in a vertical direction from a visible light transmitting section of the shape corresponding to a subpixel at an upper end of the display to a visible light transmitting section of the shape corresponding to a subpixel at a lower end of the display seen from a horizontal moire cancelling position by a following formula (7); and
- determining a value of an interval Hv of vertically abutting visible light transmitting sections of the staircase patterned, the skewered dumpling like shaped, or the plurality of holes by a following formula (9):

$$Mv = Jr \times \beta \qquad (7)$$

$$Hv = \frac{\left(Jr - \frac{1}{\beta} - 1\right) \times Pv \times L3f}{(Z + L3f) \times (Mv - 1)}. \qquad (9)$$

9. The parallax barrier for an autostereoscopic display according to any one of claims 1 to 3, wherein
in autostereoscopic viewing under a condition in which:
- a distance between pupils of left and right eyes of a subject person of video image presentation is defined as W;
- a width of an effective viewable area seen by one eye of the subject person of video image presentation through visible light transmitting sections of width Sh constituting the parallax barrier from the most appropriate three-dimensionally viewable position is defined as Vh;
- an average number of subpixels in a horizontal direction constituting pixels for three-dimensional display for one viewpoint of an autostereoscopic video image created from video images of a plurality of viewpoints is defined as α;
- a width of subpixels constituting the display is defined as Ph; and
- a distance between centers of pixels for three-dimensional display that display video images of neighboring viewpoints is defined as αPh, the parallax barrier is designed by:
- determining a value of the width Sh of the visible light transmitting sections constituting the parallax barrier by a following formula (10):

$$Sh = \frac{W \times Vh}{W + \alpha Ph}. \qquad (10)$$

10. A designing method of the parallax barrier for an autostereoscopic display according to claim 4, wherein, in autostereoscopic viewing under a condition in which:
- a shape of an edge of slits as the visible light transmitting sections constituting the parallax barrier is a staircase pattern, or a skewered dumpling like shape in which any of circular arcs, elliptic arcs, and polygons are repeatedly concatenated, or the shape of the visible light transmitting sections constituting the parallax barrier is independently formed plurality of holes;

a height of a predetermined effective viewable area seen from a subject person of video image presentation through visible light transmitting sections of height Sv constituting the parallax barrier from the most appropriate three-dimensionally viewable position is defined as Vv;

an interval of the visible light transmitting sections of the plurality of holes that abut one another in a vertical direction of the parallax barrier is defined as Hv; and an aperture ratio (a coefficient for Hv) of the vertical direction is defined as $\lambda$, and in a design condition in which:

a most appropriate three-dimensionally viewable position is preset, and a distance from such a position to the parallax barrier is defined as L1; and the distance Z is calculated by the formula (I), a value of the height Sv of visible light transmitting sections of the staircase patterned, the skewered dumpling like shaped, or the plurality of holes is determined by a following formula (11) or (11)':

$$Sv = \frac{L1 \times Vv}{L1 + Z} \tag{11}$$

$$Sv = \lambda \times Hv. \tag{11}'$$

11. The designing method of the parallax barrier for an autostereoscopic display according to any one of claims 1 to 3, wherein:

using the distance Z calculated by the formula (I);

a distance W between pupils of left and right eyes of a subject person of video image presentation; and a width Vh of an effective viewable area seen by one eye of the subject person of video image presentation through visible light transmitting sections of width Sh constituting the parallax barrier from the most appropriate three-dimensionally viewable position, the parallax barrier is designed by:

determining a closest distance L1n within an appropriate three-dimensionally viewable area by a following formula (12);

determining a farthest distance L1f within the appropriate three-dimensionally viewable area by a following formula (13); and presetting a distance L2 from the diagonal moire cancelling position to the parallax barrier within the appropriate three-dimensionally viewable area from L1n to L1f:

$$L1n = \frac{Z \times W}{Vh} \tag{12}$$

$$L1f = \frac{2 \times Z \times W}{Vh}. \tag{13}$$

12. The designing method of the parallax barrier for an autostereoscopic display according to any one of claims 1 to 3 wherein:

a distance L1 from the most appropriate three-dimensionally viewable position to the parallax barrier is set as a same distance as a distance L2 from the diagonal moire cancelling position to the parallax barrier.

13. The parallax barrier for an autostereoscopic display according to claim 4, wherein:

a shape of an edge of slits as the visible light transmitting sections constituting the parallax barrier is a staircase pattern, or a skewered dumpling like shape in which any of circular arcs, elliptic arcs, and polygons are repeatedly concatenated, or a shape of the visible light transmitting sections constituting the parallax barrier is independently formed plurality of holes;

values relating to sizes and arrangements of the plurality of visible light transmitting sections and a value of the distance Z are calculated and designed based on a predetermined design condition; and a distance L1 from the most appropriate three-dimensionally viewable position to the parallax barrier is preset as a same distance as a distance L2 from the diagonal moire cancelling position to the parallax barrier and a distance L3 from the horizontal moire cancelling position to the parallax barrier.

14. The parallax barrier for an autostereoscopic display according to any one of claims 1 to 3 wherein, in autostereoscopic viewing under a condition in which:

an average number of subpixels in a horizontal direction constituting pixels for three-dimensional display for one viewpoint of an autostereoscopic video image created from video images of a plurality of viewpoints is defined as $\alpha$;

a width of subpixels constituting the display is defined as Ph; and a distance between centers of pixels for three-dimensional display that display video images of neighboring viewpoints is defined as $\alpha$Ph, the parallax barrier is designed by:

defining a maximum area on an image display surface intended to be seen by one eye of a subject person of video image presentation through visible light transmitting sections of width Sh constituting the parallax barrier from the most appropriate three-dimensionally viewable position as a rectangular area;

determining a width Vh max of the rectangular area as being 2×$\alpha$Ph or more and less than 3×$\alpha$Ph;

determining a width Vh of a predetermined effective viewable area seen by one eye of the subject person of video image presentation through visible light transmitting sections of width Sh constituting the parallax barrier as being $\alpha$Ph or more and Vh max or less.

15. The designing method of the parallax barrier for an autostereoscopic display according to claim 4 wherein, in autostereoscopic viewing under a condition in which:

an interval of vertically abutting subpixels is defined as Hpv; and a number of one unit of the visible light transmitting sections of the repeated shape or the visible light transmitting sections of the plurality of holes in a vertical direction corresponding to one subpixel is defined as $\beta$, the parallax barrier is designed by determining an interval Hv of vertically abutting visible light transmitting sections of the staircase patterned, the skewered dumpling like shaped, or the plurality of holes using an equation Hv=Hpv/$\beta$ ($\beta$ is a natural number).

16. The parallax barrier for an autostereoscopic display according to any one of claims 1 to 3, wherein a calibration line of vertical slit shape that transmits visible light is provided at least either left end or right end thereof, and the parallax barrier is fixed to the display by calibration operation by:
being placed on the display;
adjusting a position so that visible light seen through the calibration line becomes a same color; and
being moved in a parallel manner to a position at which a subject person of video image presentation does not see the calibration line.

17. The parallax barrier for an autostereoscopic display according to claim 16, wherein a width of the calibration line Ch is determined by a following formula (14) using a width Ph of subpixels forming the display, and a distance L4 from one eye of an operator to the parallax barrier when performing the calibration operation:

$$Ch = \frac{L4 \times Ph}{Z + L4}. \tag{14}$$

18. The designing method of a parallax barrier for an autostereoscopic display according to any one of claims 1 to 3, wherein
the distance Z from an image display surface of the display to the parallax barrier is determined by, instead of the formula (I), the following formula (15) using:
a width Vh of an effective viewable area seen by one eye through visible light transmitting sections of width Sh from a closest distance L1n from the parallax barrier to a predetermined appropriate three-dimensionally viewable area; and
a distance W between pupils of left and right eyes of a subject person of video image presentation:

$$Z = \frac{Vh \times L1n}{W}. \tag{15}$$

19. The parallax barrier for an autostereoscopic display according to any one of claims 1 to 3, wherein
the distance Z from an image display surface forming the display to the parallax barrier is determined by, instead of the formula (I), the following formula (16) using:
a width Vh of an effective viewable area seen by one eye through visible light transmitting sections of width Sh from a farthest distance L1f from the parallax barrier to a predetermined appropriate three-dimensionally viewable area; and
a distance W between pupils of left and right eyes of a subject person of video image presentation:

$$Z = \frac{Vh \times L1f}{2W}. \tag{16}$$

20. The parallax barrier for an autostereoscopic display according to any one of claims 4 to 19, wherein, in a case in which: the display is a plasma display; a shape of visible light transmitting sections constituting the parallax barrier is a plurality of independently formed holes; a width of the visible light transmitting sections constituting the parallax barrier is defined as Sh; a height of the visible light transmitting sections of the plurality of holes is defined as Sv; and an effective maximum amplitude that blocks electromagnetic waves generated from the plasma display is defined as Er, the parallax barrier is designed by: determining a value of a number β of the visible light transmitting sections in a vertical direction corresponding to the one subpixel by a following formula (17) (calculating a smallest integer equal to or more than a value calculated by calculation between □s the same goes for a formula (18); determining a value of a number γ of the visible light transmitting sections in a horizontal direction corresponding to the one subpixel by the following formula (18); and forming with material that blocks electromagnetic waves generated from the plasma display:

$$\beta = \square \frac{Sh}{Er} \square \tag{17}$$

$$\gamma = \square \frac{Sv}{Er} \square. \tag{18}$$

21. The parallax barrier for an autostereoscopic display according to claim 4, wherein the visible light transmitting sections of the plurality of independently formed holes constituting the parallax barrier are an elliptic arc shape, a Japanese lantern shape with flattened top and button elliptic arcs, or a convex polygon with more than of four even number corners.

22. The parallax barrier for an autostereoscopic display according to claim 21, wherein the visible light transmitting sections of the plurality of independently formed holes constituting the parallax barrier are of a shape formed by inclining in a horizontal direction, by a predetermined angle, the elliptic arc shape, the Japanese lantern shape with flattened top and button elliptic arcs, or the convex polygon with more than four even number corners.

23. The parallax barrier for an autostereoscopic display according to claim 4 wherein
the visible light transmitting sections of a plurality of independently formed holes constituting the parallax barrier is designed by:
determining a rectangular area which is a maximum area on an image display surface intended to be seen by one eye of a subject person of video image presentation through visible light transmitting sections of width Sh constituting the parallax barrier from the most appropriate three-dimensionally viewable position;
defining a shape inscribed in upper, lower, left, and right sides or only left and right sides of an area which is a like figure with the rectangular area and is formed by, using either left or right eyes of the subject person of video image presentation at the most appropriate three-dimensionally viewable position as a base point, intersections of line segments connecting the either eye to the rectangular area and the parallax barrier surface; and
defining an area on a pixel array surface seen by the subject person of video image presentation through the hole using either left or right eyes of the subject person of video image presentation at the most appropriate three-dimensionally viewable position as a base point, as an effective viewable area of a like figure with the hole.

24. The parallax barrier for an autostereoscopic display according to any one of claims 1 to 3 wherein
the parallax barrier is a plate type transparent medium, and reflection is prevented by:
providing visible light impermeable sections on a side of a subject person of video image presentation; and
forming the visible light impermeable sections with material that absorbs visible light and/or material that diffusely reflects visible light.

25. An autostereoscopic display using the parallax barrier for an autostereoscopic display according to any one of claims 1 to 3.

26. A designing method of a parallax barrier for an autostereoscopic display that calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and a value of the distance Z, based on a predetermined designing condition, wherein in autostereoscopic viewing under a condition in which:
- an average number of subpixels in a horizontal direction constituting pixels for three-dimensional display for one viewpoint of an autostereoscopic video image created from video images of a plurality of viewpoints is defined as α;
- a width of subpixels constituting the display is defined as Ph;
- a distance between centers of pixels for three-dimensional display that display video images of neighboring viewpoints is defined as αPh;
- a distance between pupils of left and right eyes of a subject person of video image presentation is defined as W; and
- a number of viewpoints of the video images for creating the autostereoscopic video image is defined as N, and
- in a design condition in which:
- a most appropriate three-dimensionally viewable position is preset and a distance from such a position to the parallax barrier is defined as L1; and
- a diagonal moire cancelling position is preset and a distance from such a position to the parallax barrier is defined as L2,
- a value of the distance Z from the image display surface of the display to the parallax barrier is determined by a following function (1); and
- a value of an interval Hh of a plurality of horizontally abutting visible light transmitting sections constituting the parallax barrier is determined by a following function (2):

$$Z = \frac{\alpha Ph \times L1}{W} \quad (1)$$

$$Hh = \frac{N \times \alpha Ph \times L2}{Z + L2}. \quad (2)$$

27. A designing method of a parallax barrier for an autostereoscopic display that calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and
- a value of the distance Z, based on a predetermined designing condition, wherein in autostereoscopic viewing under a condition in which:
- an average number of subpixels in a horizontal direction constituting pixels for three-dimensional display for one viewpoint of an autostereoscopic video image created from video images of a plurality of viewpoints is defined as α;
- a width of subpixels constituting the display is defined as Ph;
- a distance between centers of pixels for three-dimensional display that display video images of neighboring viewpoints is defined as αPh;
- a distance between pupils of left and right eyes of a subject person of video image presentation is defined as W;
- a horizontal resolution of the display is defined as Ir; and
- a number of viewpoints of the video images for creating the autostereoscopic video image is defined as N, and
- in a design condition in which:
- a most appropriate three-dimensionally viewable position is preset and a distance from such a position to the parallax barrier is defined as L1; and
- an appropriate three-dimensionally viewable position is preset as a position closest to the parallax barrier among positions from which one line of diagonal moire is seen, and a distance from such an appropriate three-dimensionally viewable position to the parallax barrier is defined as L2n,
- a value of the distance Z from the image display surface of the display to the parallax barrier is determined by a following function (1);
- a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position is determined by a following formula (3); and,
- a value of an interval Hh of a plurality of horizontally abutting visible light transmitting sections constituting the parallax barrier is determined by a following function (4):

$$Z = \frac{\alpha Ph \times L1}{W} \quad (1)$$

$$Mh = int\left(\frac{3Ir - 1}{N}\right) + 1 \quad (3)$$

$$Hh = \frac{N \times Mh \times \alpha Ph \times L2n}{(Z + L2n) \times (Mh - 1)}. \quad (4)$$

28. A designing method of a parallax barrier for an autostereoscopic display that calculates and designs: values relating to sizes and arrangements of a plurality of visible light transmitting sections constituting the parallax barrier provided with a distance Z from an image display surface of a display on which a plurality of pixels each having horizontally arranged three subpixels displaying R, G, and B are arranged in horizontal and vertical directions, and
- a value of the distance Z, based on a predetermined designing condition, wherein in autostereoscopic viewing under a condition in which:
- an average number of subpixels in a horizontal direction constituting pixels for three-dimensional display for one viewpoint of an autostereoscopic video image created from video images of a plurality of viewpoints is defined as α;
- a width of subpixels constituting the display is defined as Ph;
- a distance between centers of pixels for three-dimensional display that display video images of neighboring viewpoints is defined as αPh;

a distance between pupils of left and right eyes of a subject person of video image presentation is defined as W;
a horizontal resolution of the display is defined as Ir; and
a number of viewpoints of the video images for creating the autostereoscopic video image is defined as N, and
in a design condition in which:
a most appropriate three-dimensionally viewable position is preset and a distance from such a position to the parallax barrier is defined as L1; and
an appropriate three-dimensionally viewable position is preset as a position farthest from the parallax barrier among positions from which one line of diagonal moire is seen, and a distance from such an appropriate three-dimensionally viewable position to the parallax barrier is defined as L2f,
a value of the distance Z from the image display surface of the display to the parallax barrier is determined by a following function (1);
a value of a number Mh of visible light transmitting sections in a horizontal direction from a visible light transmitting section of the parallax barrier corresponding to pixel units for three-dimensional display at a left end of the display to a visible light transmitting section of the parallax barrier corresponding to pixel units for three-dimensional display at a right end of the display seen from a diagonal moire cancelling position is determined by a following formula (3); and,
a value of an interval Hh of a plurality of horizontally abutting visible light transmitting sections constituting the parallax barrier is determined by a following function (5):

$$Z = \frac{\alpha Ph \times L1}{W} \quad (1)$$

$$Mh = int\left(\frac{3Ir - 1}{N}\right) + 1 \quad (3)$$

$$Hh = \frac{N \times (Mh - 2) \times \alpha Ph \times L2f}{(Z + L2f) \times (Mh - 1)}. \quad (5)$$

\* \* \* \* \*